(12) United States Patent
Takeda et al.

(10) Patent No.: US 6,954,679 B1
(45) Date of Patent: Oct. 11, 2005

(54) METHOD OF GENERATING CONTROL DATA FOR BENDING AND TORSION APPARATUSES

(75) Inventors: Kenzo Takeda, Saitama-ken (JP);
Manabu Maruyama, Saitama-ken (JP);
Hideo Meguri, Saitama-ken (JP);
Yoshihiro Kageyama, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1094 days.

(21) Appl. No.: 09/668,388

(22) Filed: Sep. 25, 2000

(30) Foreign Application Priority Data

| Sep. 24, 1999 | (JP) | ................................ | 11-269893 |
| Sep. 24, 1999 | (JP) | ................................ | 11-269894 |
| Sep. 24, 1999 | (JP) | ................................ | 11-269895 |
| Nov. 1, 1999 | (JP) | ................................ | 11-311171 |
| Nov. 1, 1999 | (JP) | ................................ | 11-311192 |
| Nov. 1, 1999 | (JP) | ................................ | 11-311204 |
| Nov. 1, 1999 | (JP) | ................................ | 11-311237 |

(51) Int. Cl.$^7$ ............................................. G06F 19/00
(52) U.S. Cl. ..................... 700/165; 700/97; 700/159; 72/37
(58) Field of Search .................... 700/97, 159, 165; 72/37

(56) References Cited

U.S. PATENT DOCUMENTS

| 5,046,852 A | | 9/1991 | Hametner et al. | |
| 5,315,522 A | * | 5/1994 | Kauffman et al. | ........... 700/165 |
| 5,471,406 A | * | 11/1995 | Breyer et al. | ................ 702/168 |
| 5,508,935 A | * | 4/1996 | Pourboghrat | .................. 700/97 |
| 5,519,623 A | * | 5/1996 | Pourboghrat | ................ 700/165 |
| 6,073,057 A | * | 6/2000 | Bauer et al. | ................ 700/165 |

FOREIGN PATENT DOCUMENTS

| DE | 4015117 | 11/1990 |
| FR | 2468441 | 5/1981 |
| FR | 2678853 | 1/1993 |
| JP | 7-24533 | 1/1995 |
| JP | 10-314849 | 5/1997 |
| JP | 9-327727 | 12/1997 |
| JP | 10-166064 | 6/1998 |

* cited by examiner

*Primary Examiner*—Leo Picard
*Assistant Examiner*—Douglas S. Lee
(74) *Attorney, Agent, or Firm*—Arent Fox PLLC

(57) ABSTRACT

A shape data specifies the shape of an elongated product within an overall coordinate system. Local coordinate systems are defined on respective cross-sections of the elongated product in the overall coordinate system. The local coordinate system is designed to represent a stable die of a bending apparatus. The images of the elongated product protruding forward from the stable die within the respective local coordinate systems serve to specify the position of a movable die of the bending apparatus. The specified position reflects the deformation induced in the elongated product between the stable and movable dies. An ideal movement amount of the movable die can be determined based on the determined positions within the local coordinate systems. The determined movement amount can be utilized to prepare the control data for the bending apparatus. When the prepared control data is supplied to the bending apparatus, an ideal movement of the movable die can be achieved so as to effect bending on the elongated workpiece at a higher accuracy in accordance with the shape data.

17 Claims, 35 Drawing Sheets

File  Edit  View  Select  Option

| | | | | | | |
|---|---|---|---|---|---|---|
| N100 | M12M10 | | | | | |
| N120 | G00 | W-1293.000 | | | | |
| N140 | G90G01 | W-1423.000 | F6000.000 | | | |
| N150 | G01 | Z31.000 | F6000.000 | | | |
| N160 | M35 | | | | | |
| N170 | M33 | | | | | |
| N180 | G90G01 | U-18.000 | | F6000.000 | | |
| N1000 | G90G01 | X0.000 | B0.000 | Y0.446 | A0.159 | C0.000 | W-1424.000 | F6000.000 |
| N1001 | G90G01 | X0.000 | B0.000 | Y4.409 | A3.157 | C0.000 | W-1504.072 | F6000.000 |
| N1002 | G90G01 | X0.000 | B0.000 | Y7.376 | A5.279 | C0.000 | W-1584.107 | F6000.000 |
| N1003 | G90G01 | X0.090 | B-0.065 | Y8.515 | A6.092 | C0.7091 | W-1601.907 | F6000.000 |
| N1004 | G90G01 | X0.448 | B-0.322 | Y9.568 | A6.844 | C0.847 | W-1619.706 | F6000.000 |
| N1005 | G90G01 | X0.675 | B-0.485 | Y10.353 | A7.404 | C1.001 | W-1637.501 | F6000.000 |
| N1006 | G90G01 | X0.800 | B-0.576 | Y10.922 | A7.810 | C1.1697 | W-1655.297 | F6000.000 |
| N1007 | G90G01 | X0.819 | B-0.589 | Y11.315 | A8.090 | C1.3517 | W-1673.088 | F6000.000 |
| N1008 | G90G01 | X0.746 | B-0.537 | Y11.544 | A8.253 | C1.5281 | W-1690.880 | F6000.000 |
| N1009 | G90G01 | X0.651 | B-0.468 | Y11.628 | A8.314 | C1.6744 | W-1708.668 | F6000.000 |
| N1010 | G90G01 | X0.578 | B-0.416 | Y11.664 | A8.339 | C1.7752 | W-1726.456 | F6000.000 |
| N1011 | G90G01 | X0.516 | B-0.372 | Y11.731 | A8.387 | C2.584 | W-1744.242 | F6000.000 |

FIG.13

METHOD OF GENERATING CONTROL DATA FOR BENDING AND TORSION APPARATUSES

BACKGROUND OF THE INVENTION

1. Field of the Invention

The present invention relates to a bending apparatus or machine employed to bend an elongated workpiece passing through stable and movable dies, one after the other, which movable die is allowed to move or shift relative to the stable die so as to bend the elongated workpiece.

The term "curve" may optionally include a line comprising nodes and arcs connecting the adjacent nodes in the following description.

2. Description of the Prior Art

A software program such as a numerical control (NC) program can be employed to control the operation of any types of machine tools, including a bending machine. The software program must specify control data such as data defining a displacement or shift amount of a movable die in the bending machine, for example. Heretofore, skilled operators or workers are in general forced to write down the control data based on their intuition and experience. The written control data is actually used to manufacture trial products for evaluation. The evaluation may induce update of the control data based on intuition and experience of skilled operators or workers. The update of the written control data may be repeated many times until the product as expected can be obtained with the bending machine.

For example, Japanese Patent Application Laid-open Nos. 9-327727 and 10-166064 disclose proposals to generate control data without reliance on intuition and experience of skilled operators or workers. The proposals may contribute to manufacture of a first trial product roughly reflecting the shape of the final product as expected. The operators are released from generation of an original control data fully dependent upon their intuition and experience. The proposals may serve to reduce the operators' burden on troublesome operations, such as repeated manufacture of trial products and repeated update of control data.

The proposals of the above-mentioned Laid-open Nos. 9-327727 and 10-166064 are designed to employ a single three-dimensional coordinate system in calculating the periodical positions or motional path of the movable die. The coordinate system is designed to define the x-axis corresponding to the direction of advancement for an elongated workpiece, in other words, the longitudinal axis of the elongated workpiece. The motional path of the movable die is thus regulated within a plane perpendicular to the x-axis in the three-dimensional coordinate system. However, it is the fact that a straight line cannot completely reflect the longitudinal axis of a bent elongated workpiece. The plane for the motional path of the movable die, perpendicular to the x-axis, tends to suffer from an inclined attitude within a three-dimensional machine coordinate system established in the actual bending machine. The definition for the positions of the movable die according to the aforementioned plane of the three-dimensional coordinate system consequently cannot contribute to manufacture of a product of the dimensional accuracy within a permissible range required for a practical use.

In general, a simple calculation for deriving the positions of the movable die, based on a shape data specifying an image of a designed product within a coordinate system, cannot eliminate dimensional deviations or errors in a manufactured product. Corrections or compensations should be included in data for the positions of the movable die for cancellation of dimensional deviations in a manufactured product. Such data suffers from variation depending upon factors, such as the magnitude of curvature in bending, the quality of the elongated workpiece, the sectional shape of the elongated workpiece, and so on. These factors inevitably induce difficulty to specify the quantity of the corrections or compensations. For example, all the corrections or compensations are specified based on actual measurements in the aforementioned Laid-open Nos. 9-327727 and 10-166064. One has to measure the corrections or compensations for every magnitude of the curvature. Moreover, such measurement should be effected for every quality as well as every sectional shape and size of the elongated workpiece. Operators should suffer from a troublesome collection of measurement results.

When a software program is to be specified for the control of a bending machine, a displacement or shift amount of the movable die in control data must relate with the feed speed of an elongated workpiece such as an extruded aluminum workpiece, for example. However, the feed speed of the straight elongated workpiece cannot easily be specified based on an image of a bent product in the three-dimensional coordinate system. The aforementioned Laid-open Nos. 9-327727 and 10-166064 completely fail to refer to a method of accurately specifying the feed speed of an elongated workpiece based on a shape data specifying the shape of the bent product.

For example, the shapes or designs for industrial products, such as automobiles and electric household appliances, cannot be determined without considering methods of manufacture or mass production. If torsion can be effected on an elongated workpiece in combination with bending in a bending machine, an increased variety can be realized in the shapes or designs for industrial products. Heretofore, no one proposes a bending machine capable of effecting torsion on an elongated workpiece as expected.

SUMMARY OF THE INVENTION

It is accordingly an object of the present invention to provide a method of generating a control data, capable of allowing a bending apparatus to reliably effect bending on an elongated workpiece at a higher accuracy.

It is another object of the present invention to provide a bending apparatus system capable of effecting bending on an elongated workpiece at a higher accuracy.

It is a further object of the present invention to provide a method of generating a control data, capable of allowing a bending apparatus to reliably effect bending on an elongated workpiece at a higher accuracy, while eliminating a troublesome collection of measurement or experimental results to the utmost.

It is a further object of the present invention to provide a method of generating a control data for a bending apparatus, capable of easily determining the feed speed of an elongated workpiece when the displacement or shift amount should be specified for a movable die of the bending apparatus.

It is a further object of the present invention to provide a method of generating a control data, capable of allowing a bending apparatus to reliably effect torsion on an elongated workpiece, in addition to bending, at a higher accuracy.

It is a further object of the present invention to provide a method of generating a control data, capable of allowing a torsion apparatus to effect a complicated torsion on an elongated workpiece with a pair of dies rotative about the longitudinal axis of the elongated workpiece relative to each other.

It is a further object of the present invention to provide a method of generating a control data, capable of allowing a torsion apparatus to effect torsion on an elongated workpiece at a higher accuracy, without reliance to intuition and experience of skilled operators or workers, with a pair of dies rotative about the longitudinal axis of the elongated workpiece relative to each other.

According to a first aspect of the present invention, there is provided a computer-implemented method of generating a control data for a bending apparatus, comprising: capturing a shape data specifying the shape of an elongated product in accordance with an overall coordinate system; defining local coordinate systems on specific cross-sections of the elongated product, respectively, based on the shape data, said local coordinate systems representing a stable die of the bending apparatus within the overall coordinate system; and determining periodical positions for a movable die of the bending apparatus in accordance with the respective local coordinate systems.

The method enables formation of images, representing the shape of the elongated product extending forward from the stable die, within the local coordinate systems defined on the respective specific cross-sections of the elongated product. When the image of the movable die is superposed on the image of the elongated product within the respective local coordinate systems, the position of the movable die can be specified within the respective local coordinate systems. The specified position reflects the deformation induced in the elongated workpiece between the stable and movable dies. An ideal movement or control amount of the movable die can be determined based on the determined position within the local coordinate system in this manner. The determined movement or control amount can be utilized to prepare the control data for the bending apparatus or machine. When the thus prepared control data is supplied to the bending apparatus, an ideal movement of the movable die can be achieved in the bending apparatus so as to effect bending on the elongated workpiece at a higher accuracy in accordance with the shape data.

The method of generating may further comprise: determining a parametric curve representing the degree of bending for the elongated product, based on the shape data; calculating a vector tangent to the parametric curve at respective control points; and defining the specific cross-sections at the respective control points, based on the vectors.

In general, the interval between the adjacent control points is reduced or narrowed when the parametric curve gets a larger curvature. On the other hand, the adjacent control points are forced to recede from each other as the parametric curve gets a smaller curvature. If the parametric curve is utilized to define the cross-sections of the elongated product, the larger the curvature of the elongated product gets, the larger number of the cross-sections can be obtained. Accordingly, the motion of the movable die can accurately be controlled irrespective of variation in the curvature.

In determining the positions of the movable die, the method of generating may further comprise: determining the quantity of an interval between the stable and movable die within the local coordinate system; defining a motion plane for the movable die within the local coordinate system based on the quantity of the interval; and determining the intersection between the parametric curve and the motion plane within the local coordinate system. Employment of the parametric curve serves to reveal the positions of the movable die in a facilitated manner only if the motion plane for the movable die is defined within the local coordinate system.

According to a second aspect of the present invention, there is provided a computer-implemented method of generating a control data for a bending apparatus, comprising: defining local coordinate systems within an overall coordinate system designed to specify a shape of an elongated product, said local coordinate systems representing a stable die of the bending apparatus within the overall coordinate system, respectively. The method also enables specifying the positions of the movable die in accordance with the local coordinate systems representing the stable die in the same manner as the above-described first aspect. The specified position likewise reflects the deformation induced in the elongated workpiece between the stable and movable dies. If the movement or control amount of the movable die can be derived based on the thus specified positions of the movable die, an ideal motion of the movable die can be achieved in the bending apparatus.

In determining the positions of the movable die, the local coordinate system may be renewed or updated for every longitudinal position defined in the longitudinal direction of the elongated workpiece. The renewal or update of the local coordinate systems within the overall coordinate system enables derivation of continuous positions, for the movable die, arranged in the longitudinal direction of the elongated workpiece. A continuous movement or motion of the movable die can thus be specified based on the derived continuous positions.

According to a third aspect of the present invention, there is provided a computer-implemented method of generating a control data for a bending apparatus, comprising: capturing from a computer-aided design system a shape data specifying a shape of an elongated product; and generating the control data specifying positions for a movable die of the bending apparatus, said positions set for corresponding feed positions defined in an axial direction of the elongated product.

In recent years, CAD (computer-aided design) systems remarkably have developed in the technical field of designing industrial products. Heretofore, a product data, including a shape data for the shape of the product, prepared in the CAD system was in fact not utilized enough in the field of plastic processing. The aforementioned method based on the shape data prepared in the CAD system enables preparation of a control data for a bending apparatus or machine in an effective and facilitated manner. Here, the shape data preferably defines at least a curve representing the degree of bending in the elongated product.

In addition, according to a fourth aspect of the present invention, there is provided a computer-implemented method of generating a control data for a bending apparatus, comprising: determining a geometric position for a movable die of the bending apparatus, based on a shape data specifying a shape of an elongated product; determining a bending moment applied to an elongated workpiece, based on a curvature of the elongated product specified in the shape data; determining the quantity for an elastic/plastic bending deformation induced in the elongated workpiece, based on the bending moment; and determining an actual position for the movable die, based on the quantity and the geometric position.

In general, an elongated workpiece, such as a metallic material, faces an elastic deformation before a plastic deformation. In case where this type of the elongated workpiece is subjected to bending from the movable die, the bent elongated product suffers from slight dimensional errors in response to an elastic restoration or springback right after the elongated workpiece has been released from the movable die. If the position of the movable die is determined in view of the derived elastic/plastic bending deformation in the above-described manner, it is possible to sufficiently cancel the dimensional errors due to the elastic restoration or springback in the elongated product after bending. In particular, since the elastic/plastic bending deformation can be obtained from a geometric calculation based on the bending moment, it is possible to omit a troublesome collection of measurement data based on experiments to the utmost.

The elastic/plastic deformation may be represented by an expression including the bending moment $\underline{M}$, the Young's modulus $\underline{E}$ and the area moment of inertia $\underline{I}$, for the elongated product, for example. The bending moment $\underline{M}$ can be derived from calculation based on the stress-strain diagram obtained from a tension test and the shape data of the elongated product, as conventionally known. The area moment of inertia $\underline{I}$ can be derived from calculation based on the shape data of the elongated product, as conventionally known. The Young's modulus $\underline{E}$ can be obtained based on a tension test, as conventionally known. However, the stress-strain diagram and the Young's modulus $\underline{E}$ can in general be obtained from the existing data without any trouble. Accordingly, the expression based on the bending moment $\underline{M}$, the Young's modulus $\underline{E}$ and the area moment of inertia $\underline{I}$ enables elimination of a troublesome collection of measurement data based on experiments to the utmost.

In determining the bending moment, a strain distribution may be specified along the cross-section of the elongated workpiece. In this case, the strain distribution can be derived from a simple geometric calculation based on the curvature of the elongated product. A stress distribution can be derived from the thus specified strain distribution. The aforementioned bending moment can be derived from the stress distribution in a facilitated manner.

Furthermore, according to a fifth aspect of the present invention, there is provided a computer-implemented method of generating a control data for a bending apparatus, comprising: determining a geometric position for a movable die of the bending apparatus, based on a shape data specifying a shape of an elongated product; determining the quantity for an elbow angle of an elongated workpiece, said elbow angle induced by a shear deformation and a deformation in cross-section of the elongated workpiece at an outlet defined in a stable die of the bending apparatus; and determining an actual position for the movable die, based on the quantity and the geometric position.

In particular, when a hollow elongated workpiece is subjected to bending between the stable and movable dies, the elongated workpiece suffers from a larger shear strain at the outlet of the through hole in the stable die. The shear strain causes the shear deformation such as an elastic and/or a plastic elbow deformation at the outlet of the through hole. Additionally, a deformation in the cross-section, such as the depression, may be formed on the elongated workpiece at the outlet of the through hole in the stable die. The depression induces an elbow deformation at the outlet of the through hole. Any elbow deformation results in an insufficient bending of the elongated workpiece between the stable and movable dies. The elongated workpiece between the stable and movable dies fails to reflect the geometry specified in the shape data. When the elongated workpiece is released from the movable die, the elongated product suffers from slight dimensional errors in response to the elbow deformations. If the position of the movable die can be determined in view of the elbow angle in the above-described manner, it is possible to sufficiently cancel the dimensional errors due to the elbow deformations in the elongated product after bending.

Furthermore, according to a sixth aspect of the present invention, there is provided a computer-implemented method of generating a control data for a bending apparatus, comprising: determining a geometric position for a movable die of the bending apparatus, based on a shape data specifying a shape of an elongated product; determining the quantity for a sectional deformation induced in an elongated workpiece at an outlet defined in a stable die of the bending apparatus; and determining an actual position for the movable die, based on the quantity and the geometric position.

In particular, when a hollow elongated workpiece is subjected to bending between the stable and movable dies, the elongated workpiece in general suffers from a sectional deformation, such as a crash and a depression, in the direction of bending or radius of curvature at the outlet of the through hole in the stable die. A sufficient plastic bending cannot be achieved in the elongated workpiece until the generation of the sectional deformation is completed, even if the movable die still moves in the direction of bending. The sectional deformation results in an insufficient bending of the elongated workpiece between the stable and movable dies. The elongated workpiece between the stable and movable dies fails to reflect the geometry specified in the shape data. The final elongated product, released from the movable die, suffers from slight dimensional errors. If the position for the movable die can be determined in view of the sectional deformation in the above-described manner, it is possible to cancel the dimensional errors due to the deformation in the cross-section in the elongated product after bending.

Furthermore, according to a seventh aspect of the present invention, there is provided a computer-implemented method of generating a control data for a bending apparatus, comprising: determining a geometric position for a movable die of the bending apparatus, based on a shape data specifying a shape of an elongated product; determining the quantity for a clearance defined between an elongated workpiece and at least one of a stable die and the movable die of the bending apparatus; and determining an actual position for the movable die, based on the quantity and the geometric position.

In general, a specific range of the dimensional tolerance is permitted for an elongated workpiece, for example, manufactured by extrusion and the like. If the elongated workpiece should smoothly be passed through the through holes, defined in the stable and movable dies, irrespective of variation in dimensions within the tolerance, it is necessary to establish a clearance between the designed dimensions of the elongated workpiece and the actual dimensions of the through holes. Even if the elongated workpiece has been manufactured exactly at the designed dimensions, the elongated workpiece cannot pass through the through holes in the stable and movable dies without a clearance. A substantial bending cannot be accomplished in the elongated workpiece until the stable and movable dies have moved across the clearance so as to completely contact the elongated workpiece, even if the movable die moves in the direction of bending. The clearance results in an insufficient bending of the elongated workpiece between the stable and movable dies. The elongated workpiece between the stable and movable dies fails to reflect the geometry specified in the shape data. The final elongated product, released from the movable die, suffers from slight dimensional errors. If the position for the movable die can be determined in view of the clearance in the above-described manner, it is possible to cancel the dimensional errors due to the clearance in the elongated product after bending.

It should be noted that any of the aforementioned elastic/plastic bending deformation, elbow angle, sectional deformation and clearance may be employed, independently or in any combination.

Furthermore, according to an eighth aspect of the present invention, there is provided a computer-implemented method of generating a control data for a bending apparatus, comprising: determining a neutral axis based on a shape data specifying a shape of an elongated product, said neutral axis extending in a longitudinal direction of the elongated product; and determining a feed speed for an elongated workpiece which passes through a stable die of the bending apparatus, based on the neutral axis.

In general, an axial compressive force is inevitably induced in the elongated workpiece in response to the reaction to the advancement of the elongated workpiece when the elongated workpiece fed out of the stable die is received on the offset movable die. The axial compressive force causes a variation in the length of the elongated workpiece. The variation in the length depends upon the magnitude of the curvature in the elongated workpiece. On the other hand, the elongated workpiece does not suffer from a compressive strain at the neutral axis irrespective of the degree of bending or curvature in the elongated workpiece. Accordingly, the length of the neutral axis can be kept constant in the workpiece before and after bending. The feed speed derived from the neutral axis contributes to formation of the elongated product at a higher accuracy.

In determining the neutral axis, the method of generating may comprise: determining the position of the centroid or center of gravity on the cross-section of the elongated product; and calculating the quantity of a deviation from the centroid to the neutral axis along the cross-section, based on the curvature of the elongated product.

In general, when a mechanical property or other property is to be analyzed for an elongated workpiece or product, it is preferable to specify the position of the centroid or center of gravity for the cross-section of the elongated workpiece or product. The centroid can be derived from the calculation in the CAD systems in a facilitated manner. It is convenient if the neutral axis can be specified on the basis of the position of the centroid. The positions of the neutral axis on the respective cross-sections are sequentially connected or linked one another along the longitudinal direction of the elongated product. The neutral axis consequently can be derived in this manner over the entire length of the elongated product.

In determining the feed speed of the elongated workpiece, the method of generating may further comprise: determining a centroidal line specifying the positions of the centroids on respective cross-sections over the entire length of the elongated product; generating the neutral axis over the entire length of the elongated product based on the centroidal line and the quantity of the deviation; and determining the feed speed of the elongated workpiece based on the length of the neutral axis, the length measured between respective pairs of the adjacent cross-sections.

In general, even if the movement amount or motion of the movable die is derived from the geometry based on the shape data specifying the shape of the elongated product, the manufactured elongated product of a higher dimensional accuracy cannot be obtained from the processing with the bending apparatus. The actual processing should be conducted in view of various factors such as the elastic restoration or so-called springback due to the elastic/plastic deformation of the elongated workpiece, the elbow angle of the elongated workpiece due to the shear deformation and/or the deformation in the cross-section at the outlet of the stable die, the insufficient movement of the movable die based on the sectional deformation, the insufficient movement of the movable die based on the clearance defined between the elongated workpiece and the die, for example. Consideration to these factors greatly contributes to formation of the elongated product at a higher accuracy. Based on the positions of the stable die and the centroids on the respective cross-sections, numerical calculations in specifying the effects of these factors can be facilitated. The aforementioned centroidal line is preferably generated so as to determine the feed speed of the elongated workpiece. Based on the centroidal line and the quantity of the deviation, the neutral axis can be derived in a facilitated manner. The feed speed derived from the neutral axis contributes to formation of the elongated product at a higher accuracy in the above-described manner. In particular, the position of the central axis for the stable die preferably coincides with the position of the centroid on the respective cross-sections.

In implementing the aforementioned numerical calculations based on the position of the stable die and the centroid, the method of generating may comprise: generating a parametric curve representing the centroidal line over the entire length of the elongated product; and defining the cross-section at respective control points on the parametric curve.

In general, the interval between the adjacent control points is reduced or narrowed when the parametric curve gets a larger curvature. To the contrary, the adjacent control points are forced to recede from each other as the parametric curve gets a smaller curvature. If the parametric curve is utilized to define the cross-sections of the elongated product, the larger the curvature of the elongated product gets, the larger number of the cross-sections can be obtained. Accordingly, the motion of the movable die can accurately be controlled irrespective of variation in the curvature. Determination of the feed speed in this manner contributes to formation of the elongated product at a higher accuracy in the bending apparatus.

In addition, the method of generating may further comprise: defining local coordinate systems on the respective cross-sections of the elongated product, the local coordinate systems representing the stable die; determining the position of the movable die based on the local coordinate systems; and relating the position of the movable die to the feed speed of the elongated workpiece.

The method enables formation of images, representing the shape of the elongated product extending forward from the stable die, within the local coordinate systems defined on the respective cross-sections of the elongated product. When the image of the movable die is superposed on the image of the elongated product within the respective local coordinate systems, the position of the movable die can be specified within the respective local coordinate systems. The specified position reflects the deformation induced in the elongated workpiece between the stable and movable dies. An ideal movement or control amount of the movable die can be determined based on the determined position within the local coordinate system in this manner. The determined movement or control amount can be utilized to prepare the control data for the bending apparatus or machine. When the thus prepared control data is supplied to the bending apparatus, an ideal movement of the movable die can be achieved in the bending apparatus so as to effect bending on the elongated workpiece at a higher accuracy in accordance with the shape data.

Furthermore, according to a ninth aspect of the present invention, there is provided a computer-implemented method of generating a control data for a bending apparatus, comprising: capturing a shape data specifying a shape of a twisted elongated product in accordance with an overall coordinate system; defining local coordinate systems on respective cross-sections of the elongated product specified in accordance with the shape data, said local coordinate systems representing a stable die of the bending apparatus within the overall coordinate system, respectively; determining an angle of torsion per unit length for a unit feed amount specified in a direction of a longitudinal axis of the elongated product, based on the adjacent local coordinate systems; and determining a relative rotation around the longitudinal axis between the stable die and a movable die of the bending apparatus, based on the angle of torsion per unit length.

When torsion is to be effected on an elongated workpiece in the bending apparatus, at least one of the stable and movable dies may be driven to rotate around the longitudinal axis of the elongated workpiece. The rotation serves to twist the elongated workpiece between the stable and movable dies. A relative rotation between the stable and movable dies may be specified by a combination of the quantity of the interval between the stable and movable dies and the distribution of the angle of torsion per unit length along the longitudinal axis of the elongated workpiece between the stable and movable dies. Determination of the angle of torsion per unit length based on the shape data contributes to derivation of the relative rotation which allows the stable and movable dies to effect torsion on the elongated workpiece between the stable and movable dies at a higher accuracy. Control on the rotation of the stable die and/or the movable die based on the derived relative rotation enables formation of the twisted elongated product at a higher accuracy.

In determining the angle of torsion per unit length, the method of generating may comprise: positioning the xy-plane of the local coordinate system on the respective cross-sections, allowing the z-axis of the respective local coordinate systems to coincide with the longitudinal axis; superposing the xy-planes of the adjacent local coordinate systems on each other with the rotational angle around the z-axis kept stable; and deriving a torsional angle of the twisted elongated product between the adjacent cross-sections based on the superposed xy-planes. A matrix calculation may be employed to achieve this superposition of the xy-planes, for example. In this manner, the quantity of torsion or torsional angle can be derived for the twisted elongated product between the adjacent cross-sections in a facilitated manner.

In defining the xy-plane, the method of generating may comprise: determining the longitudinal axis of the elongated product based on the shape data; and determining at least a guide line designed to pass through the identical points or coordinates for the respective local coordinate systems. For example, the combination of the longitudinal axis and the guide line serves to specify the degree of twist or torsion at a higher accuracy in the image of the twisted elongated product specified in the shape data. The longitudinal axis and the guide line can in general be obtained in a facilitated manner based on the shape data prepared in the CAD systems.

The aforementioned method of generating may further comprise: determining the quantity of the interval between the stable and movable dies within the local coordinate system; defining the motion plane for the movable die within the local coordinate system based on the quantity of the interval; and determining the intersection between the motion plane and the longitudinal axis within the local coordinate system.

The method enables formation of images, representing the shape of the elongated product extending forward from the stable die, within the local coordinate system defined on the cross-section of the elongated product. When the image of the movable die is superposed on the image of the elongated product within the local coordinate system, the position of the movable die can be specified within the local coordinate system. The position of the movable die can be derived by determining the intersection between the motion plane for the movable die and the longitudinal axis of the elongated product in a facilitated manner. The position of the intersection reflects the deformation induced in the elongated workpiece between the stable and movable dies. An ideal movement or control amount of the movable die can be determined based on the determined position within the local coordinate system in this manner.

In addition, the method of generating may further comprise: generating the centroidal line specifying the linkage of the centroids on the respective cross-sections over the entire length of the elongated product; generating the neutral axis over the entire length of the elongated product based on the centroidal line; and determining the feed speed for the elongated workpiece based on the length of the neutral axis measured between the respective pairs of the adjacent cross-sections.

In general, an axial compressive force is inevitably induced in the elongated workpiece in response to the reaction to the advancement of the elongated workpiece when the elongated workpiece fed out of the stable die is received on the offset movable die. The axial compressive force causes a variation in the length of the elongated workpiece. The variation in the length depends upon the magnitude of the curvature in the elongated workpiece. On the other hand, the elongated workpiece does not suffer from a compressive strain at the neutral axis irrespective of the degree of bending or curvature in the elongated workpiece. Accordingly, the length of the neutral axis can be kept constant in the workpiece before and after bending. The feed speed derived from the neutral axis contributes to formation of the elongated product at a higher accuracy.

Moreover, even if the movement amount or motion of the movable die is derived from the geometry based on the shape data specifying the shape of the elongated product, the manufactured elongated product of a higher dimensional accuracy cannot be obtained from the processing with the bending apparatus. The actual processing should be conducted in view of various factors such as the elastic restoration or so-called springback due to the elastic/plastic deformation of the elongated workpiece, the elbow angle of the elongated workpiece due to the shear deformation and/or the deformation in the cross-section at the outlet of the stable die, the insufficient movement of the movable die based on the sectional deformation, the insufficient movement of the movable die based on the clearance defined between the elongated workpiece and the die, for example. Consideration to these factors greatly contributes to formation of the elongated product at a higher accuracy. Based on the positions of the stable die and the centroid on the respective cross-sections, numerical calculations in specifying the effects of these factors can be facilitated. The aforementioned centroidal line is preferably generated so as to determine the feed speed of the elongated workpiece. In particular, the position of the central axis for the stable die preferably coincides with the position of the centroid on the respective cross-sections.

In generating the neutral axis, the method of generating may likewise comprise: determining the position of the centroid on the cross-section of the elongated product; and calculating the quantity of a deviation from the centroid to the neutral axis along the cross-section, based on the curvature of the elongated product specified in the shape data. Determination of the neutral axis based on the position of the centroid in this manner contributes to a facilitated generation of the neutral axis over the entire length of the elongated product.

In determining the feed speed of the elongated workpiece based on the length of the centroidal line, the method of generating may comprise: generating a parametric curve representing the centroidal line over the entire length of the elongated product; and defining the cross-section at respective control points on the parametric curve. As described above, if the parametric curve is utilized to define the cross-sections of the elongated product, the motion of the movable die can accurately be controlled irrespective of variation in the curvature. Determination of the feed speed in this manner contributes to formation of the elongated product at a higher accuracy in the bending apparatus.

Furthermore, according to a tenth aspect of the present invention, there is provided a computer-implemented method of generating a control data for a torsion apparatus, comprising: capturing a shape data specifying the shape of an elongated product twisted around its longitudinal axis; determining an angle of torsion per unit length for a unit feed amount specified in the direction of the longitudinal axis, based on the shape data; and determining a torsional angle of the elongated product around the longitudinal axis based on the angle of torsion per unit length, the torsional angle defined between first and second dies allowed for a relative rotation around the longitudinal axis.

The method serves to express the torsional angle variable along the direction of the longitudinal axis in the twisted elongated product by the angle of torsion per unit length. The relative rotation around the longitudinal axis of the elongated product can be specified between the first and second dies based on the angle of torsion per unit length. If the rotation of the first die and/or the second die can be controlled in accordance with the specified relative rotation while the elongated workpiece sequentially passes through the first and second dies, the torsion specified in the shape data of the twisted elongated product can be induced in the elongated workpiece. The torsional angle may be gradually increased or decreased in the elongated product. The shape data can be captured from the CAD systems, for example.

In determining the torsional angle, the method of generating may comprise: generating a curve representing variation of the angle of torsion per unit length along the direction of the longitudinal axis of the twisted elongated product; detecting the maximum value point on the curve; and multiplying the value for the angle of torsion per unit length on the curve leading to the maximum value point by the quantity of an interval defined between the first and second dies.

When the relative rotation between the first and second dies serve to effect torsion on the elongated workpiece, the elongated workpiece is uniformly twisted between the first and second dies. Specifically, the angle of torsion per unit length uniformly distributes along the direction of the longitudinal axis between the first and second dies. For example, if the elongated workpiece between the first and second dies has a partial section twisted in advance at the uniform angle of torsion per unit length, even the relative rotation between the first and second cannot achieve an additional torsion at the partial section because of the work hardening. Torsion starts to occur in the elongated workpiece at sections other than the aforementioned partial section. When the torsion at the other sections has reached the angle of torsion per unit length achieved at the aforementioned partial section, the elongated workpiece can uniformly be twisted again over its entire length between the first and second dies.

According to the characteristic of the torsion between the first and second dies, when the relative rotation is gradually increased between the first and second dies, keeping the advancement of the elongated workpiece sequentially passing through the first and second dies in the direction of the longitudinal axis, a torsion of a gradual increased angle can be induced in the elongated workpiece at the section which has just emerged out of the second die. The relative rotation can be controlled in this manner in accordance with the product of the angle of torsion per unit length and the quantity of the interval.

In this case, an incremental curve without any fall in the angle of torsion per unit length is preferably generated to represent the curve leading or rising to the maximum value point. Replacement of the curve with the incremental curve may be achieved by averaging the higher extreme value and the lower extreme value adjacent the higher extreme value in the curve leading to the maximum value point. The generated incremental curve contributes to a reliable derivation of the control data for the torsion apparatus in which the first and second dies are spaced from each other.

On the other hand, the method of generating may further comprise subjecting the angle of torsion per unit length to integration over the interval, based on the curve falling from the maximum value point.

According to the above-described characteristic of the torsion between the first and second dies, when the relative rotation is gradually decreased between the first and second dies, for example, keeping the advancement of the elongated workpiece in the aforementioned manner, a torsion of a gradual decreased angle can be induced in the elongated workpiece at the section which has just emerged out of the second die. The relative rotation can be controlled in this manner in accordance with the integration of the angle of torsion per unit length over the interval.

In this case, a decremental curve without any rise or lift in the angle of torsion per unit length is preferably generated to represent the curve falling from the maximum value point. Replacement of the curve with the decremental curve may be achieved by averaging the higher extreme value and the lower extreme value adjacent the higher extreme value in the curve leading to the maximum value point. The generated decremental curve likewise contributes to a reliable derivation of the control data for the torsion apparatus in which the first and second dies are spaced from each other.

Additionally, a straight line is preferably generated so as to represent the curve in the vicinity of the maximum value point. The straight line is designed to specify a constant angle of torsion per unit length at least over the interval. Replacement of the curve with the straight line likewise contributes to a reliable derivation of the control data for the torsion apparatus in which the first and second dies are spaced from each other.

Furthermore, according to an eleventh aspect of the present invention, there is provided a computer-implemented method of generating a control data for a torsion apparatus, comprising: determining a logical relative rotation between first and second dies around the longitudinal axis of a twisted elongated product, based on a shape data specifying the shape of the elongated product twisted around the longitudinal axis; determining a torsional moment applied to an elongated workpiece, based on a torsional angle of the elongated product specified in the shape data; determining the quantity for an elastic/plastic torsional deformation induced in the elongated workpiece, based on the torsional moment; and determining an actual relative rotation between the first and second dies, based on the quantity and the logical relative rotation.

In general, an elongated workpiece, such as a metallic elongated material, faces an elastic deformation before a plastic deformation. In case where this type of the elongated workpiece is subjected to torsion between the first and second dies, the twisted elongated product suffers from slight dimensional errors in response to an elastic restoration or springback right after the elongated workpiece has been released from the restraint of the first and second dies. If the relative rotation is determined between the first and second dies in view of the derived elastic/plastic torsional deformation in the above-described manner, it is possible to sufficiently cancel the dimensional errors due to the elastic restoration or springback in the twisted elongated product after torsion. In particular, since the elastic/plastic torsional deformation can be obtained from a geometric calculation based on the torsional moment, it is possible to reliably eliminate a troublesome collection of measurement data based on experiments.

The elastic/plastic torsional deformation may be represented by an expression including the torsional moment $T$, the shearing modulus $G$ and the polar moment of inertia of area $Ip$, for example. The torsional moment $T$ and the polar moment of inertia of area $Ip$ can be derived from calculation based on the shape data of the twisted elongated product, as conventionally known. The shearing modulus $G$ can be obtained based on the Young's modulus $E$ derived from a tension test and the Poisson's ratio $v$, as conventionally known. However, the shearing modulus $G$ can in general be obtained from the existing data without any trouble. Accordingly, the expression based on the torsional moment $T$, the shearing modulus $G$ and the polar moment of inertia of area $Ip$ enables elimination of a troublesome collection of measurement data based on experiments to the utmost.

In determining the torsional moment $T$, a shear strain distribution may be specified along the cross-section of the elongated workpiece. The shear strain distribution can be derived from a simple geometric calculation based on the distance from the center of torsion, namely, the position of the longitudinal axis. A shear stress distribution can be derived from the thus specified shear strain distribution. The aforementioned torsional moment can be derived from the shear stress distribution in a facilitated manner.

Furthermore, according to a twelfth aspect of the present invention, there is provided a computer-implemented method of generating a control data for a torsion apparatus, comprising: determining a logical relative rotation between first and second dies around a longitudinal axis of a twisted elongated product, based on a shape data specifying the shape of the elongated product twisted around the longitudinal axis; determining the quantity for a torsional variation induced in an elongated workpiece in response to a sectional deformation of the elongated workpiece, said sectional deformation induced at an edge of a through hole on at least one of the first and second dies; determining an actual relative rotation between the first and second dies, based on the quantity and the logical relative rotation.

In particular, when a hollow elongated workpiece is subjected to torsion between the first and second dies, the edges of the elongated workpiece in general suffers from a sectional deformation such as a depression at the edges of the through holes defined in the first and second dies. A sufficient plastic torsion cannot be achieved in the elongated workpiece until generation of the depression has been completed, even if the relative rotation is induced between the first and second dies around the longitudinal axis. The depression results in an insufficient torsion of the elongated workpiece between the first and second dies. The elongated workpiece between the first and second dies fails to reflect the geometry specified in the shape data. The twisted elongated product, released from restraint of the first and second dies, suffers from slight dimensional errors. If the relative rotation can be determined between the first and second dies in view of the torsional variation in the above-described manner, it is possible to cancel the dimensional errors due to the sectional deformation in the twisted elongated product after torsion. In this case, the torsional variation can be specified based on the number of edge lines extending in the direction of the longitudinal axis of the elongated workpiece. In general, the aforementioned sectional deformation such as a depression tends to occur at the edge lines of the elongated workpiece.

Furthermore, according to a thirteenth aspect of the present invention, there is provided a computer-implemented method of generating a control data for a torsion apparatus, comprising: determining a logical relative rotation between first and second dies around a longitudinal axis of a twisted elongated product, based on a shape data specifying the shape of the elongated product twisted around the longitudinal axis; determining the quantity for a clearance defined between an elongated workpiece and at least one of the first and second dies; determining an actual relative rotation between the first and second dies, based on the quantity and the logical relative rotation.

In general, a specific range of the dimensional tolerance is permitted for an elongated workpiece, for example, manufactured by extrusion and the like. If the elongated workpiece should smoothly be passed through the through holes defined in the first and second dies, irrespective of variation in dimensions within the tolerance, it is necessary to establish a clearance between the designed dimensions of the elongated workpiece and the actual dimensions of the through holes. Even if the elongated workpiece has been manufactured exactly at the designed dimensions, the elongated workpiece cannot pass through the through holes in the first and second dies without a clearance. A substantial torsion cannot be accomplished in the elongated workpiece until the first and second dies are allowed to completely contact the elongated workpiece through the relative rotation over the clearance, even if the first and second dies are driven for relative rotation around the longitudinal axis. The clearance results in an insufficient torsion of the elongated workpiece between the first and second dies. The elongated work piece between the first and second dies fails to reflect the geometry specified in the shape data. The final elongated product, released from restraint of the first and second dies, suffers from slight dimensional errors. If the relative rotation can be determined between the first and second dies in view of the clearance in the above-described manner, it is possible to cancel the dimensional errors due to the clearance in the twisted elongated product after torsion.

It should be noted that any of the aforementioned elastic/plastic torsional deformation, torsional variation and clearance may be employed, independently or in any combination.

Any of the aforementioned method of generating a control data for a bending or torsion apparatus may be achieved in accordance with implementation of a software program in a CPU (central processing unit), an MPU (micro processing unit), a computer system, or the like. Any types of computer-readable media, such as a diskette (FD), a compact disk (CD), a digital video disk (DVD), for example, can be employed to supply or distribute the software program. In addition, a network such as an LAN (local area network), a WAN (wide area network), the Internet, and the like, can also be employed to supply or distribute the mentioned software program.

Furthermore, according to a fourteenth aspect of the present invention, there is provided a bending apparatus system comprising: a bending apparatus designed to form an elongated product by effecting bending on an elongated workpiece passing through stable and movable dies, one after the other; an input device designed to get a shape data specifying the shape of the elongated product in accordance with an overall coordinate system; a processor unit designed to determine the position for the movable die based on respective local coordinate systems, said local coordinate systems defined on respective cross-sections of an image of the elongated product within the overall coordinate system; and a controller designed to control motion of the movable die based the positions determined at the processor unit.

The above-described structure enables formation of images, representing the shape of the elongated product extending forward from the stable die, within the local coordinate systems defined on the respective specific cross-sections of the elongated product. When the image of the movable die is superposed on the image of the elongated product within the respective local coordinate systems, the position of the movable die can be specified within the respective local coordinate systems. The specified position reflects the deformation induced in the elongated workpiece between the stable and movable dies. An ideal movement or control amount of the movable die can be determined based on the determined position within the local coordinate system in this manner.

The aforementioned processor unit may be designed to determine a diagrammatic expression, such as a curve, representing movement or motion of the movable die in response to variation in the longitudinal position of the elongated workpiece. The diagrammatic expression serves to assist evaluation or diagnosis on the operation of the bending apparatus prior to the actual processing.

In addition, the processor unit may also be designed to determine a diagrammatic expression, such as a curve, representing variation in the attitude of the movable die in response to variation in the longitudinal position of the elongated workpiece. The diagrammatic expression likewise serves to assist evaluation or diagnosis on the operation of the bending apparatus prior to the actual processing.

Furthermore, the processor unit may also be designed to determine a diagrammatic expression, such as a curve, representing variation in the curvature of the bent elongated workpiece or product in response to variation in the longitudinal position of the elongated workpiece or product. The diagrammatic expression serves to assist evaluation or diagnosis on the shape of the final elongated product prior to the actual processing.

Additionally, the processor unit may be designed to simultaneously determine a relative rotation around the longitudinal axis of the elongated workpiece between the stable and movable dies in the bending apparatus, based on a torsional angle of the elongated product between the adjacent local coordinate systems.

When the bending apparatus is allowed to effect torsion on the elongated workpiece, any of the stable and movable dies is driven to rotate around the longitudinal axis of the elongated workpiece. The rotation induces torsion of the elongated workpiece between the stable and movable dies. in this case, the relative rotation between the stable and movable dies can be calculated based on the quantity of the interval defined between the stable and movable dies, and an angle of torsion per unit length specified along the direction of the longitudinal axis between the stable and movable dies. The angle of torsion per unit length can be calculated based on the torsional angle established in the elongated product between the adjacent local coordinate systems. Control on the rotation of the stable or/and movable die around the longitudinal axis based on the derived relative rotation enables formation of the twisted elongated product at a higher accuracy.

Here, the processor unit may be designed to determine a diagrammatic expression, such as a curve, representing variation in the relative rotation between the stable and movable dies in response to variation in the longitudinal position of the elongated workpiece. The diagrammatic expression serves to assist evaluation or diagnosis on the operation of the bending apparatus prior to the actual processing.

The shape data may be supplied to or introduced into the input device through any types of computer-readable media, such as a diskette (FD), a compact disk (CD), a digital video disk (DVD), for example, or through a network such as an LAN (local area network), a WAN (wide area network), the Internet, and the like.

BRIEF DESCRIPTION OF THE DRAWINGS

The above and other objects, features and advantages of the present invention will become apparent from the following description of the preferred embodiment in conjunction with the accompanying drawings, wherein:

FIG. 13 schematically illustrates an example of an NC program generated at the computer system;

DESCRIPTION OF THE PREFERRED EMBODIMENT

Figure 1:
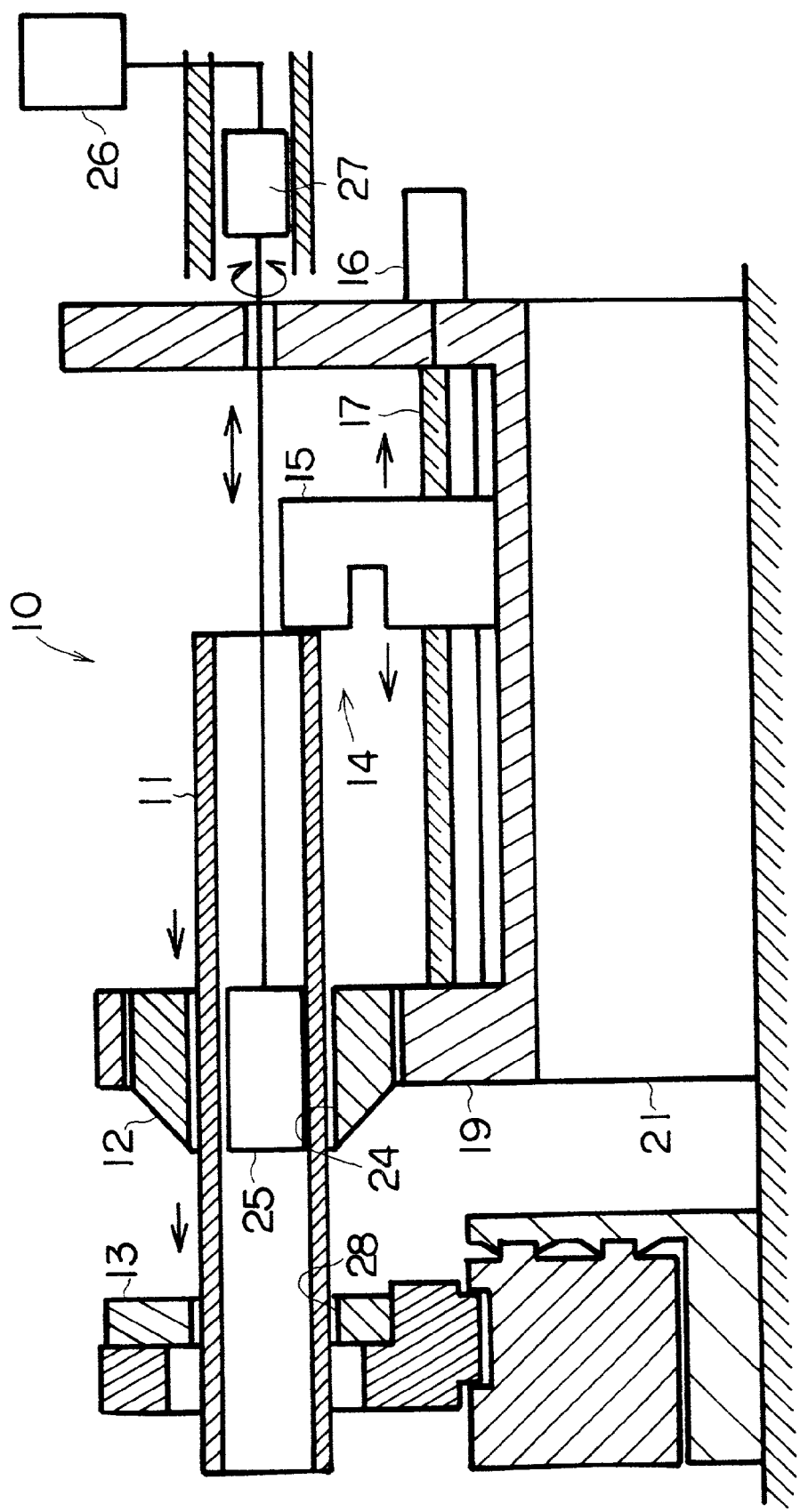
FIG. 1 is a vertical sectional view schematically illustrating the structure of a bending machine.

FIG. 1 schematically illustrates the structure of a bending apparatus or machine 10. The bending machine 10 includes a first or rear stable die 12 and a second or front movable die 13 designed to guide the advancement of an elongated workpiece 11 in combination with the stable die 12, and a feeder mechanism 14 designed to feed the elongated workpiece 11 to the stable and movable dies 12, 13. The bending machine 10 allows the movable die 13 to move or shift within a plane perpendicular to the direction of the advancement of the elongated workpiece 11, as described later in detail. The movement of the movable die 13 serves to effect bending on the elongated workpiece 11.

The feeder mechanism 14 includes a slider 15 designed to contact the rear end of the elongated workpiece 11, and a push rod or threaded rod 17 converting the rotation of a feed motor 16 to the advancement or driving force of the slider 15. A ball screw mechanism may be established between the threaded rod 17 and the slider 15. When the feed motor 16 drives the threaded rod 17 for rotation in a normal direction, the slider 15 is allowed to advance. To the contrary, the slider 15 is allowed to retreat or withdraw when the feed motor 16 drives the threaded rod 17 for rotation in the reverse direction. The advancement of the slider 15 causes the elongated workpiece 11 to advance. The quantity for the rotation of the threaded rod 17, namely, for the revolution of the driving shaft in the feed motor 16, determines the advancement amount of the slider 15, in other words, the feed speed of the elongated workpiece 17. The feed motor 16 may comprise a so-called servo motor, for example.

The bending machine 10 may be employed to machine any types of elongated workpieces such as solid bars or rods, hollow pipes, and the like. The hollow pipes may be represented by an aluminum extruded or shaped workpiece, a steel pipes, and the like. In general, the elongated workpiece 11 has a uniform sectional shape or form over its entire length. However, it is not necessary to keep the sectional shape constant or uniform along the entire length in the elongated workpiece 11.

Figure 2:
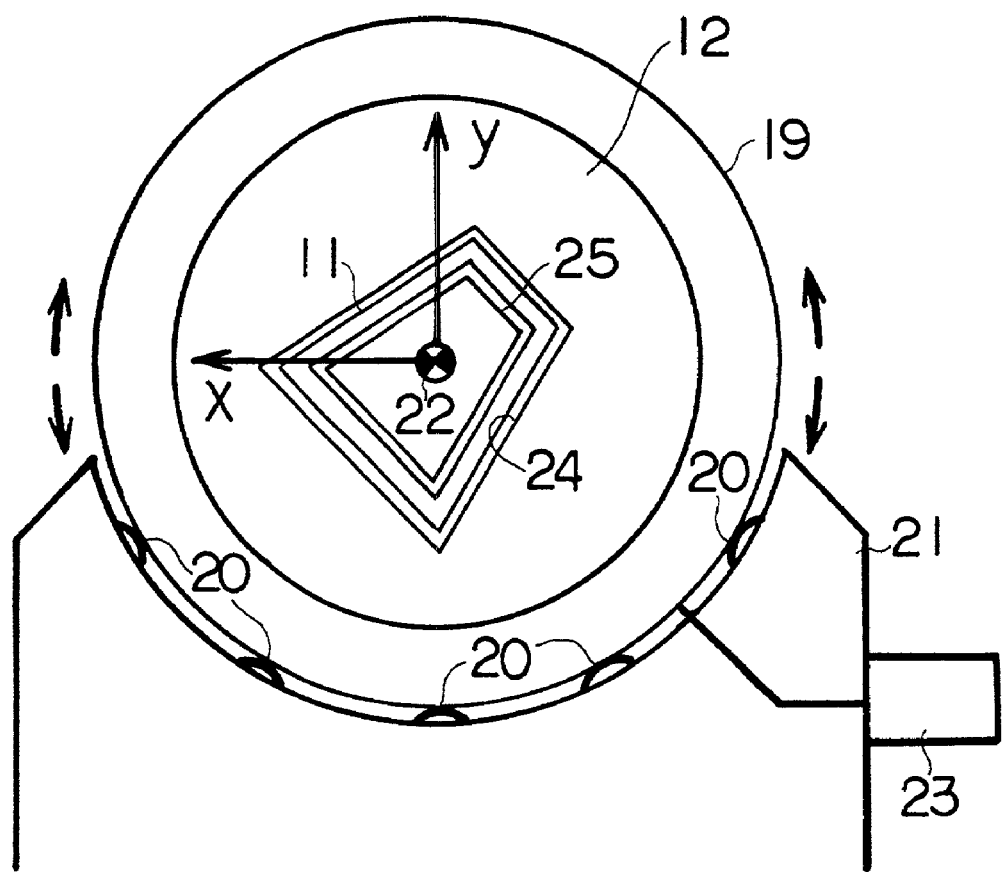
FIG. 2 is an enlarged front view of a stable die.

The feeder mechanism 14 and the stable die 12 are supported on a so-called roller member 19. As shown in FIG. 2, the roller member 19 is designed to have an outer cylindrical surface received on a stationary base 21 through bearings 20 arranged along a curved surface of the semi-cylinder. The roller member 19 allows the elongated workpiece 11 and the stable die 12 to rotate about the central axis 22 of the stable die 12. The rotation about the central axis 22 induces a relative rotation between the stable and movable dies 12, 13 around the longitudinal axis of the elongated workpiece 11, for example, as described later in detail. Such a relative rotation serves to effect torsion on the elongated workpiece 11 around the longitudinal axis of the elongated workpiece 11. A drive motor 23 such as a servo motor, for example, may be employed to drive the roller member 19 for rotation.

As shown in FIG. 2, a through hole 24 of the shape corresponding to the outline of the elongated workpiece 11 is defined in the stable die 12. The through hole 24 serves to guide the advancement of the elongated workpiece 11. As mentioned by the shape of the through hole 24 shown in FIG. 2, the section of the elongated workpiece 11 may take any shape, including a circle, an ellipse, a triangle and other polygons, any other simple and complicated shapes. The shape of the through hole 24 should correspond to the sectional shape of the elongated workpiece 11.

As is apparent from FIG. 2, when the hollow elongated workpiece 11 such as a pipe is to be machined, a core piece 25 is preferably inserted into the inner space within the hollow elongated workpiece 11 surrounded by the stable die 12. As conventionally known, the bending machine 10 usually induces a largest or maximum bending stress in the elongated workpiece 11 at the outlet of the through hole 24 in the stable die 12. Accordingly, the hollow elongated workpiece 11 may suffer from a crush in a direction perpendicular to the longitudinal axis at the edge of the through hole 24. The crush may generate a larger error in the quantity of deformation or magnitude of curvature in a final or resulting elongated product, or form a depression on the outer surface of a final elongated product. The aforementioned core piece 25 is designed to contact the inner surface of the hollow elongated workpiece 11 so as to avoid generation of a crush in a direction perpendicular to the longitudinal axis of the hollow elongated workpiece 11.

Referring again to FIG. 1, a control motor 26 is connected to the core piece 25 for causing the advancement and retreat of the core piece 25. The control motor 26 is operated to allow insertion and withdrawal of the core piece 25 into and out of the hollow elongated workpiece 11. In addition, a control motor 27 is also connected to the core piece 25 for causing the rotation of the core piece 25 around the central axis 22 of the stable die 12 in this embodiment. When the stable die 12 is driven to rotate about the central axis 22 in the aforementioned manner, the control motor 27 is operated to cause the core piece 25 to follow the rotation of the stable die 12. The control motors 26, 27 may comprise a so-called servo motor, for example.

Figure 3:
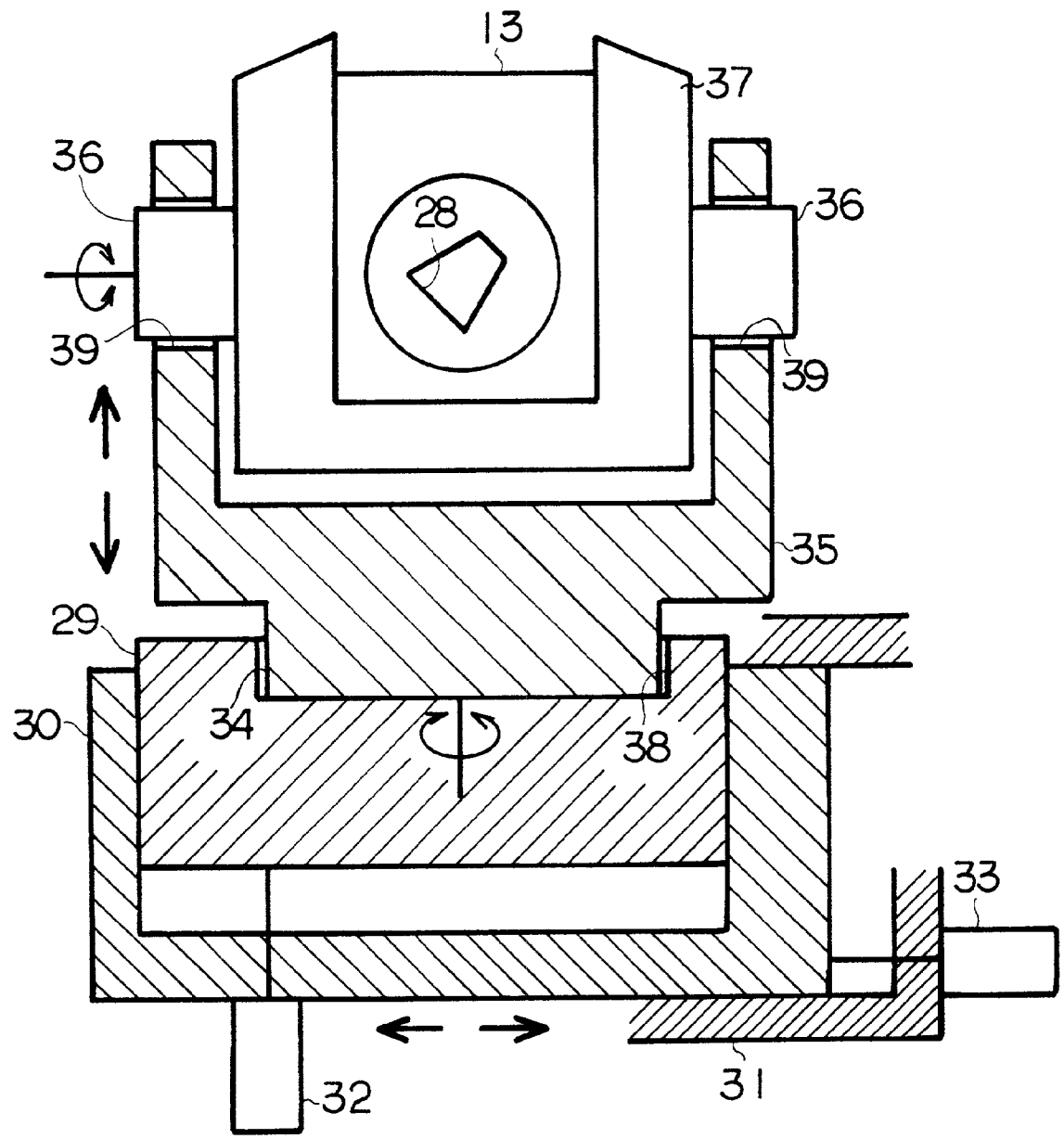
FIG. 3 is an enlarged front view of a movable die.

Referring to FIGS. 1 and 3, a through hole 28 of the shape corresponding to the outline of the elongated workpiece 11 is likewise defined in the movable die 13, similar to the stable die 12. The through hole 28 serves to guide the advancement of the elongated workpiece 11. It is preferable that the shape of the through hole 28 in the movable die 13 is identical to that of the through hole 24 in the stable die 12.

The movable die 13 is allowed to shift or move in a motion plane perpendicular to the extension to the central axis 22 of the stable die 12. Movement of the movable die 13 may be achieved by a combination of a vertical movement, realized by a first driven member 29, and a horizontal movement, realized by a second driven member 30, for example. The second driven member 30 is designed to receive the first driven member 29 for movement in the vertical direction. At the same time, the second driven member 30 is received in a guide member 31 for movement in a lateral or horizontal direction. The vertical movement of the first driven member 29 may be achieved by the driving force from a drive motor 32, while the horizontal movement of the second driven member 30 may be achieved by the driving force from a drive motor 33, for example. The drive motors 32, 33 may comprise a servo motor capable of controlling the revolution of its driving shaft by a fine pitch angle, or the like.

Moreover, the movable die 13 is allowed to change its attitude while moving within the motion plane. Such change in the attitude of the movable die 13 may be achieved by rotation of a rotative member 35 comprising a cylindrical support 34 extending in a vertical direction, and by rotation of a pivoted member 37 comprising a pair of pivots 36 extending in a horizontal direction. When the cylindrical support 34 is received in a cylindrical bore 38 defined in the first driven member 29, the rotative member 35 is allowed to rotate about a specific vertical axis. When the pivots 36 are received in corresponding support holes 39 defined in the rotative member 35, the pivoted member 37 is allowed to rotate about a specific horizontal axis. Drive motors, not shown, such as servo motors, may be employed to drive the rotative member 35 and the pivoted member 37, respectively. Here, it is preferable that the rotational axis of the pivots 36, corresponding to the specific horizontal axis, perpendicularly intersects the central axis of the cylindrical axis 34, corresponding to the specific vertical axis, on the extension of the central axis 22.

Figure 4:
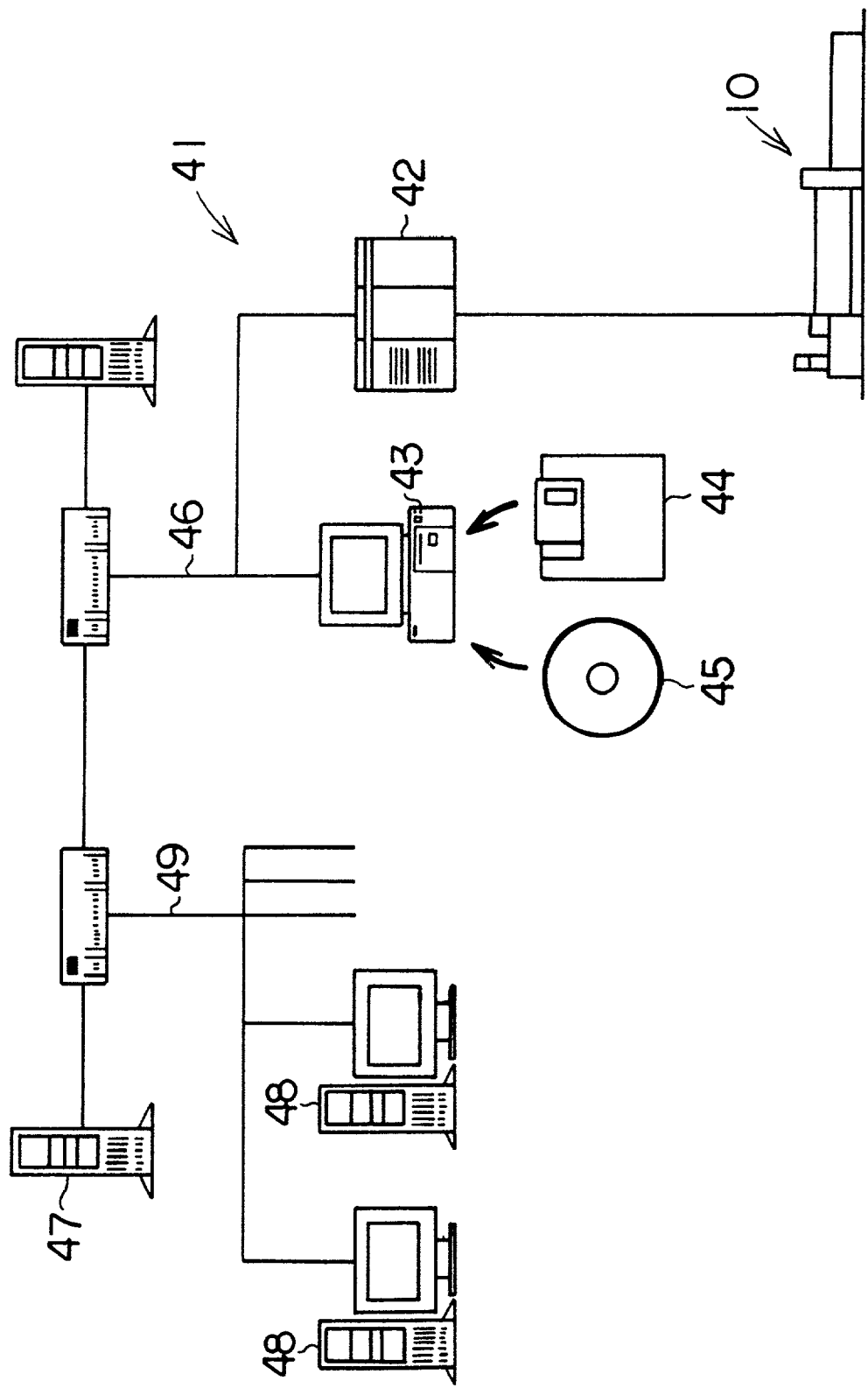
FIG. 4 is a schematic illustrating the entire structure of a bending machine system.
Figure 5:
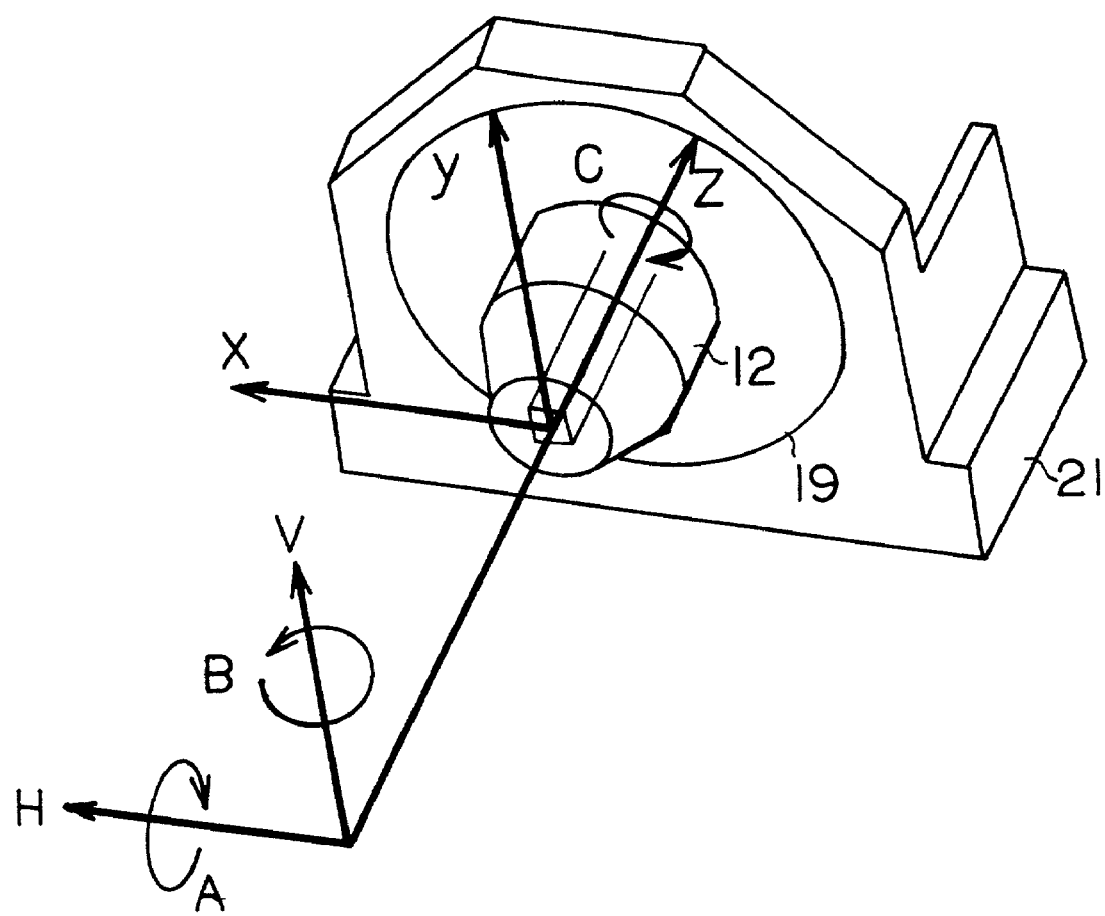
FIG. 5 is a perspective view schematically illustrating a machine coordinate system set on the stable die.

FIG. 4 schematically illustrates the entire structure of a bending machine system 41 incorporating the above-described bending machine 10. The bending machine system 41 includes an NC (numerical control) controller 42 adapted to control the operation of the bending machine 10. The NC controller 42 is designed to define a three-dimensional machine coordinate system xyz on the bending machine 10, as shown in FIG. 5, for example. The machine coordinate system xyz comprises the z-axis equivalent to the central axis 22 of the stable die 12, and the x- and y-axes specifying the vertical and horizontal directions of the stable die 12, respectively, along a plane including the outlet of the through hole 24. The attitude or motion of the stable die 12 rotative around the central axis 22 can be specified by a z-axis rotational angle C around the z-axis of the machine coordinate system xyz.

The motion plane HV for movement of the movable die 13 is preferably kept in parallel with the xy-plane of the machine coordinate system xyz. According to the motion plane HV of this attitude, the positions of the movable die 13 can simply be specified by the x- and y-coordinates of the machine coordinate system xyz. In this case, the z-coordinate for the positions of the movable die 13 may be specified based on the interval or distance between the stable and movable dies 12, 13. The interval is fixed at a constant distance irrespective of the shift or movement of the movable die 13.

For example, the original or datum position of the movable die 13 may be set at the intersection between the motion plane HV of the movable die 13 and the extension of the central axis 22, namely, the z-axis of the machine coordinate system xyz. When the movable die 13 is positioned right at the original position, the straight elongated workpiece 11, sequentially passing through the stable and movable dies 12, 13, is allowed to move forward along a straight path. The movable die 13 cannot effect a load on the elongated workpiece 11 in a direction perpendicular to the longitudinal axis of the elongated workpiece 11, so that no bending is induced in the elongated workpiece 11. According to the set original position of the movable die 13, the attitude of the movable die 13 can be specified by a y-axis rotational angle B around the V-axis of the motion plane HV and an x-axis rotational angle A around the H-axis of the motion plane HV, for example. Moreover, the longitudinal axis of the elongated workpiece 11 can be defined as the central axis 22 of the stable die 12 if the original position is established for the movable die 13 in the aforementioned manner.

Referring again to FIG. 4, the NC controller 42 is designed to receive an NC program generated at a computer system 43 such as an engineering workstation (EWS) and a high-performance personal computer. The NC program includes control data specifying the positions and attitude of the movable die 13 as well as the attitude of the stable die 12, all related to the feed speed or advancement amount of the elongated workpiece 11, for example. When the x- and y-coordinates are designated for the movable die 13 in the aforementioned machine coordinate system xyz, the NC controller 42 outputs corresponding instructions signals to the bending machine 10. The instructions signals may define data specifying the rotational angle or amount of the driving shaft in the drive motor 33, required to achieve a horizontal movement for the designated x-coordinate, and data specifying the rotational angle or amount of the driving shaft in the drive motor 32, required to achieve a vertical movement for the designated y-coordinate. In addition, when the y-axis and x-axis rotational angles B, A are designated for the movable die 13 in the machine coordinate system xyz, the NC controller 42 outputs corresponding instructions signals to the bending machine 10. The instructions signals may include data specifying the rotational angle or amount of the driving shaft in the drive motor, required to achieve the rotation of the rotative member 35 by the designated y-axis rotational angle B, and data specifying the rotational angle or amount of the driving shaft in the drive motor, required to achieve the rotation of the pivoted member 37 by the designated x-axis rotational angle A. Furthermore, when the z-axis rotational angle α is designated for the stable die 12 in the machine coordinate system xyz, the NC controller 42 outputs instructions signals to the bending machine 10. The instructions signals may include data specifying the rotational angle or amount of the driving shaft in the drive motor 23, required to induce the rotation of the roller member 19 by the designated z-axis rotational angle C.

The computer system 43 is designed to receive a shape data specifying the shape of an elongated product within a unitary overall three-dimensional coordinate system XYZ. Any portable storage medium, such as a diskette (FD) 44, a compact disk (CD) 45, a digital video disk (DVD), not shown, can be employed to supply the shape data to the computer system 43. Otherwise, the computer system 43 may receive the shape data through a network 46 such as a local area network (LAN), a wide area network (WAN), the Internet, and the like.

In case where the computer system 43 is adapted to capture the shape data through the network 46, the shape data may be stored or registered in a product database installed in a server machine 47. The product database may contain CAD (computer-aided design) data of products designed on CAD terminals 48, for example. Any portable storage medium, such as a diskette (FD), a compact disk (CD), a digital video disk (DVD), can be employed to supply the CAD data to the product database. Otherwise, the product database may receive the CAD data through a wired or wireless network 49.

Figure 6:
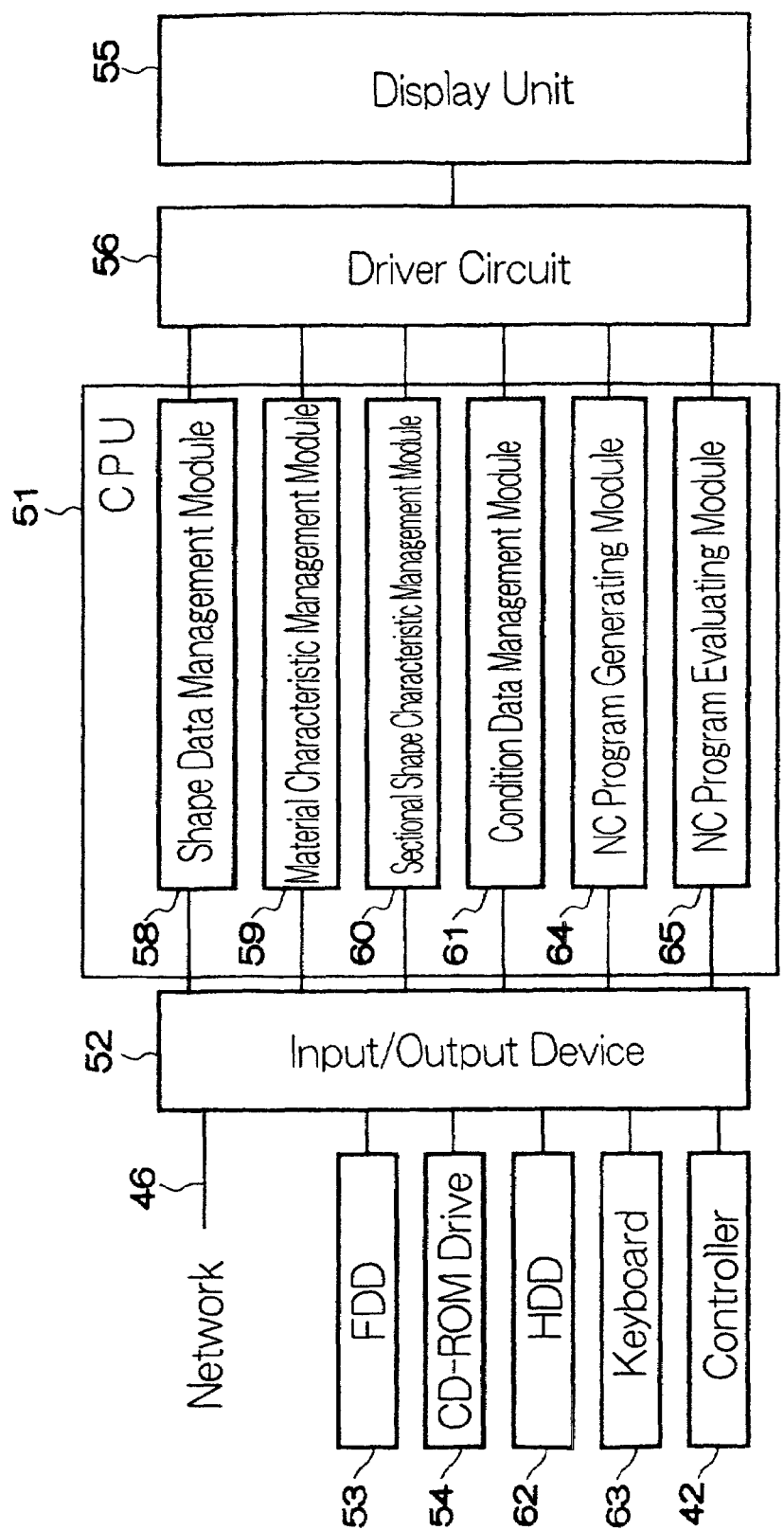
FIG. 6 is a block diagram schematically illustrating the structure of a computer system.

As shown in FIG. 6, the computer system 43 comprises a CPU (central processing unit) 51 for implementing a software program for a CAD system, for example. An input/output device 52 is connected to the CPU 51. The input/output device 52 may be employed to supply the shape data to the CPU 51. The input/output device 52 may capture the shape data from the server machine 47 through the network 46, for example. Otherwise, the input/output device 52 may capture the shape data, out of the FD 44 slotted in a diskette drive (FDD) 53, out of the CD 45 likewise slotted in a CD-ROM drive 54, and the like.

A display unit 55 is designed to display on a screen two- and three-dimensional graphic images or projections of the elongated product based on the shape data, character images for text data required for manipulation of the CAD system, and the like. A driver circuit 56 controls the display of the images on the screen of the display unit 55 in accordance with instructions from the CPU 51.

The CPU 51 comprises a shape data management module 58 designed to manage the shape data received from the input/output device 52. The shape data management module 58 may serve to supply a graphic information such as the two- and three-dimensional graphic images of the elongated product specified in the shape data.

A material characteristic management module 59 is designed to obtain mechanical property data specifying the mechanical property such as a strain-stress diagram for the material of the elongated workpiece 11. A sectional shape characteristic management module 60 is designed to determine the sectional characteristics, originating in the sectional shape of the elongated product, such as the centroid or the center of gravity $\underline{G}$, the area moment of inertia $\underline{I}_x$, $\underline{I}_y$, the product moment of inertia $\underline{I}_{xy}$, the polar moment of inertia of area $\underline{I}_p$, and the like, for the cross-section of the elongated product, based on the shape data. In addition, a condition data management module 61 is designed to obtain condition data specifying the conditions of the bending machine 10, such as an interval between the stable and movable dies 12, 13 and the feed speed of the elongated workpiece 11. A hard disk drive (HDD) 62 is designed to store a data file containing the mechanical property data, a data file containing sectional characteristic data specifying the aforementioned sectional characteristics, and a data file containing the condition data. The input/output device 52 may be used to transfer the data files to the HDD 62. A keyboard 63, a mouse, not shown, and the like, are connected to the input/output device 52. Manipulation of the keyboard 63 and the mouse may help obtaining the mechanical property of the elongated workpiece 11 and the conditions of the bending machine 10, and calculating the sectional characteristics of the elongated product, as described later in detail.

An NC program generating module 64 is designed to generate the NC program based on the data files stored in the HDD 62. The generated NC program in the form of a data file is stored in the HDD 62, for example. The NC program in the HDD 62 can be transferred to the NC controller 42 through the input/output device 52. The NC program may be displayed on the screen of the display unit 55.

An NC program evaluating module 65 is adapted to evaluate or diagnose the NC program generated at the NC program generating module 64. The NC program evaluating module 65 is designed to calculate a diagrammatic expression, such as a curve, specifying a periodical or progressive variation in the x- and y-coordinates for the position of the movable die 13 within the machine coordinate system $\underline{xyz}$, a diagrammatic expression, such as a curve, specifying a periodical or progressive variation in the y-axis and x-axis rotational angles $\underline{B}$, $\underline{A}$ for the attitude of the movable die 13 within the machine coordinate system $\underline{xyz}$, as well as, a diagrammatic expression, such as a curve, specifying a periodical or progressive variation in the z-axis rotational angle $\underline{C}$ for the attitude of the stable die 12 around the central axis 22 within the machine coordinate system $\underline{xyz}$. Accordingly, the obtained diagrammatic expressions serve to specify the variation in the position and attitude of the movable die 13 and the variation in the attitude of the stable die 12, respectively, in response to the advancement amount or position of the elongated workpiece 11. The NC program evaluating module 65 may also calculate a diagrammatic expression, such as a curve, specifying variation in the curvature of the resulting elongated product or machined workpiece 11 in response to the advancement amount or position of the elongated workpiece 11. Any of the diagrammatic expressions calculated at the NC program evaluating module 65 may be displayed on the screen of the display unit 55 with the assistance of the driver circuit 55, for example.

Figure 7:
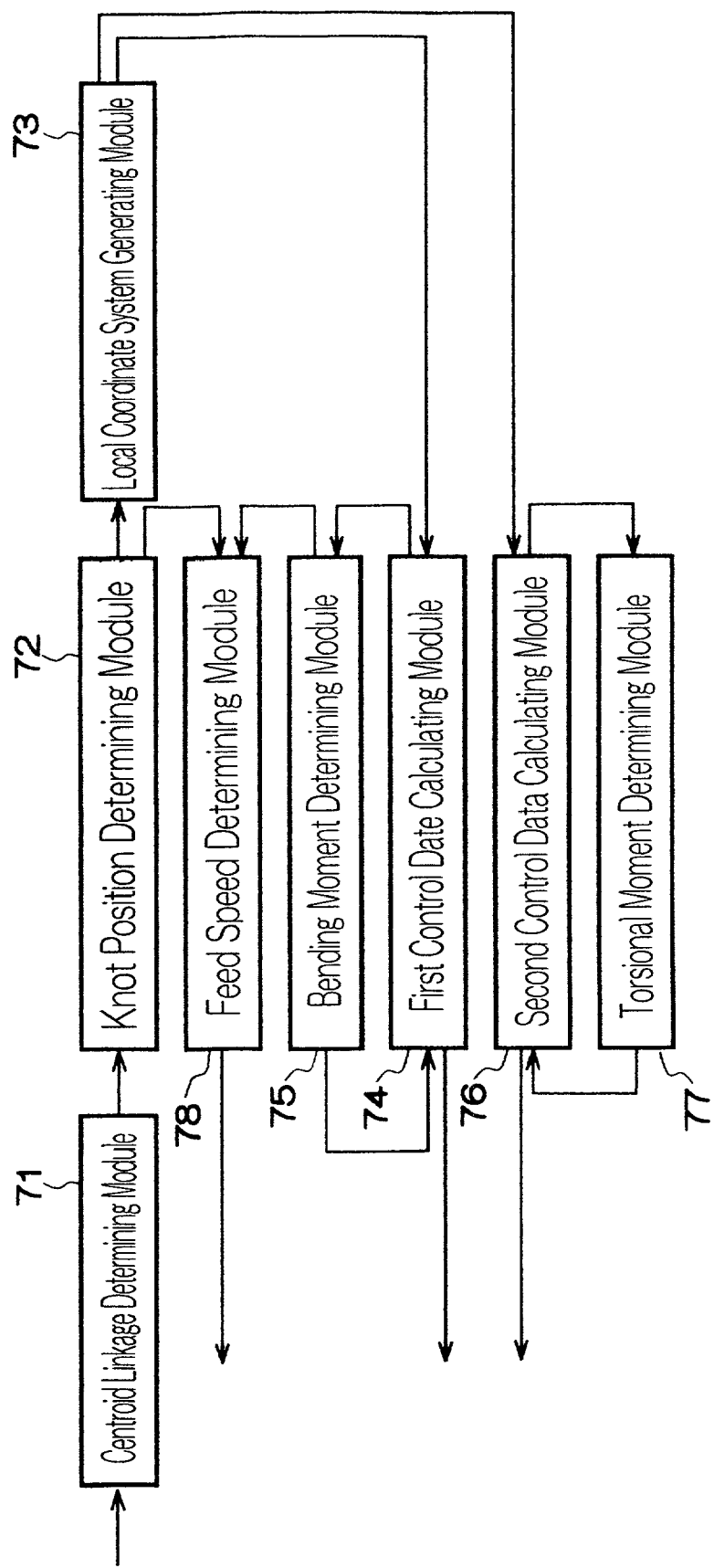
FIG. 7 is a block diagram schematically illustrating the structure of an NC program generating module in a CPU of the computer system.

The NC program generating module 64 comprises, as shown in FIG. 7, a centroid linkage determining module 71 designed to generate the linkage of the centroids or a centroidal line for the elongated product based on the centroids or centers of gravity, specified in the sectional characteristic data, and the three-dimensional image of the elongated product specified by the shape data, for example. The centroidal line defines the positions of the centroid or center of gravity for the respective cross-sections of the elongated product over its entire length. A knot position determining module 72 is designed to determine the position of knots or nodes on a parametric curve, such as a Beziers curve, a B-spline curve and a NURBS (non-uniform rational B-spline) curve, indicative of the centroidal line. The concept of the knots will be described later in detail.

A local coordinate system generating module 73 is designed to generate a local coordinate system, namely, the machine coordinate system $\underline{xyz}$ on the three-dimensional image of the elongated product. The local coordinate system is defined for the respective knots on the centroidal line. In establishing the local coordinate system, the local coordinate system generating module 73 operates to superpose the xy-plane of the machine coordinate system $\underline{xyz}$ onto the respective cross-sections of the elongated product.

A first control data calculating module 74 is designed to determine or calculate control data specifying the position and attitude of the movable die 13 based on the centroidal line and the machine coordinate systems $\underline{xyz}$ set on the respective cross-sections of the elongated product. The x- and y-coordinates serve to indicate the position of the movable die 13 within the respective machine coordinate systems $\underline{xyz}$. The y-axis and x-axis rotational angles $\underline{B}$, $\underline{A}$ serve to indicate the attitude of the movable die 13 within the respective machine coordinate systems $\underline{xyz}$.

A bending moment determining module 75 is designed to determine or calculate a bending moment for the elongated product based on the position of the movable die 13 determined in the machine coordinate system $\underline{xyz}$. The bending moment is determined for every machine coordinate system $\underline{xyz}$. In calculating the bending moment, the bending moment determining module 75 refers to the strain-stress diagram of the elongated workpiece 11 specified in the mechanical property data. The first control data calculating module 74 is capable of modifying or compensating the x- and y-coordinates and the y-axis and x-axis rotational angles $\underline{B}$, $\underline{A}$ based on the bending moment determined at the bending moment determining module 75.

A second control data calculating module 76 is designed to determine or calculate control data specifying the attitude of the stable die 12 around the central axis 22 based on the torsional angle of the elongated product around the longitudinal axis of the elongated product between the adjacent machine coordinate systems $\underline{xyz}$. The attitude of the stable die 12 corresponds to the relative rotation established between the stable and movable dies 12, 13 around the longitudinal axis of the elongated workpiece 11, namely, the z-axis rotational angle C.

A torsional moment determining module 77 is designed to determine or calculate a torsional moment or torque for the elongated product based on the relative rotation determined between the stable and movable dies 12, 13 in the machine coordinate system $\underline{xyz}$. The torsional moment or torque is determined for the respective machine coordinate systems $\underline{xyz}$. In calculating the torsional moment, the torsional moment determining module 77 determines the distribution of shearing stress over the entire area of the cross-section based on the strain-stress diagram. The second control data calculating module 76 is capable of modifying or compensating the z-axis rotational angle $\underline{C}$ based on the torsional moment determined at the torsional moment determining module 77.

A feed speed determining module 78 is designed to determine or calculating intervals between the respective pairs of the adjacent knots based on the position of the knots generated at the knot position determining module 72. The interval is measured between the adjacent knots along the centroidal line. The feed speed or advancement amount of the elongated workpiece 11 can be determined based on the measured intervals for the knots. In determining the feed speed, the feed speed determining module 78 is capable of modifying or compensating the feed speed based on the bending moment determined at the bending moment determining module 75.

Figure 8:
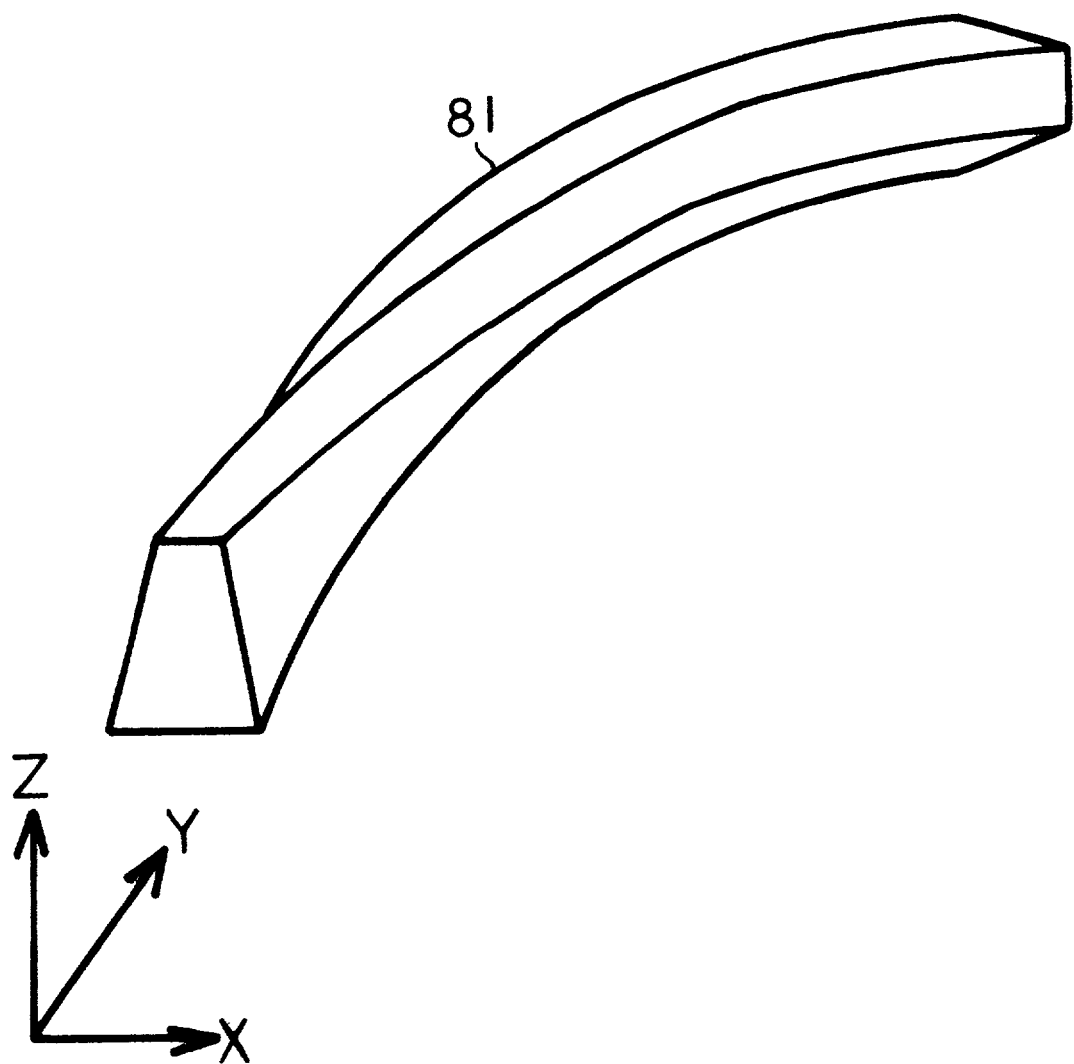
FIG. 8 is a perspective view schematically illustrating the shape of an elongated product.
Figure 9:
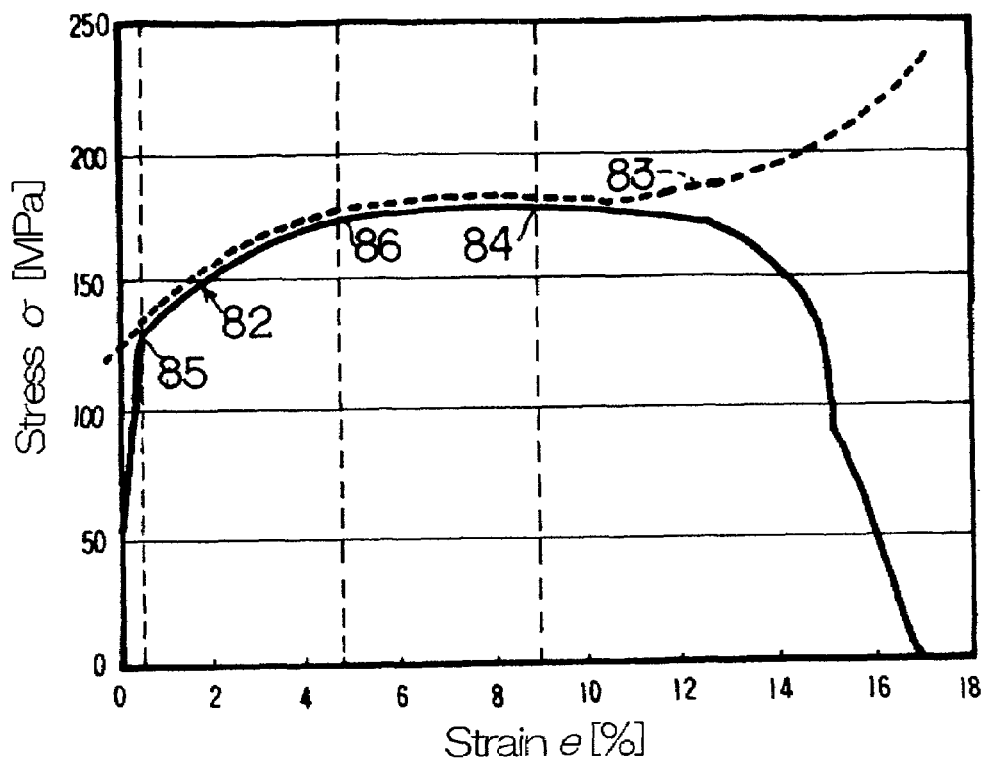
FIG. 9 is a graph illustrating a stress-strain diagram of the material for the elongated product.

Now, assume that bending and torsion are to be effected on an extruded elongated workpiece of a constant sectional shape so as to produce a resulting product, namely, a bent and torsional elongated product 81, as shown in FIG. 8, for example. After the elongated product 81 has been designed on the CAD system, the CAD data of the elongated product 81 is stored in the product database. The CAD data may contain at least the shape data specifying the shape of the elongated product 81 within the unitary overall or world coordinate system XYZ. The shape data may contain a two-dimensional data specifying the sectional shape of the elongated product 81, and a three-dimensional data specifying the degrees of bending and torsion of the elongated product 81 over its entire length, for example. The degrees of bending and torsion can be expressed by a set of curves or edge lines passing through corresponding or identical points of the successive cross-sections of the elongated product 81. The two- and three-dimensional data may be obtained based on data of the wire frame modeling, the surface modeling, the solid modeling, or the like.

The shape data management module 58 of the CPU 51 captures the shape data of the elongated product 81 out of the product database in response to manipulation of the keyboard 63 and/or the mouse. The projection of the three-dimensional shape and the images of the sectional shape for the elongated product 81 can be displayed on the screen of the display unit 55. The captured shape data may be stored in the HDD 62 as a data file.

The material characteristic management module 59 then urges an operator to input the strain-stress diagram of the material, namely, the elongated workpiece 11, in accordance with guidance or instructions displayed on the screen of the display unit 55. The strain-stress diagram or curve may be represented by the following expression:

$$\sigma = C3 \cdot e^3 + C2 \cdot e^2 + C1 \cdot e + C0 \quad (1)$$

Here, coefficients C3, C2, C1, C0 can be determined based on an effective strain-stress diagram 82 obtained from a tension test. Specifically, the polynomial expression (1) serves to specify an approximate curve 83 representative of the effective strain-stress diagram 82. The solution to the coefficients C3, C2, C1, C0 can be calculated in a facilitated manner based on three specific points, such as the maximum stress or tensile strength point 84, the yield point 85, and an intermediate point 86 arbitrarily selected between the tensile strength point 84 and the yield point 85, obtained from the actual measurement of the tension test. The operator is allowed to manipulate the keyboard 63 so as to input the value for the Young's modulus or modulus of longitudinal elasticity E of the elongated workpiece 11, and the values of the strain and stress for the tensile strength point 84, the yield point 85 and the intermediate point 86, respectively, for example. The Young's modulus E and the coefficients C3, C2, C1, C0 for the polynomial expression (1) are stored in the HDD 62 as the mechanical property data.

Figure 10:
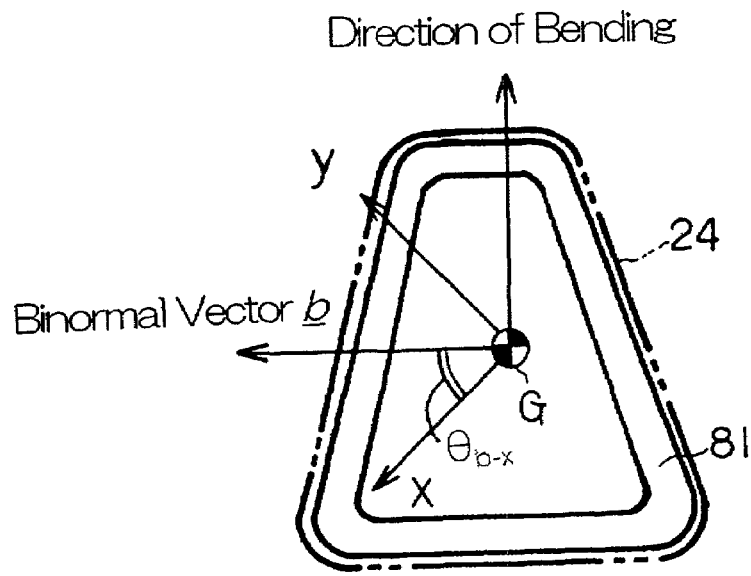
FIG. 10 is an enlarged plan view schematically illustrating the machine coordinate system defined on the cross-section of the elongated product.

The sectional shape characteristic management module 60 then urges the operator to superpose the xy-plane of the machine coordinate system xyz on the cross-section of the elongated product 81 with the assistance of the display unit 55, as shown in FIG. 10, for example. Manipulation of the mouse may be employed to set the machine coordinate system xyz on the cross-section in this manner. The orientation of the x- and y-axes of the machine coordinate system xyz may arbitrarily be determined in view of the shape of the through hole 24 defined in the stable die 12. The origin of the xy-plane or the machine coordinate system xyz is preferably set at the centroid or center of gravity G for the cross-section. The sectional shape characteristic management module 60 is designed to calculate the area moment of inertia around the x-axis $I_x$, the area moment of inertia around the y-axis $I_y$, the product moment of inertia $J_{xy}$, the polar moment of inertia of area $I_p$ based on the set xy-plane, as follows:

$$\begin{aligned} I_x &= \int_A y^2 \, dA \\ I_y &= \int_A x^2 \, dA \\ J_{xy} &= \int_A xy \, dA \\ I_p &= \int_A (x^2 + y^2) \, dA = I_y + I_x \end{aligned} \quad (2)$$

The obtained area moment of inertia $I_x$, $I_y$, product moment of inertia $J_{xy}$, and polar moment of inertia of area $I_p$ may be stored in the HDD 62 as the sectional characteristic data.

The condition data management module 61 then captures the condition data specifying the conditions of the bending machine 10, such as the interval between the stable and movable dies 12, 13 and the feed speed, with the assistance of the display unit 55, for example. Manipulation of the keyboard 63 may be utilized to input the values of the interval and the feed speed. The condition data may be stored in the HDD 62.

When the shape data, the mechanical property data, the sectional characteristic data and the condition data have been prepared, the NC program generating module 64 starts generating an NC program. In generating the NC program, the NC program generating module 64 relates the two-dimensional data, specifying the sectional shape of the elongated product 81, to the three-dimensional data specifying the degree of bending and torsion of the elongated product 81. The NC program generating module 64 may provide the operator with manipulation through a GUI (graphic user interface), for example, in relating.

Figure 11:
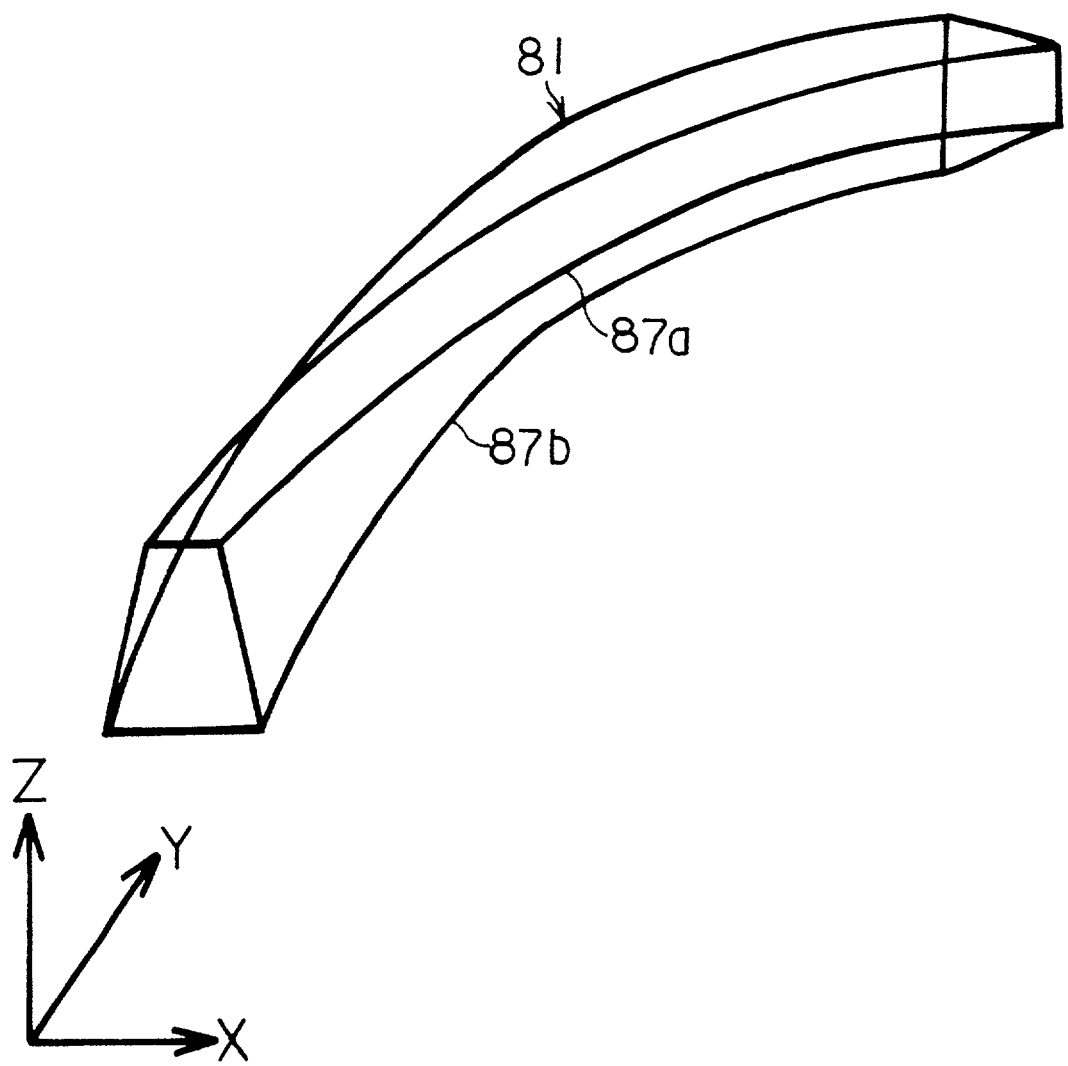
FIG. 11 is a perspective view schematically illustrating edge lines of the elongated product in accordance with a three-dimensional data.
Figure 12:
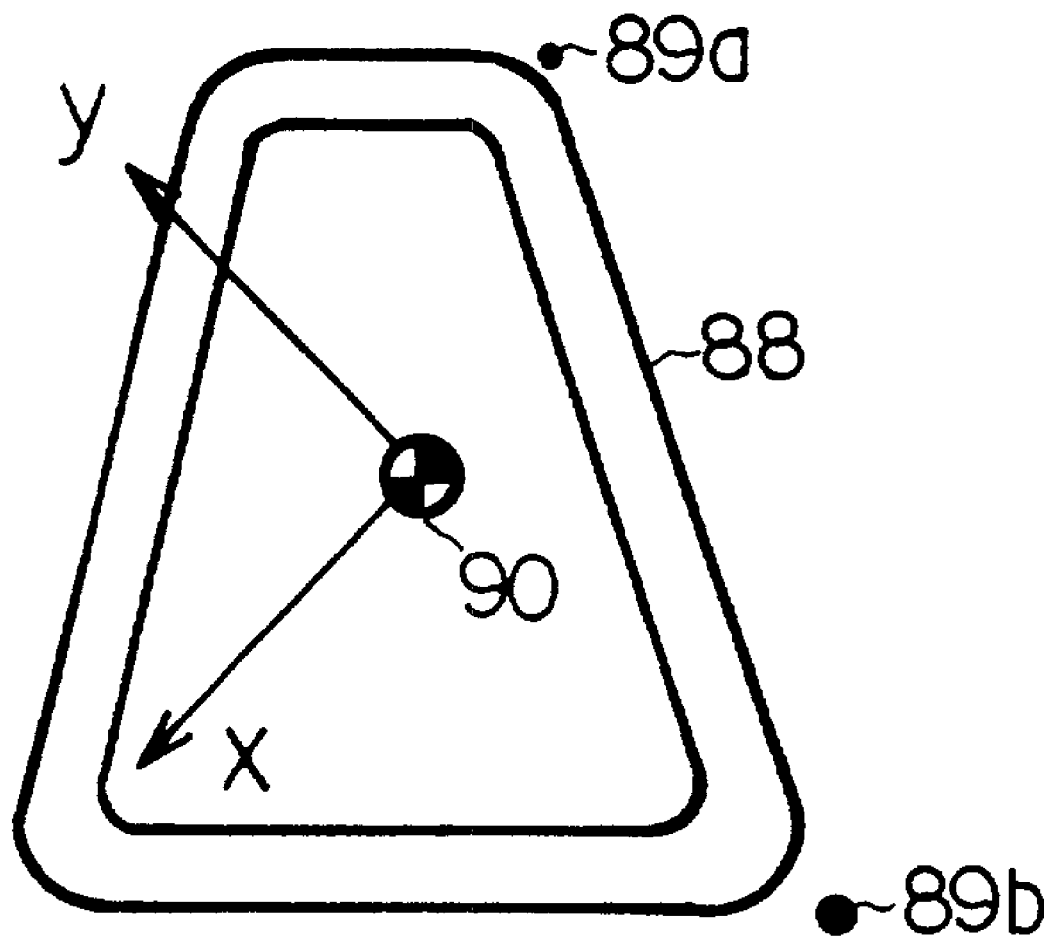
FIG. 12 is a plan view schematically illustrating the sectional shape of the elongated product in accordance with a two-dimensional data.

Specifically, the operator is allowed to arbitrarily designate first and second guide lines 87a, 87b, in this sequence, on the image of the elongated product 81 displayed on the screen of the display unit 55, as shown in FIG. 11. The guide lines 87a, 87b may correspond to the edge lines, for example. The operator is also allowed to designate first and second guide points 89a, 89b, likewise in this sequence, on the image of the sectional shape 88 displayed on the screen of the display unit 55, as shown in FIG. 12. According to the sequence of the designation, the first guide line 87a and the first guide points 89a are related to each other, while the second guide line 87b and the second guide point 89b are related to each other. Manipulation of the mouse may be employed to achieve the designation. Here, as is apparent from illustrations in FIGS. 11 and 12, it should be noted that the respective edge lines are generated based on the edges which have not been subjected to chamfering. Such edges without chamfer may be obtained in the process of designing the sectional shape 88 in the CAD system.

After a pair of the guide lines 87a, 87b and a pair of the guide points 89a, 89b have been related to each other, respectively, the NC program generating module 64 calculates and generates the NC program, as shown in FIG. 13, for example. The process of generating the NC program will be described later in detail. The generated NC program may be stored in the HDD 62.

According to the resulting NC program shown in FIG. 13, the elongated workpiece 11 is allowed to advance and pass through the stable and movable dies 12, 13, in this sequence, at a constant feed speed F=6000 mm/min. When the elongated workpiece 11 has reached the longitudinal position W= −1424.000 mm, the movable die 13 is driven to move from the original position, namely, the origin of the motion plane HV to the position specified by the x-coordinate X=0.000 mm and the y-coordinate Y0.446 mm. The movable die 13 is simultaneously driven to take the attitude specified by the y-axis rotational angle B=0.000[deg] and the x-axis rotational angle A=0.159[deg]. Here, it should be noted that the starting point of measurement for the longitudinal position W of the elongated workpiece 11 is set at the fully retreated position or standby position of the slider 15. The standby position is in general established when the elongated workpiece 11 is first set or mounted on the bending machine 10 prior to machining. The set starting point of the longitudinal position W in this manner allows decrease in the z-coordinate, specifying the longitudinal position W, as the slider 15 advances to drive the elongated workpiece 11 forward.

Subsequently, when the elongated workpiece 11 has reached the longitudinal position W=−1504.072 mm, the movable die 13 likewise reaches the position specified by the x-coordinate X=0.000 mm and the y-coordinate Y=4.409 mm. The movable die 13 is likewise driven to take the attitude specified by the y-axis rotational angle B=0.000[deg] and the x-axis rotational angle A=3.157 [deg]. For example, when the elongated workpiece 11 has reached the longitudinal position W=−1601.907 mm, the movable die 13 reaches the position specified by the x-coordinate X=0.090 mm and the y-coordinate Y=8.515 mm. The movable die 13 is again driven to take the attitude specified by the y-axis rotational angle B=−0.065[deg] and the x-axis rotational angle A=6.092[deg]. At the same time, the stable die 12 is driven to rotate about the central axis 22 so as to take the attitude defined by the z-rotational axis C=0.7091 [deg]. In this manner, when the elongated workpiece 11 reaches the respective longitudinal positions W, the movable die 13 is caused to move to the position specified by the x- and y-coordinates X, Y, and simultaneously take the attitude specified by the y-axis and x-axis rotational angles B, A. Moreover, a relative rotation specified by the z-axis rotational angle C can be established between the stable and movable dies 12, 13. Variation in the x- and y-coordinates X, Y as well as the y-axis, x-axis and z-axis rotational angles B, A, C may be kept at a constant speed between the adjacent longitudinal positions W.

Figure 14:
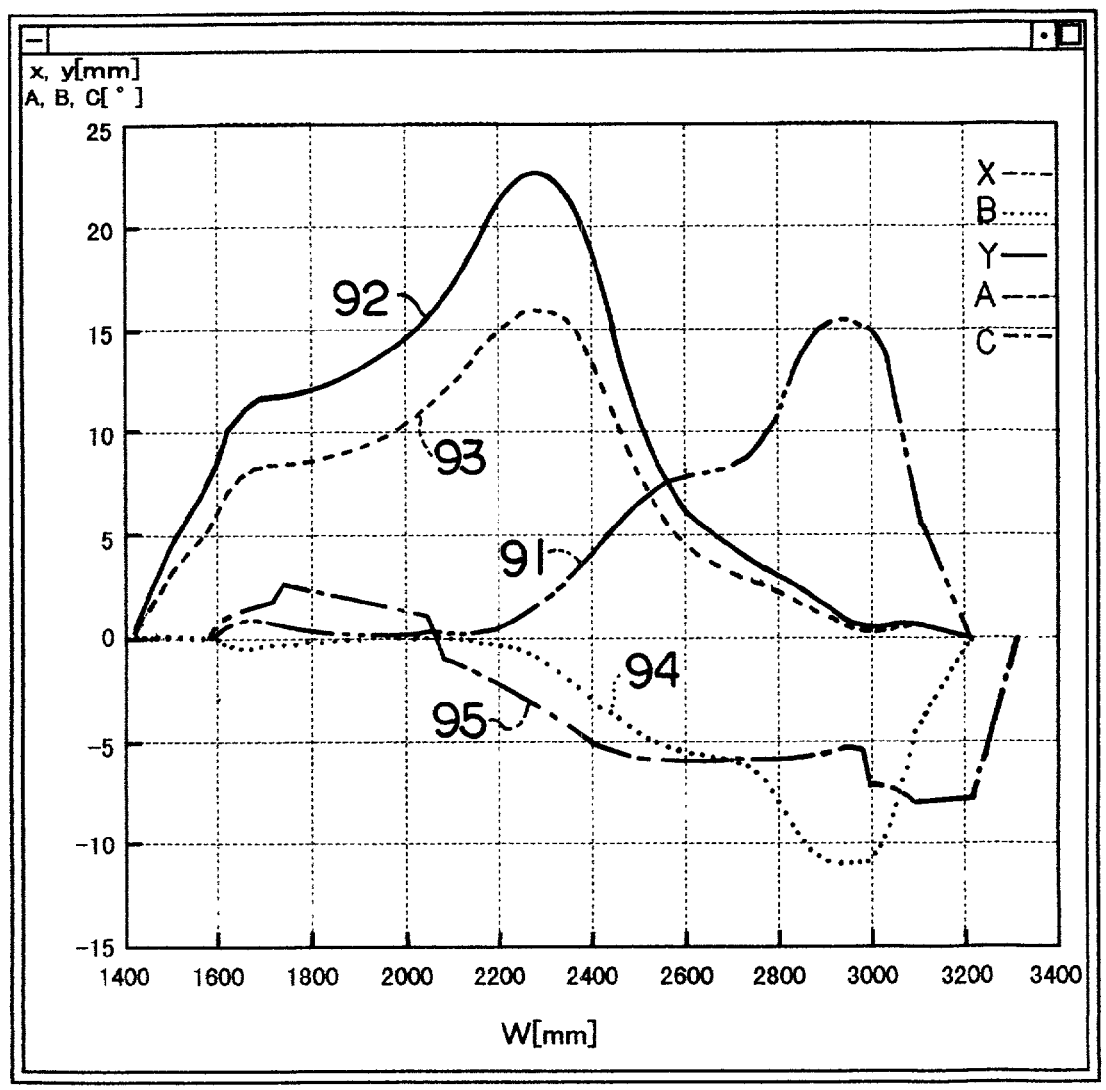
FIG. 14 is a graph illustrating curve lines for variation in the x- and y-coordinates and x-axis, y-axis and z-axis rotational angles, respectively.

Prior to transfer to the NC controller 42, the NC program may be subjected to evaluation or diagnosis at the NC program evaluating module 65. The NC program evaluating module 65 is designed to plot the values of the x- and y-coordinates X, Y as well as the values of the y-axis, x-axis and z-axis rotational angles B, A, C, for the respective longitudinal positions W of the elongated workpiece 11, as shown in FIG. 14, for example. The values of the x-coordinate X serves to provide a diagrammatic expression or curve graph 91. Likewise, the values of y-coordinate Y as well as the x-axis, y-axis and z-axis rotational angles A, B, C, serve to provide diagrammatic expressions or curve graphs 92, 93, 94, 95, respectively. The curve graphs 91–95 may be displayed on the screen of the display unit 55 for observation of the operator.

Based on the curve graphs 91–95, the operator can evaluate or diagnose whether or not the designed bending and/or torsion can be realized. Specifically, if the smooth and continuous curve graphs 91–95 appear, as shown in FIG. 14, it can be confirmed that the bending machine 10 is allowed to surely operate according to the resulting NC program. On the other hand, if the gradients of the curve graphs 91, 92 exceed the maximum speed of the first and second driven members 29, 30, the bending machine 10 cannot follow the resulting NC program so as to effect bending on the elongated work piece 11. Likewise, if the gradient of the curve graph 95 exceeds the maximum rotation speed of the roller member 19, the bending machine 10 cannot follow the resulting NC program, either, so as to effect torsion on the elongated workpiece 11.

Figure 15:
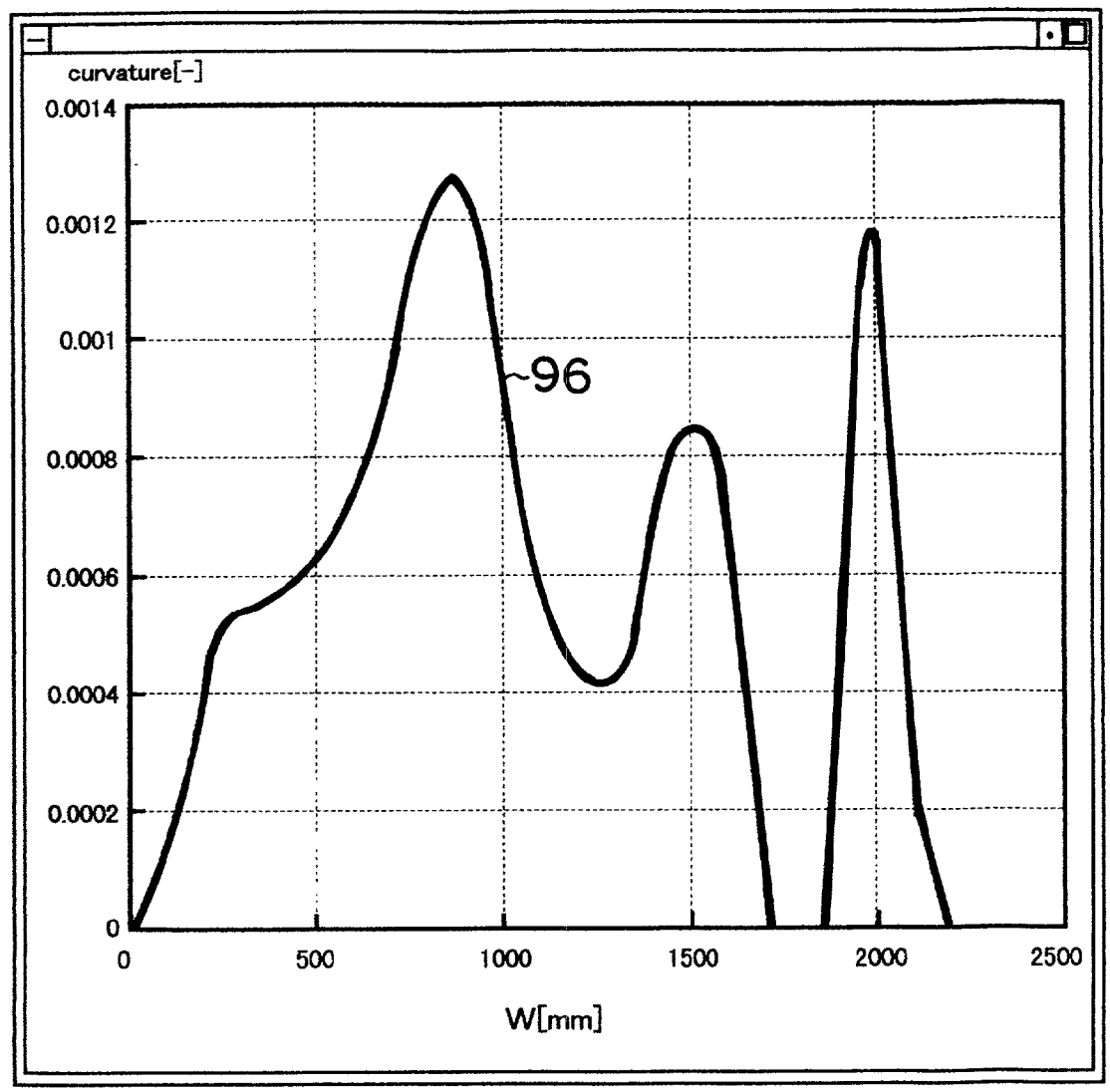
FIG. 15 is a graph illustrating the relationship between the curvature and the longitudinal position $\underline{W}$ of the elongated workpiece.

In addition, the NC program evaluating module 65 may calculate variation in the curvature of the resulting elongated product for the respective longitudinal positions W of the elongated workpiece 11. The values of curvature may be plotted for the respective longitudinal positions W, as shown in FIG. 15, for example. The plotted values of the curvature serve to provide a diagrammatic expression or curve graph 96. The curve graph 96 may likewise be displayed on the screen of the display unit 55. Based on the curve graph 96, the operator possibly predicts the shape of the resulting elongated product.

Next, a detailed description will be made on the operation of the NC program generating module 64. When the two-dimensional data, specifying the sectional shape of the elongated product 81, is related to the three-dimensional data, specifying the degrees of bending and torsion of the elongated product 81, in the aforementioned manner, the centroid linkage determining module 71 in the NC program generating module 64 serves to specify a linkage of the centroids or a centroidal line for the elongated product 81. The centroid linkage determining module 71 is designed to first obtain the positional relationship between the guide points 89a, 89b and the centroid or center of gravity 90, as shown in FIG. 12, for example.

Figure 16:
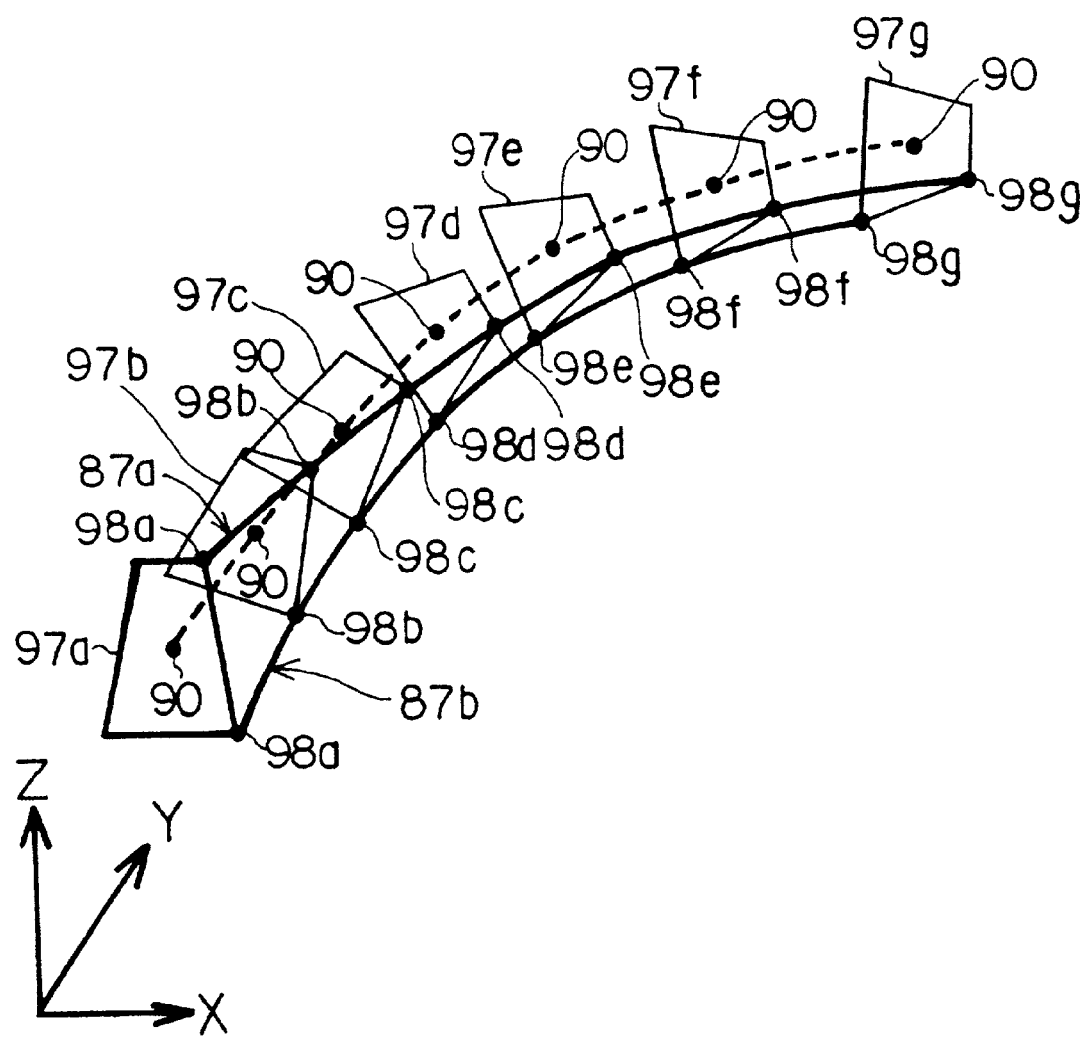
FIG. 16 schematically illustrates the relationship between the edge lines and the centroidal line or longitudinal axis in the elongated product.

The centroid linkage determining module 71 subsequently defines a plurality of sectional planes 97a–97g based on the edge lines or first and second guide lines 87a, 87b specified in the three-dimensional data, as shown in FIG. 16. In setting the sectional planes 97a–97g, the centroid linkage determining module 71 may divide the first and second guide lines 87a, 87b into segments of a uniform length, respectively. The respective sectional planes 97a–97g are intersected by the first and second guide lines 87a, 87b at corresponding split points 98a–98g defined between the adjacent segments. The sectional planes 97a–97g are kept perpendicular to lines tangent to the first and second guide lines 87a, 87b at the split points 98a–98g. The first guide points 89a can be defined on the respective sectional planes 97a–97g at the intersections between the sectional planes 97a–97g and the first guide line 87a. Likewise, the second guide points 89b can be defined on the respective sectional planes 97a–97g at the intersections between the sectional planes 97a–97g and the second guide line 87b.

Figure 17:
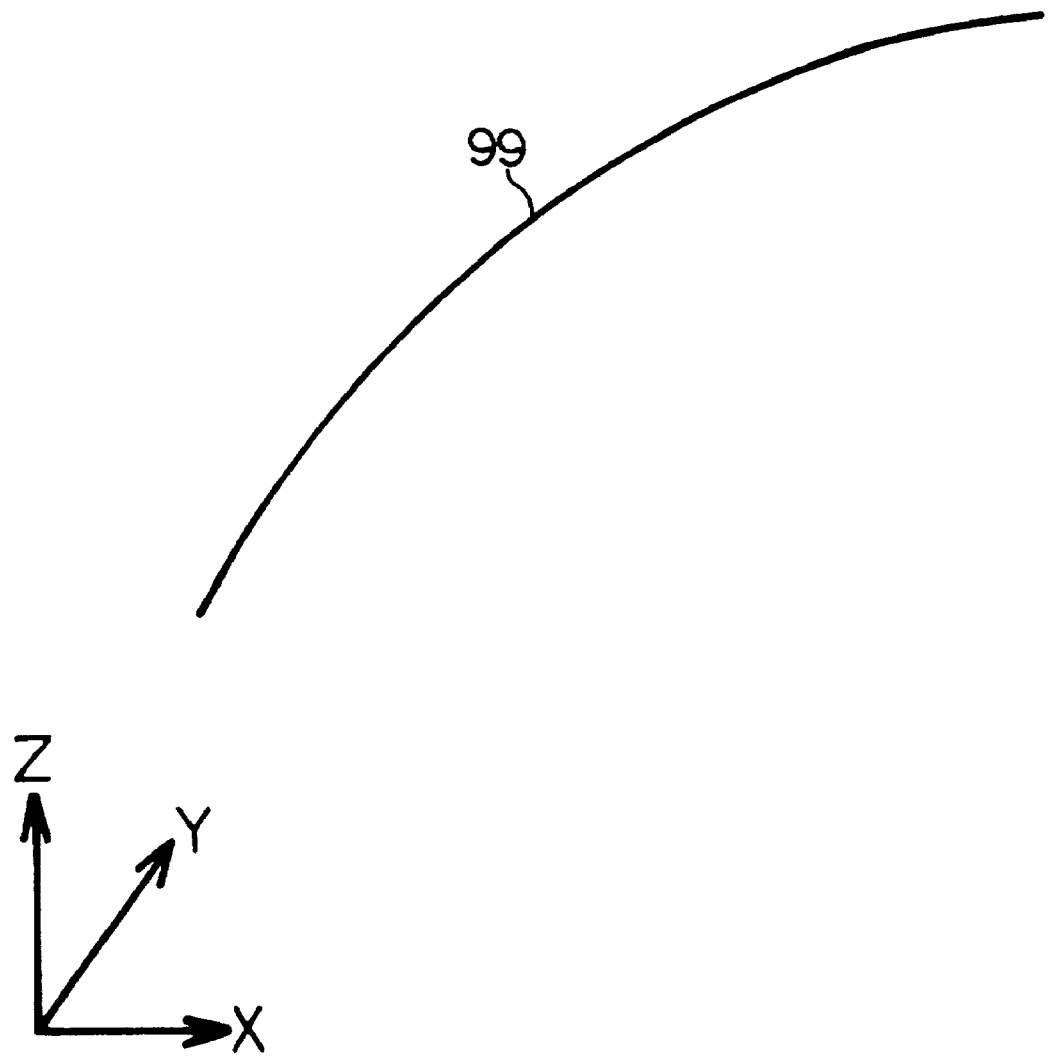
FIG. 17 schematically illustrates the centroidal line or longitudinal axis of the elongated product within the overall coordinate system.

When the first and second guide points 89a, 89b have been derived on the respective sectional planes 97a–97g in the above-described manner, the centroid linkage determining module 71 starts to determine the positions of the centroid 90 on the respective sectional planes 97a–97g, based on the positional relationship between the guide points 89a, 89b and the centroid 90. The determined centroids 90 are sequentially linked to establish the centroidal line 99, as shown in FIG. 17, for example. Consideration to the continuity of the curvature leads to establishment of a smooth curve for the centroidal line 99 at a higher accuracy. Otherwise, reduction in the intervals between the adjacent centroids 90 or the sectional planes 97a–97g serve to improve the accuracy of the centroidal line 99. The centroidal line 99 expresses the degree of bending or curvature for the elongated product 81.

Figure 18:
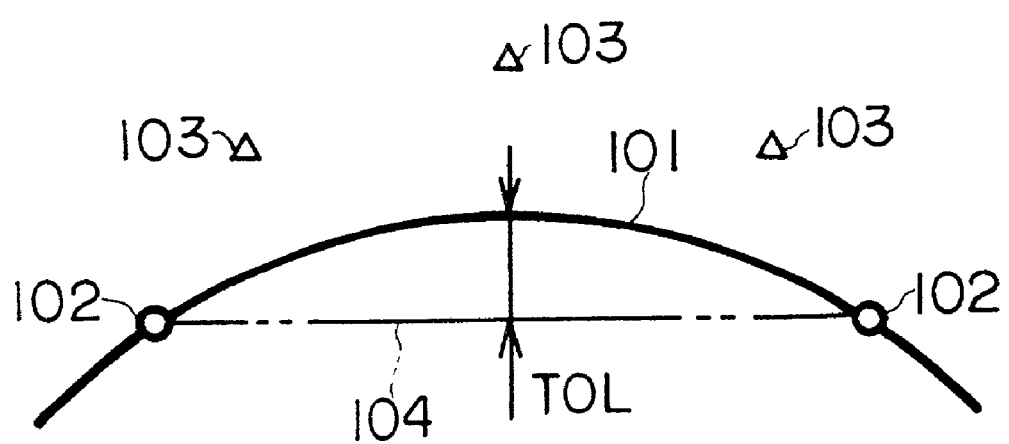
FIG. 18 schematically illustrates the relationship between the centroidal line in the form of a parametric curve and control points thereof.

The centroidal line 99 may be expressed by a parametric curve, such as a Beziers curve, a B-spline curve, a NURBS curve, and the like. As conventionally known, the curvature of the parametric curve 101 can be controlled by a plurality of control points 102, 103, as shown in FIG. 18, for example. Some of the control points 102, 103 inevitably correspond to a so-called knot 102. The "knot" is defined as a point specifying the coordinate of the parametric curve 101. The location of the knot 102 can be determined based on a deviation or tolerance TOL between the parametric curve 101 and a straight line 104 passing through the adjacent knots 102. Since the tolerance TOL is kept constant, the interval between the adjacent knots 102 is reduced or narrowed when the parametric curve 101 has a larger curvature, while the adjacent knots 102 are forced to recede from each other when the parametric curve 101 has a smaller curvature to the contrary. Moreover, a larger tolerance TOL allows a larger interval between the adjacent knots 102, while a smaller tolerance TOL causes the adjacent knots 102 to approach each other.

Figure 19:
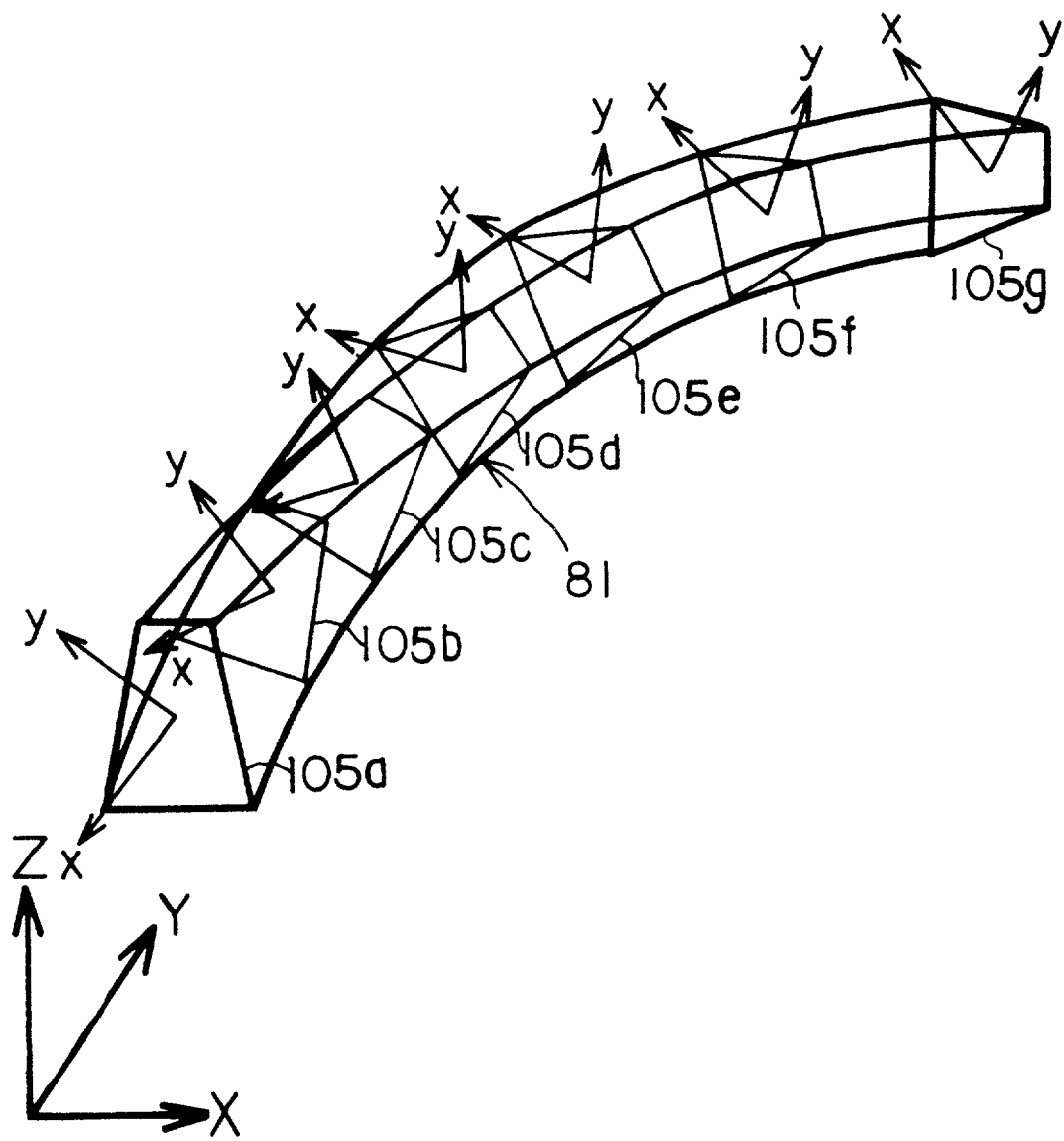
FIG. 19 is a perspective view schematically illustrating the machine coordinate systems $\underline{xyz}$ defined on the respective cross-sections of the elongated product.

When the knots 102 have been determined on the centroidal line 99 in the above-described manner, the local coordinate system generating module 73 then defines local or machine coordinate systems xyz within the world or overall coordinate system XYZ, as shown in FIG. 19. The respective local coordinate systems serve to specify the stable die 12 on the three-dimensional shape or image of the elongated product 81 in the overall coordinate system XYZ. The machine coordinate system xyz is preferably established on each of cross-sections 105a–105g. The cross-sections 105a–105g are defined for the respective knots 102 determined on the centroidal line 99 in the aforementioned manner.

Figure 20:
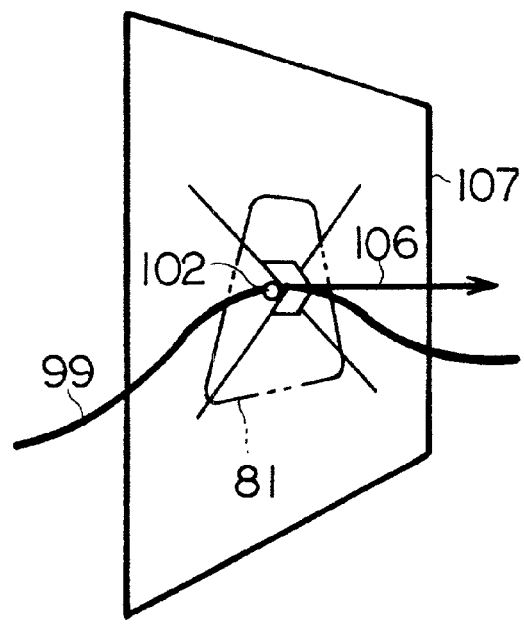
FIG. 20 is a perspective view schematically illustrating a vector utilized to define the cross-section based on the centroidal line.

In determining the cross-sections 105a–105g, the local coordinate system generating module 73 is adapted to calculate a vector 106 tangent to the centroidal line 99 at each of the knots 102, as shown in FIG. 20, for example. A sectional plane 107 perpendicularly intersected by the vector 106 can be defined at each of the knots 102. The sectional plane 107 serves to outline the cross-sections 105a–105g of the elongated product 81. Here, the positional relationship between the through hole 24 in the stable die 12 and the machine coordinate system xyz can be obtained, as shown in FIG. 10, with the assistance of the sectional shape characteristic management module 60.

The cross-sections 105a–105g are derived in the above-described manner based on the centroidal line 99 in the form of a parametric curve. In this case, the larger the curvature of the elongated product 81 gets, the larger number of the cross-sections 105a–105g can be obtained. Increased numbers of cross-sections 105a–105g lead to a fine and accurate control for the motion of the movable die 13. Moreover, the number of cross-sections 105a–105g can intentionally be increased or decreased depending on the dimensional accuracy required in the elongated product 81. An intentional decrease or increase in the aforementioned tolerance TOL can be employed to achieve the increase or decrease of the cross-sections 105a–105g.

Figure 21:
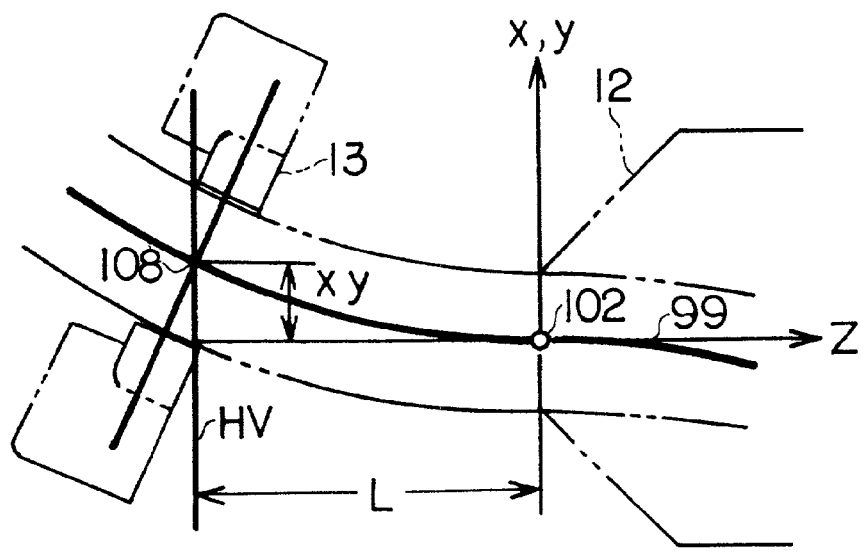
FIG. 21 schematically illustrates the position of the movable die based on the centroidal line in the machine coordinate system $\underline{xyz}$.

When the machine coordinate system xyz have been set on the respective cross-sections 105a–105g, the first control data calculating module 74 then derives the positions and attitudes of the movable die 13, as shown in FIG. 21, based on the centroidal line 99. The first control data calculating module 74 is designed to first define the interval L between the stable and movable dies 12, 13 within the machine coordinate system xyz. The interval L can be measured from the outlet of the through hole 24 in the stable die 12 to the movable die 13 at the original position, along the central axis 22 of the stable die 12. The interval L may be captured from the data file of the condition data.

The first control data calculating module 74 subsequently defines the motion plane HV for the movable die 13 within the machine coordinate system xyz, based on the determined interval L. the first control data calculating module 74 may be designed to define the z-coordinate, corresponding to the interval L, in the machine coordinate system xyz. The xy-plane of the machine coordinate system xyz may be subjected to translation operation along the z-axis by the amount corresponding to the interval L. When the motion plane HV has been set in this manner, the first control data calculating module 74 calculates the x- and y-coordinates of the intersection 108 between the motion plane HV and the centroidal line 99. The thus calculated x- and y-coordinates indicate a geometric position of the movable die 13. The geometric position of the movable die 13 simply reflects the three-dimensional shape of the elongated product 81 specified solely by the shape data.

Figure 22:
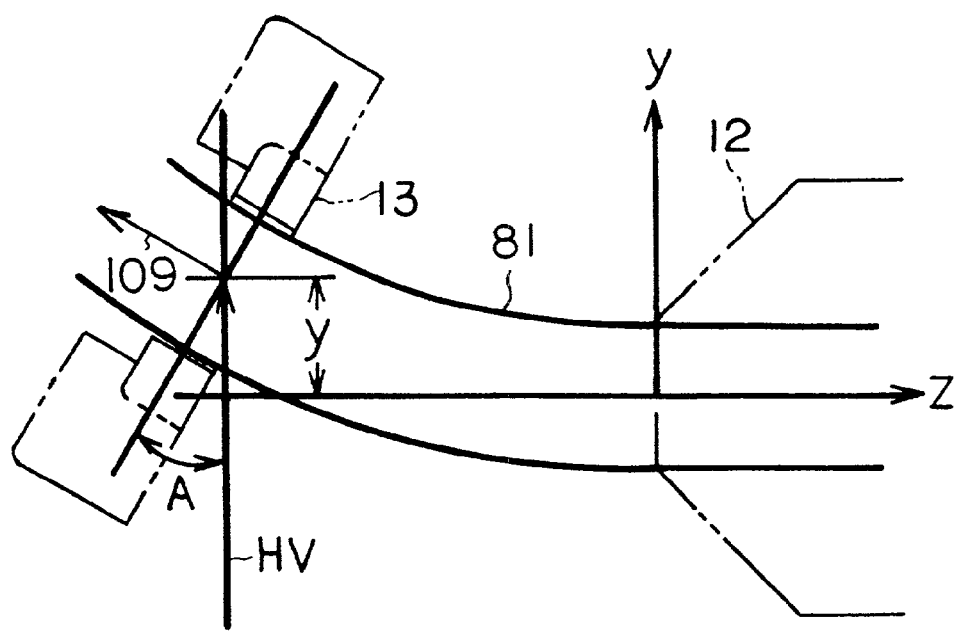
FIG. 22 schematically illustrates the y-coordinate of the position based on the projection of the elongated product on the yz-plane of the machine coordinate system $\underline{xyz}$.
Figure 23:
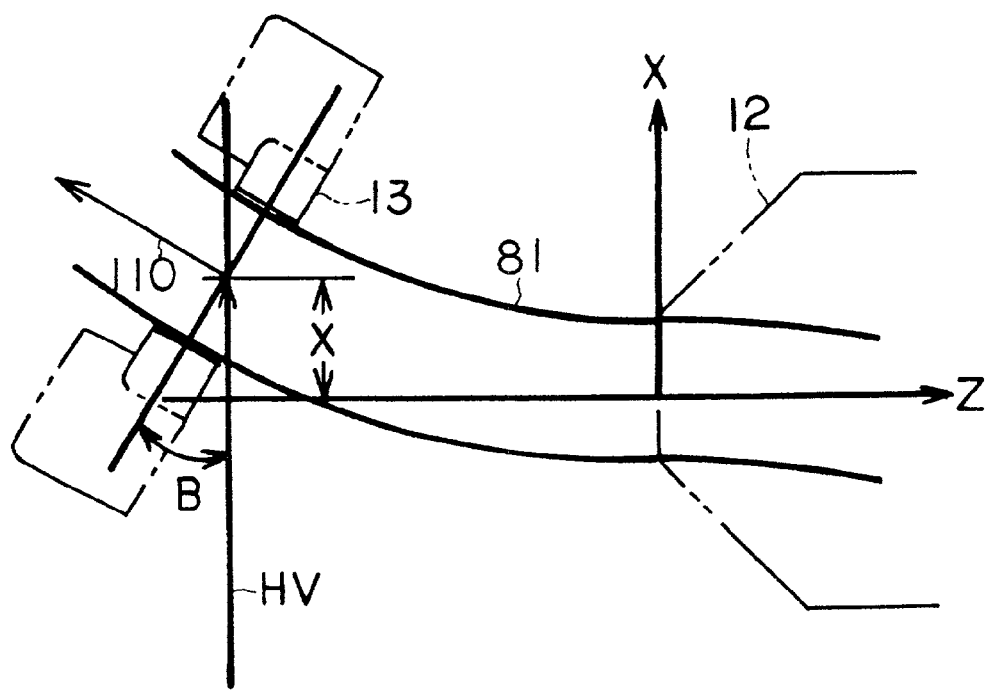
FIG. 23 schematically illustrates the x-coordinate of the position based on the projection of the elongated product on the xz-plane of the machine coordinate system $\underline{xyz}$.

When the machine coordinate system xyz is employed to derive the x- and y-coordinates specifying the position of the movable die 13 in the above-described manner, the three-dimensional shape of the elongated product 81 may be projected onto the yz- and xz-planes of the machine coordinate system xyz, respectively. As shown in FIG. 22, for example, if the three-dimensional shape or image of the elongated product 81 is projected on the yz-plane of the machine coordinate system xyz, the y-coordinate can be determined at the intersection between the motion plane HV and the projection of the elongated product 81, including the centroidal line 99. In this case, if the tangent direction 109 to the elongated product 81 or the centroidal line 99 can be defined on the motion plane HV, the x-axis rotation angle A can also be calculated for the movable die 13. On the other hand, as shown in FIG. 23, if the three-dimensional shape or image of the elongated product 81 is projected on the xz-plane of the machine coordinate system xyz, the x-coordinate can be determined at the intersection between the motion plane HV and the projection of the elongated product 81, including the centroidal line 99. If the tangent direction 110 to the elongated product 81 or the centroidal line 99 can be defined on the motion plane HV, the y-axis rotation angle B can also be calculated for the movable die 13.

On the other hand, the bending moment determining module 75 is adapted to in parallel calculate a bending moment M applied to the elongated workpiece 11 for the respective machine coordinate systems xyz. The bending moment determining module 75 first derives the curvature 1/R of the elongated product 81 specified in accordance with the shape data. The curvature 1/xyz R may be defined at the outlet of the through hole 24 in the stable die 12 within the machine coordinate system xyz. A planar coordinate system for specifying the radius R of curvature may be defined along a plane including the origin of the machine coordinate system xyz and the geometric position of the movable die 13.

Figure 24:
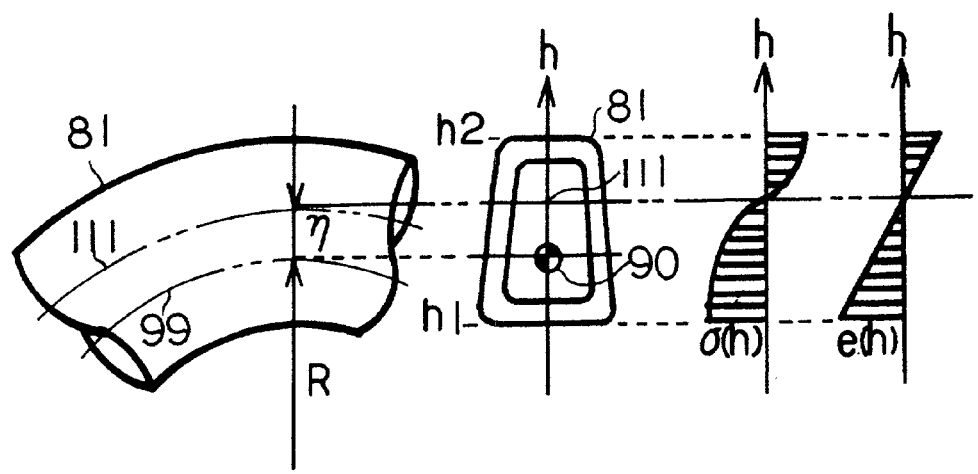
FIG. 24 schematically illustrates a nominal stress and strain distributions for the cross-section of the elongated product.

After the curvature 1/R has been determined, the bending moment determining module 75 determines a nominal stress distribution σ(h) and a nominal strain distribution e(h) along the cross-section of the elongated product 81 or the elongated workpiece 11 in the process of machining. As shown in FIG. 24, the nominal strain distribution e(h) exhibits a linear variation along the direction of the radius R of curvature on the cross-section of the elongated product 81 or the elongated workpiece 11. Accordingly, the nominal strain distribution e(h) can geometrically be derived from the positional relationship between the centroid 90 and the neutral axis 111 on the cross-section. Specifically, if a deviation η can be defined between the neutral axis 111 and the centroid 90 in the direction of the radius R of curvature, assuming that the centroidal line 99 is described by the radius R of curvature, the nominal strain distribution e(h) can be expressed as follows:

$$e(h) = \frac{h}{R+\eta} \quad (3)$$

A variable h indicates the distance from the neutral axis 111 along the direction of the radius R of curvature. And also, according to the aforementioned expression (1), the nominal stress distribution σ(h) can be expressed as follows:

$$\sigma(h) = C3 \cdot e(h)^3 + C2 \cdot e(h)^2 + C1 \cdot e(h) + C0 \quad (4)$$

The bending moment M can be calculated in accordance with the following expression:

$$M = \int_{h1}^{h2} \sigma(h) h \, dA \quad (5)$$

A representation A indicates the area of the cross-section for the elongated product 81 or elongated workpiece 11, as conventionally known.

Figure 25:
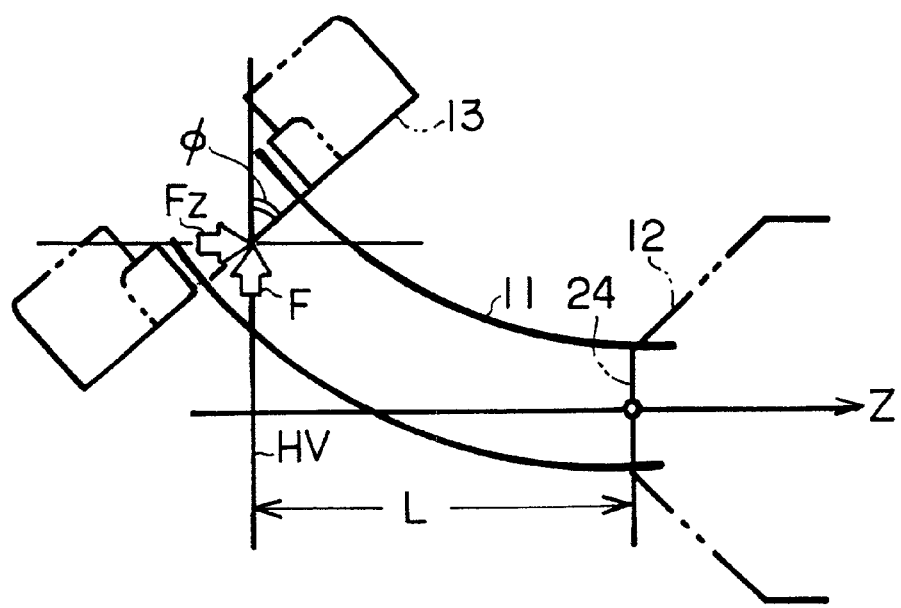
FIG. 25 schematically illustrates the concept of a load applied to the movable die from the reaction of the elongated workpiece.

In determining the bending moment M, the bending moment determining module 75 calculates the deviation η. Here, assume that the elongated workpiece 11 has been subjected to a bending deformation under the action of the movable die 13, as shown in FIG. 25, for example. The movable die 13 receives a load F of the reaction from the elongated workpiece 11 in the direction of the radius R of curvature. If an axial compressive force Pc can be defined in the elongated workpiece 11 at the outlet of the through hole 24 in the stable die 12, the following expression can be established:

$$Pc = Fz = F\tan\phi = \frac{M}{L}\tan\phi \quad (6)$$

The axial compressive force Pc corresponds to the total sum of the nominal stress distribution σ(h) along the cross-section of the elongated workpiece 11 at the outlet of the through hole 24 in the stable die 12. Accordingly, if the curvature 1/R is established at the outlet of the through hole 24, the following expression can be established:

$$Pc = \int_{h1}^{h2} \sigma(h) \, dA \quad (7)$$

On the other hand, the bending moment M can be expressed in accordance with the expression (5), so that the expression (6) can be subjected to substitution based on the expressions (5) and (7).

$$\int_{h1}^{h2} \sigma(h) \, dA = \frac{\int_{h1}^{h2} \sigma(h) h \, dA}{L} \tan\phi \quad (8)$$

The expression (8) can be arranged as follows:

$$\int_{h1}^{h2} \sigma(h)\left(1 - \frac{h}{L}\tan\phi\right) dA = 0 \quad (9)$$

The bending moment determining module 75 subsequently implements numerical integration in accordance with the expression (9). In implementation, the bending moment determining module 75 subjects the expression (9) to substitution based on the relationship between the curvature 1/R and the deviation η in accordance with the expressions (3) and (4). The numerical integration and convergent calculation after the substitution serve to reveal a solution to the deviation η between the centroid 90 and the neutral axis 111 on the specific cross-section.

Figure 26:
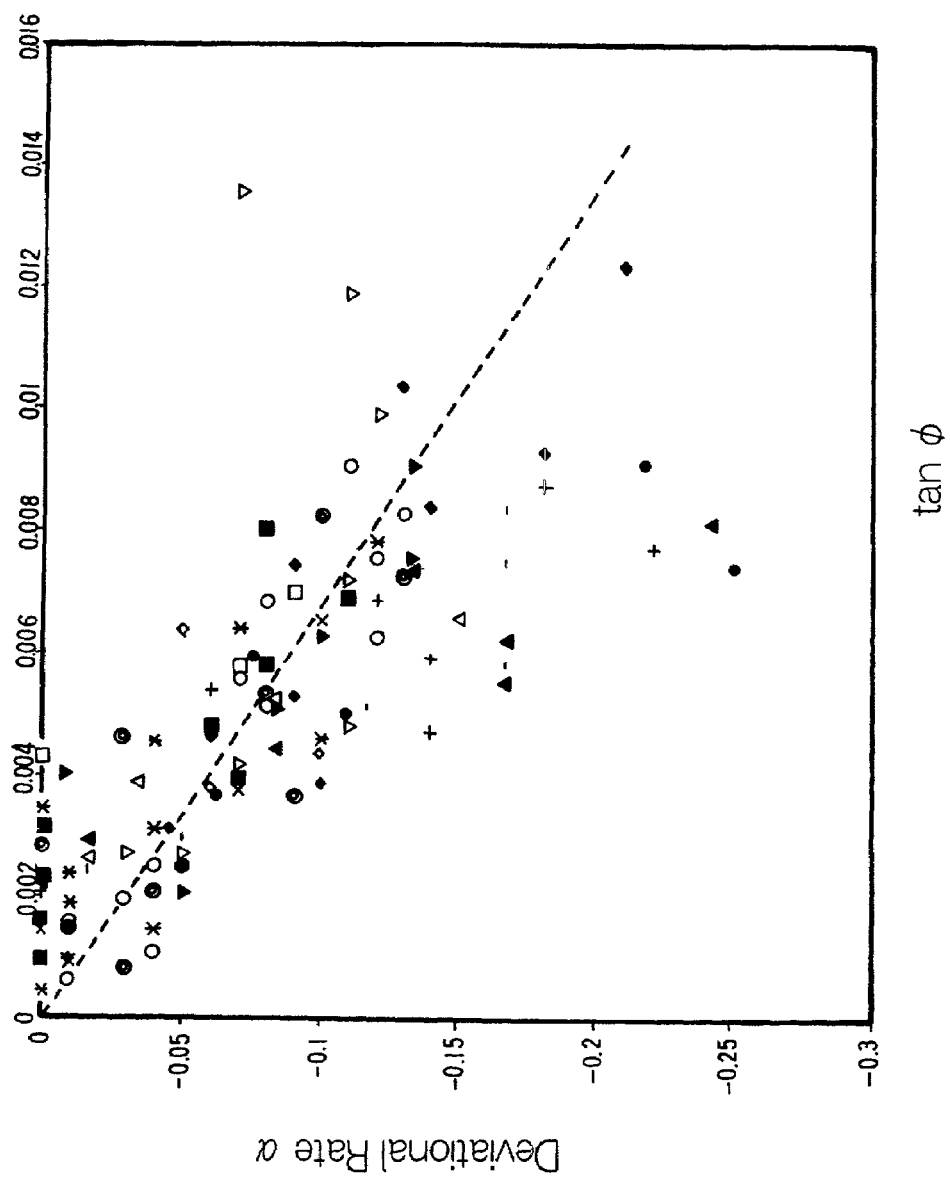
FIG. 26 is a graph illustrating the relationship between the deviational rate $\alpha$ and the inclination angle $\phi$ of the movable die.

Otherwise, the deviation η for determining the neutral axis 111 may be derived at the bending moment determining module 75 based on actual measurement data, as shown in FIG. 26, for example. The deviation η can be expressed as follows in accordance with the measurement data:

$$\eta = \alpha H = (K1 \cdot \tan\phi) H = (K1 \cdot \tan\phi)(h2 - h1) \quad (10)$$

Here, a coefficient α indicates a deviational rate representing a ratio of the deviation η to the height H (=h2−h1) of a specific cross-section of the elongated workpiece 11 in the direction of the radius R of curvature. When the height H of the elongated workpiece 11 is multiplied by the deviational rate α, the deviation η can be obtained for determination of the neutral axis 111. A factor K1 of proportionality may be obtained based on the actual measurement data, as shown in FIG. 26, in determining the deviational rate α.

In determining the deviational rate α, the elongated workpiece 11 of various sectional shapes, various qualities and various sizes has been subjected to bending at the bending machine 10. The inclination angle φ of the acting movable die 13 and the length of the deformed elongated workpiece 11 were measured. When the values of the deviational rate α for the neutral axis 111 are plotted for the measured values of the inclination angle φ for the movable die 13, a diagrammatic expression of the measurement data can be obtained as shown in FIG. 26.

FIG. 26 shows the measurement data for two types of aluminum elongated workpiece, JIS (Japanese Industrial Standard) 6063-T1 and JIS6063-T5 of various sectional shapes and sizes. In measurement, the interval L was set at 50 mm, 60 mm, 70 mm and 90 mm, respectively, between the stable and movable dies 12, 13. According to the shown measurement data, a common coefficient K1 can be derived for determining the deviation η, irrespective of the shapes and sizes of the cross-section as well as the quality of the workpiece 11.

Figure 27:
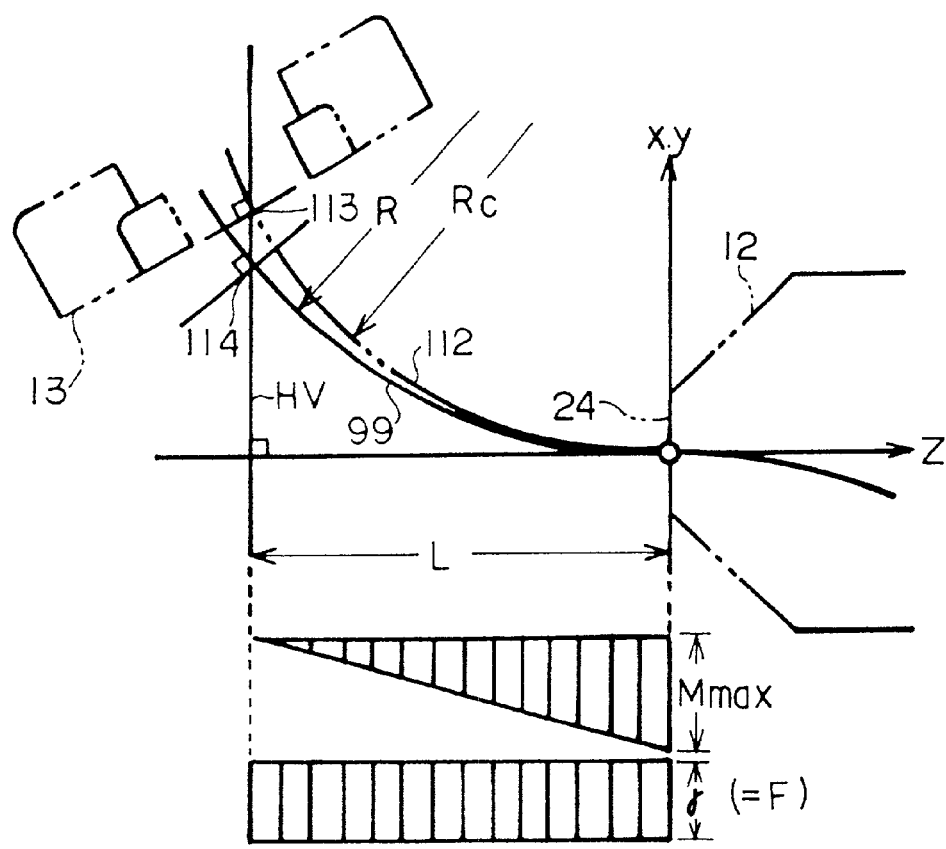
FIG. 27 schematically illustrates the procedure of calculating the quantity of an elastic/plastic bending deformation.

The first control data calculating module 74 is capable of modifying or compensating the aforementioned geometric positions of the movable die 13 by utilizing the bending moments M determined at the bending moment determining module 75. The modification or compensation enables derivation of actual or effective positions, for the movable die 13, which serve to realize formation of the bent elongated product 81 at a higher accuracy. In derivation of the actual positions, the first control data calculating module 74 determines the quantities of elastic/plastic bending deformations caused by an elastic bending restoration or a so-called springback of the elongated workpiece 11, as shown in FIG. 27, for example.

In determining the quantity of the elastic/plastic bending deformation, the first control data calculating module 74 utilizes the distribution of bending moment or bending moment diagram specified between the movable die 13 and the outlet of the through hole 24 in the stable die 12. In this case, the distribution of bending moment may be represented by an average bending moment for distributed bending moments between the movable die 13 and the outlet of the through hole 24 in the stable die 12. The average bending moment in this case equals to a half of the bending moment M (=Mmax) determined at the bending moment determining module 75, as is apparent from FIG. 27, for example. The quantity of the elastic/plastic bending deformation can be obtained from the following expression, for example:

$$\frac{1}{Rc} = \frac{M}{2EI} + \frac{1}{R} \quad (11)$$

The elastic/plastic bending deformation can be represented by an effective curvature 1/Rc, wherein Rc indicates a radius of the effective curvature, necessarily induced in the elongated workpiece 11 under the process of bending so as to finally allow a bending of the curvature 1/R, designed in the shape data, to remain in the final elongated product 81.

The Young's modulus E of the elongated workpiece 11 may be specified in the aforementioned mechanical property data. On the other hand, the area moment of inertia I may be derived for the machine coordinate system xyz defined on the respective cross-sections 105a–105g. For example, if the area moment of inertia around the x-axis $I_x$, the area moment of inertia around the y-axis $I_y$ and the product moment of inertia $J_{xy}$ have been determined, as is apparent from FIG. 10, the area moment of inertia $I_b$ around the binormal vector b, for specifying the direction of bending, can be calculated in accordance with the following expression:

$$I_b = I_x \cos^2\theta_{b\text{-}x} = I_y \sin^2\theta_{b\text{-}x} \sin 2\theta_{b\text{-}x} \quad (12)$$

Here, $\theta_{b\text{-}x}$ denotes an angle defined between the binormal vectors b, established on the respective cross-sections 105a–105g, and the x-axis of the machine coordinate systems xyz, determined at the sectional shape characteristic management module 60. The angle is measured in the counterclockwise direction around the z-axis of the machine coordinate systems xyz, as shown in FIG. 10. The thus calculated area moment of inertia $I_b$ corresponds to the optimum area moment of inertia I, reflecting the direction of bending, for the respective cross-sections 105a–105g of the elongated workpiece 11.

After the effective curvature 1/Rc has been determined, the first control data calculating module 74 operates to determine an actual or physical position 113 for the movable die 13 based on a modified centroidal line 112 described in accordance with the effective curvature 1/Rc. The actual position 113 may be identified by the x- and y-coordinates of the machine coordinate system xyz, or by the differential vector added to the geometric position 114 originally defined by the centroidal line 99.

In general, the elongated workpiece 11, such as an aluminum material, faces an elastic deformation before a plastic deformation. In case where this type of the elongated workpiece 11 is subjected to bending from the movable die 13, the bent elongated product 81 suffers from slight dimensional errors in response to an elastic restoration or springback right after the elongated workpiece 11 has been released from the movable die 13. If the position of the movable die 13 is determined in view of the derived elastic/plastic bending deformation in the above-described manner, it is possible to sufficiently cancel the dimensional errors due to the elastic restoration or springback in the elongated product 81 after bending. In particular, since the elastic/plastic bending deformation can be obtained from a geometric calculation based on the bending moment M, the operator is released from a troublesome collection of measurement data based on experiments.

Figure 28:
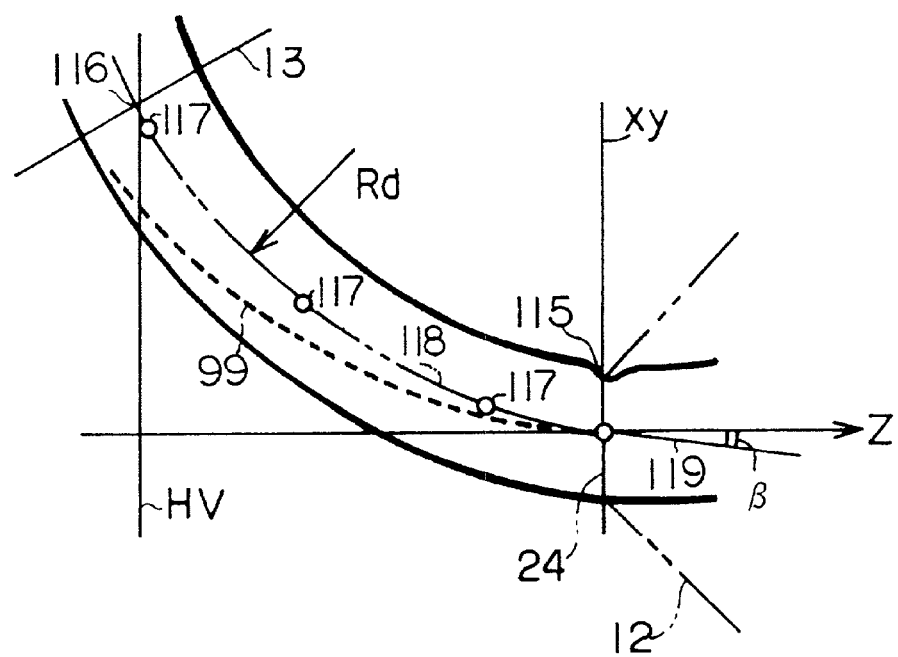
FIG. 28 schematically illustrates an elbow angle induced in the elongated workpiece at the outlet of the stable die.

In addition, the first control data calculating module 74 may determine an elbow angle β inevitably induced in the elongated workpiece 11 at the outlet of the through hole 24 in the stable die 12, as shown in FIG. 28, for example. The elbow angle β may be caused by a depression 115, representative of a deformation in the cross-section, and/or by an elastic/plastic elbow deformation, representative of a shear deformation across the workpiece 11, at the outlet of the through hole 24. After the elbow angle β has been determined, the first control data calculating module 74 is adapted to rotate the centroidal line 99 about the outlet of the through hole 24 in accordance with the machine coordinate system xyz. The centroidal line 99 may rotate within a plane including the origin of the machine coordinate system xyz and the geometric position of the movable die 13 by the quantity of the elbow angle β. The first control data calculating module 74 then determines an actual or physical position 116 for the movable die 13 based on the intersection between the rotated centroidal 99 and the motion plane HV. The actual position 116 may be identified by the x- and y-coordinates of the machine coordinate system xyz, or by the differential vector added to the geometric position defined by the original centroidal line 99.

In particular, when the hollow elongated workpiece 11 is subjected to bending between the stable and movable dies 12, 13, the elongated workpiece 11 suffers from a larger shear strain at the outlet of the through hole 24 in the stable die 12. The shear strain causes the shear deformation such as an elastic and/or a plastic elbow deformation at the outlet of the through hole 24. Additionally, a deformation in the cross-section, such as the depression 115, may be formed on the elongated workpiece 11 at the outlet of the through hole 24 in the stable die 12. The depression 115 induces an elbow deformation at the outlet of the through hole 24. Any elbow deformation results in an insufficient bending of the elongated workpiece 11 between the stable and movable dies 12, 13. The elongated workpiece 11 between the stable and movable dies 12, 13 fails to reflect the geometry specified in the shape data. When the elongated workpiece 11 is released from the movable die 13, the final elongated product 81 suffers from slight dimensional errors in response to the elbow deformations. If the position 116 for the movable die 13 can be determined in view of the elbow angle β in the above-described manner, it is possible to sufficiently cancel the dimensional errors due to the elbow deformations in the elongated product 81 after bending.

Figure 29:
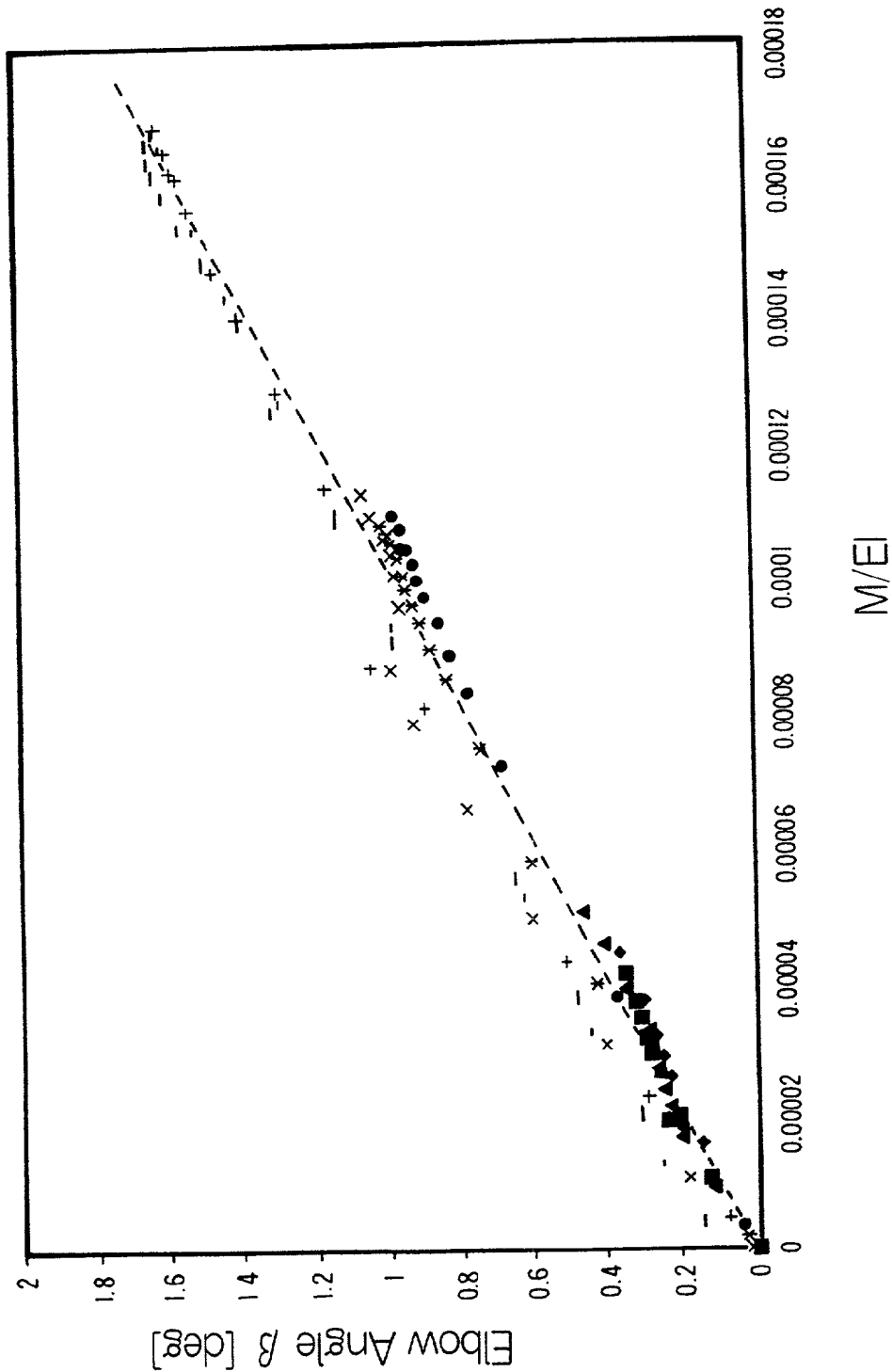
FIG. 29 is a graph illustrating the relationship between measurement data of the elbow angle and values for $\underline{M/EI}$.

Here, the quantity of the elbow angle β may be determined based on an actual measurement data, as shown in FIG. 29, for example. The elbow angle β[deg] can be expressed as follows in accordance with the measurement data:

$$\beta = K2 \frac{M}{EI} \quad (13)$$

In the expression (13), a coefficient K2 indicates a factor of proportionality derived from the actual measurement data, as shown in FIG. 29.

In obtaining the measurement data, the elongated workpiece 11 of various sectional shapes, various qualities and various sizes has been subjected to bending at the bending machine 10. Specific dimensions were measured in the elongated workpiece 11 between the stable and movable dies 12, 13. The measurement is adapted to reveal the curvature 1/Rd of the elongated workpiece 11. As clearly shown in FIG. 18, for example, three sample points 117 may solely be required to calculate the radius of curvature Rd for the elongated workpiece 11 between the stable and movable dies 12, 13.

The calculated radius of curvature Rd serves to describe a curved line 118 representing the bending deformation of the elongated workpiece 11 between the stable and movable dies 12, 13. When the curved line 118 has been derived, a straight line 119 tangent to the curved line 118 at the outlet of the through hole 24 is determined. The elbow angle β corresponds to the angle defined between the straight line 119 and the z-axis of the machine coordinate system xyz. If the thus determined elbow angles β are plotted for the respective values for the fractional representation M/EI, a diagrammatic expression of the measurement data can be obtained as shown in FIG. 29.

FIG. 29 shows the measurement data for three types of aluminum elongated workpiece, JIS6063-O, JIS6063-T1 and JIS6063-T5. In measurement, the interval L was set at 60 mm, 90 mm and 133 mm, respectively, between the stable and movable dies 12, 13. According to the shown measurement data, a common coefficient K2 can be derived for determining the elbow angle β, irrespective of the shapes of the cross-section and the quality of the workpiece 11.

Figure 30:
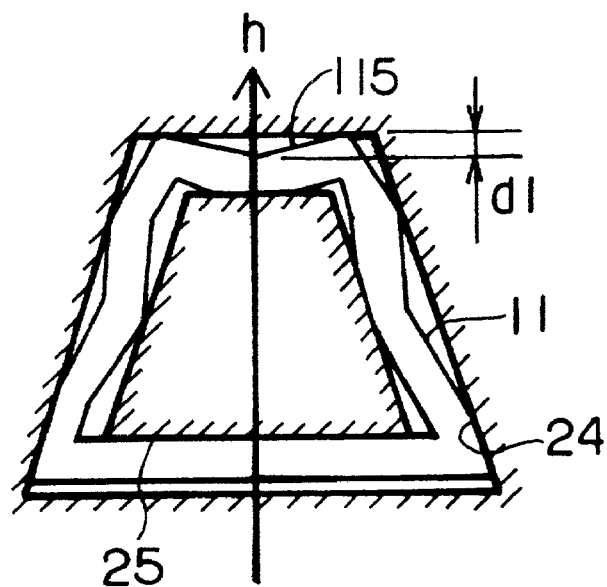
FIG. 30 schematically illustrates a sectional deformation induced along the cross-section of the elongated workpiece.

Likewise, the first control data calculating module 74 may determine a sectional deformation d1 due to the depression 115 formed in the elongated workpiece 11 at the outlet of the through hole 24 in the stable die 12, as shown in FIG. 30, for example. The determined sectional deformation d1 may be added to the aforementioned geometric position in the direction of bending or radius of curvature. Addition of the sectional deformation d1 to the geometric position serves to reveal an actual or physical position for the movable die 13. The actual position may be identified by the x- and y-coordinates of the machine coordinate system xyz, or by differential vector added to the geometric position originally defined by the centroidal line 99.

In particular, when the hollow elongated workpiece 11 is subjected to bending between the stable and movable dies 12, 13, the elongated workpiece 11 in general suffers from a sectional deformation, such as a crash and the depression 115, along the cross-section in the direction of bending or radius of curvature at the outlet of the through hole 24. A sufficient plastic bending cannot be achieved in the elongated workpiece 11 until the generation of the sectional deformation has been completed, even if the movable die 13 still moves in the direction of bending. The crash and/or depression 115 results in an insufficient bending of the elongated workpiece 11 between the stable and movable dies 12, 13. The elongated workpiece 11 between the stable and movable dies 12, 13 fails to reflect the geometry specified in the shape data. The final elongated product 81, released from the movable die 13, suffers from slight dimensional errors. If the position for the movable die 13 can be determined in view of the sectional deformation d1 in the above-described manner, it is possible to cancel the dimensional errors due to the deformation in the cross-section in the elongated product 81 after bending.

Figure 31:
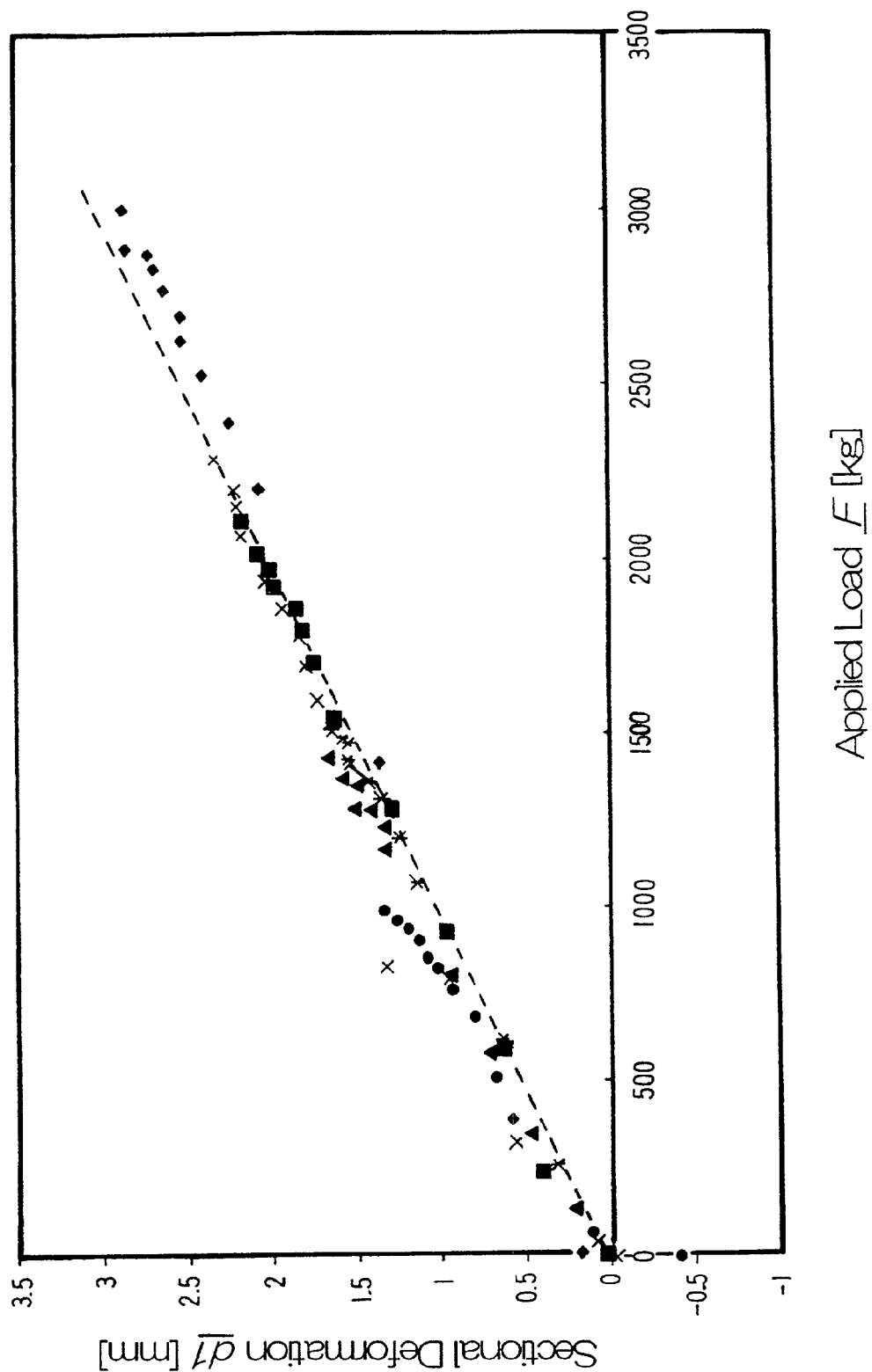
FIG. 31 is a graph illustrating the relationship between a sectional deformation $\underline{d1}$ and an applied load $\underline{F}$.

Here, the quantity of the sectional deformation d1 may be determined based on an actual measurement data, as shown in FIG. 31, for example. The sectional deformation d1[mm] may be expressed as follows in accordance with the measurement data:

$$d1 = K3 \cdot F = K3 \frac{M}{L} \quad (14)$$

In the expression (14), a coefficient K3 indicates a factor of proportionality derived from the actual measurement data, as shown in FIG. 31.

In obtaining the measurement data, the elongated workpiece 11 of various sectional shapes, various qualities and various sizes has been subjected to bending at the bending machine 10. Specific dimensions were measured in the cross-section of the elongated workpiece 11 at the outlet of the through hole 24 in the stable die 12. When the measured sectional deformations d1 are plotted for respective applied load F, a diagrammatic expression of the measurement data can be obtained as shown in FIG. 31.

FIG. 31 shows the measurement data for two types of aluminum elongated workpiece, JIS6063-T1 and JIS6063-T5. In measurement, the interval L was set at 60 mm, 90 mm and 133 mm, respectively, between the stable and movable dies 12, 13. According to the shown measurement data, a common coefficient K3 can be derived for determining the sectional deformation d1, irrespective of the shapes of the cross-section and the mechanical property of the workpiece 11.

Figure 32:
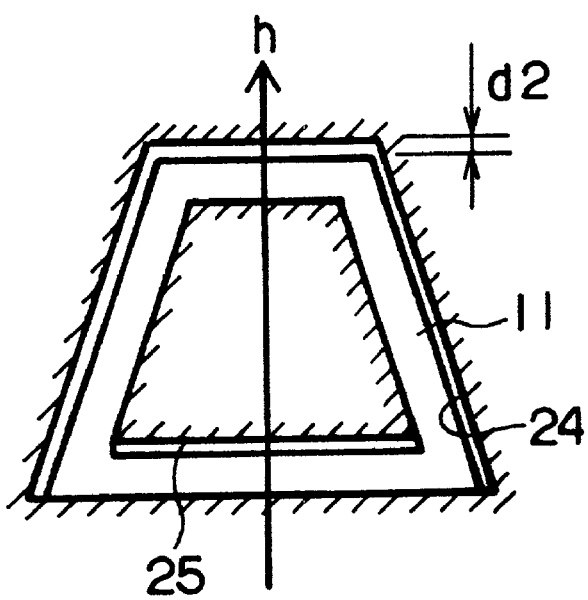
FIG. 32 schematically illustrates a clearance defined between the outer periphery of the elongated workpiece and the through hole of any die.

Furthermore, the first control data calculating module 74 may determine a clearance d2 between the elongated workpiece 11 and the stable and movable dies 12, 13, respectively, as shown in FIG. 32, for example. The determined clearance d2 may be added to the aforementioned geometric position in the direction of bending or radius of curvature. Addition of the clearance d2 to the geometric position serves to reveal an actual or physical position for the movable die 13. The actual position may be identified by the x- and y-coordinates of the machine coordinate system xyz, or by differential vector added to the geometric position originally defined by the centroidal line 99.

The quantity of the clearance d2[mm] may be determined based on an actual measurement data, for example. In obtaining the measurement data, the elongated workpiece 11 of various sectional shapes, various qualities and various sizes has been subjected to bending at the bending machine 10. The length of the path was measured for movement of the movable die 13, after the movable die 13 had started to move, until the elongated workpiece 11 finally contacted the inner surface of the through hole 24 in the stable die 12. The measured length corresponds to the quantity of the clearance d2. Preferably, the measured clearance d2 is classified in accordance with the magnitude of a dimensional tolerance designed in the elongated workpiece 11. Specifically, the peripheral dimensions are measured for the elongated workpiece 11 prior to measurement of the clearance d2. The clearance d2 is measured for the respective ranges of dimensional tolerances.

In general, a specific range of the dimensional tolerance is permitted for the elongated workpiece 11, for example, manufactured by extrusion and the like. If the elongated workpiece 11 should smoothly be passed through the through holes 24, 28, defined in the stable and movable dies 12, 13, irrespective of variation in dimensions within the tolerance, it is necessary to establish a clearance between the designed dimensions of the elongated workpiece 11 and the actual dimensions of the through holes 24, 28. Even if the elongated workpiece 11 has been manufactured exactly at the designed dimensions, the elongated workpiece 11 cannot pass through the through holes 24, 28 in the stable and movable dies 12, 13 without a clearance. A substantial bending cannot be accomplished in the elongated workpiece 11 until the stable and movable dies 12, 13 has moved across the clearance so as to completely contact the elongated workpiece 11, even if the movable die 13 moves in the direction of bending. The clearance results in an insufficient bending of the elongated workpiece 11 between the stable and movable dies 12, 13. The elongated workpiece 11 between the stable and movable dies 12, 13 fails to reflect the geometry specified in the shape data. The final elongated product 81, released from the movable die 13, suffers from slight dimensional errors. If the position for the movable die 13 can be determined in view of the clearance d2 in the above-described manner, it is possible to cancel the dimensional errors due to the clearance in the elongated product 81 after bending.

On the other hand, the second control data calculating module 76 operates to determine the attitude of the stable die 12 around the central axis 22 for the machine coordinate system xyz defined on the respective cross-sections 105a–105g. The attitude of the stable die 12 may represent the relative rotational angle between the stable and movable dies 12, 13 around the longitudinal axis of the elongated workpiece 11. In determining the relative rotational angle, the second control data calculating module 76 first determines an angle of torsion per unit length or unit feed amount based on the adjacent machine coordinate systems xyz. The unit length or unit feed amount may be measured along the centroidal line 99 of the elongated product 81 in the longitudinal direction thereof.

Figure 33:
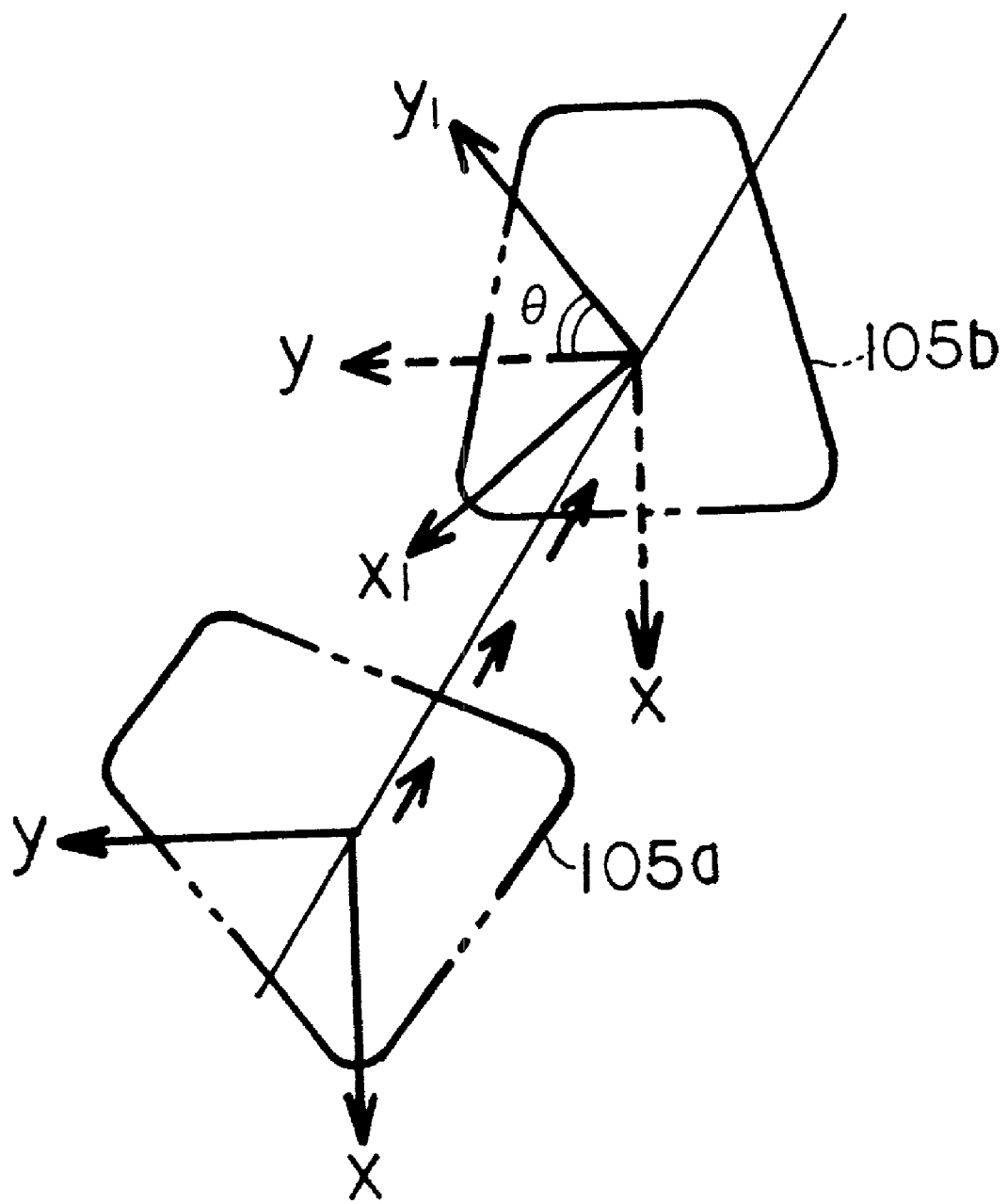
FIG. 33 schematically illustrates the concept of calculating a torsional angle of the twisted elongated product around its longitudinal axis between the xy-planes of the adjacent machine coordinate systems $\underline{xyz}$.

In determining the angle of torsion per unit length, the second control data calculating module 76 first superposes the xy-planes of the adjacent machine coordinate systems xyz on each other, as shown in FIG. 33, for example. The z-axis of the machine coordinate system xyz may be superposed on the z-axis of another machine coordinate system xyz. A matrix calculation may be employed to achieve this superposition. When the xy-plane is to be superposed on the $x_1y_1$-plane, as shown in FIG. 33, the rotational angle should be maintained in the respective xy- and $x_1y_1$-planes around the z-axis of the overall coordinate system XYZ. In this manner, the superposition of the xy- and $x_1y_1$-planes serves to reveal the torsional angle θ of the elongated product 81 between the adjacent sectional planes 105a, 105b.

Figure 34:
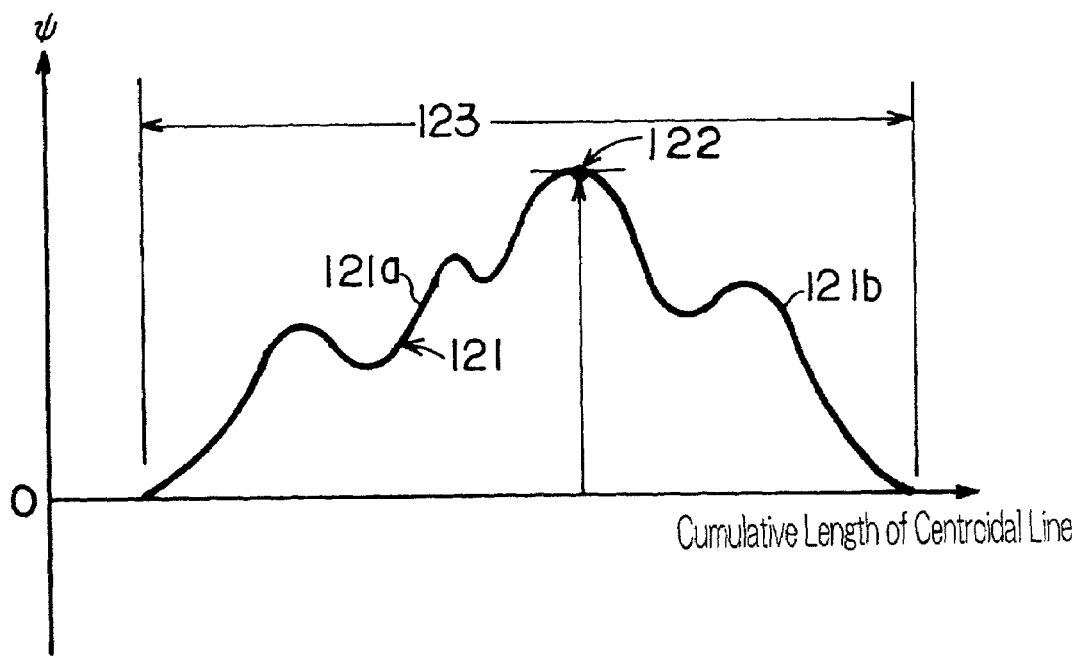
FIG. 34 is a graph illustrating a curve representing the relationship between an angle of torsion per unit length and a cumulative length of the centroidal line.

When the torsional angle θ has been determined between the respective pair of the adjacent sectional planes 105a–105g, the second control data calculating module 76 subsequently calculates the angle of torsion per unit length φ. The second control data calculating module 76 is designed to utilize the length of the centroidal line 99 between the adjacent sectional planes 105a–105g in calculation of the angle of torsion per unit length φ. The length of the centroidal line 99 corresponds to the length measured between the adjacent knots 102 along the parametric curve 101. Specifically, the determined torsional angle θ is divided by the calculated length of the centroidal line 99. When the thus derived angles of torsion per unit length φ are sequentially plotted for the cumulative amount of the lengths of the centroidal line 99, a diagrammatic expression or curve 121 can be obtained to describe the variation in the angle of torsion per unit length φ along the longitudinal direction of the elongated product 81, as clearly shown in FIG. 34. It should be noted that the axis of ordinate denotes the angle of torsion per unit length φ at the movable die 13 when the stable die 12 reaches the position corresponding to the cumulative lengths of the centroidal line 99.

Figure 35:
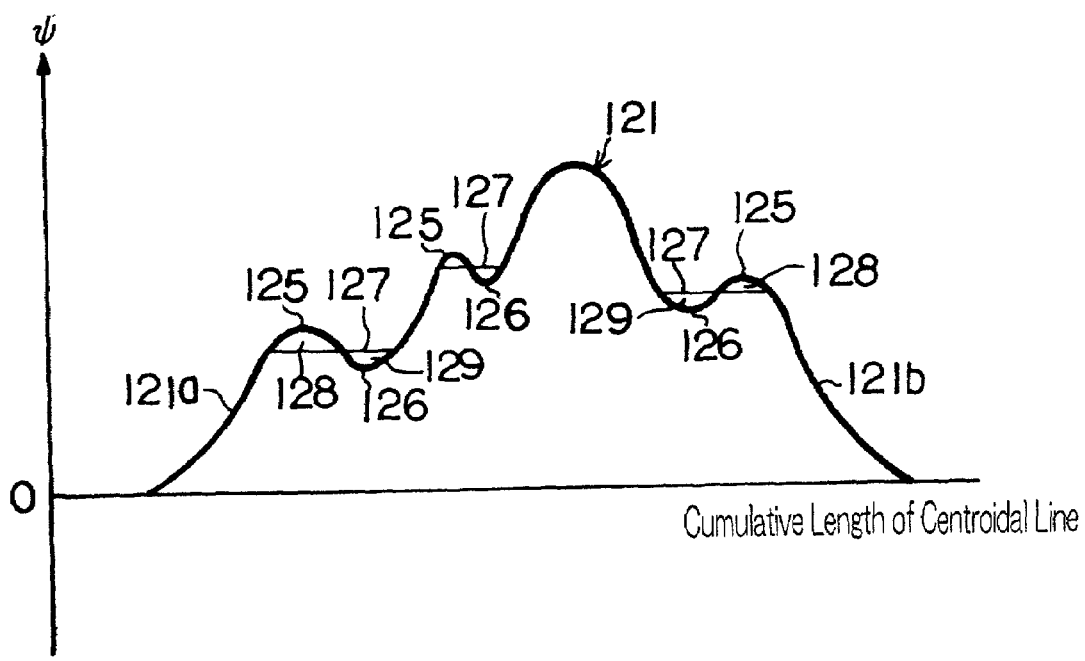
FIG. 35 schematically illustrates generation of incremental and decremental curves in the graph based on the curve.

Thereafter, the second control data calculating module 76 detects the maximum value point 122 of the curve 121 for the angle of torsion per unit length φ. The maximum value point 122 is selected within respective ranges 123 extending between the adjacent points φ=0. When the maximum value point 122 has been detected, the second control data calculating module 76 operates to transform a first curve segment 121a, rising from φ=0 so as to reach the maximum value point 122, to an incremental curve, while transforming a second curve segment 121b, falling from the maximum value point 122 so as to reach φ=0, to a decremental curve. The "incremental curve" means a curve without any fall, while the "decremental curve" means a curve without any rise or lift. As shown in FIG. 35, a higher extreme 125 and a lower extreme 126 adjacent the higher extreme 125 are averaged in the first and second curve segments 121a, 121b. As clearly shown in FIG. 35, the average of the higher and lower extremes 125, 126 serves to generate a constant value line 127. An area 128 between the constant value line 127 and the curve 121 including the higher extreme 125 is set equal to an area 129 between the constant value line 127 and the curve 121 including the lower extreme 126.

Figure 36:
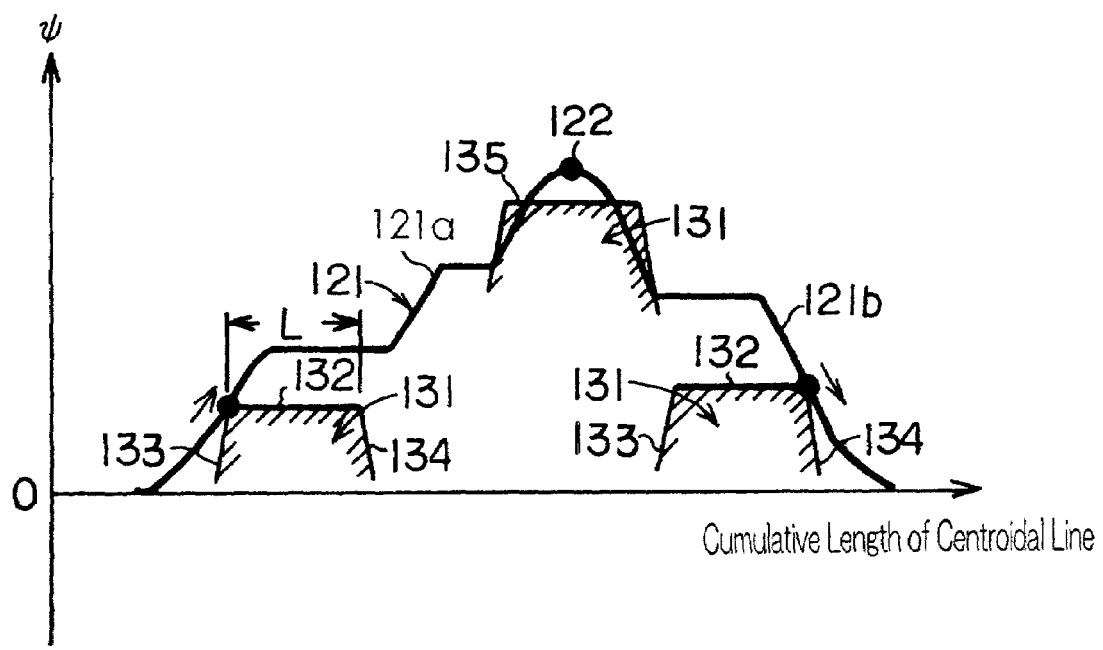
FIG. 36 schematically illustrates the concept of a performatory range representation.

After the curve 121 has been transformed into a combination of the incremental and decremental curves in the above-described manner, the second control data calculating module 76 operates to define a performatory range representation 131 based on the interval L between the stable and movable dies 12, 13, as shown in FIG. 36, for example. The performatory range representation 131 is designed to represent the performance of the bending machine 10. The performatory range representation 131 comprises an upper horizontal straight line 132 and first and second inclined straight lines 133, 134 connected to the opposite ends of the upper horizontal straight line 132. The upper horizontal straight line 132 specifies the length of the interval L in the axial direction or the direction of the centroidal line 99. The inclination of the first inclined straight line 133 represents the allowable variation rate for the angle of torsion per unit length φ at the stable die 12, while the inclination of the second inclined straight line 134 represents the allowable variation rate for the angle of torsion per unit length φ at the movable die 13. The allowable variation rate can be determined based on the maximum rotational speed of the stable die 12 around the central axis 22, for example.

The second control data calculating module 76 operates to move, in the first curve segment 121a, the performatory range representation 131 along the curve 121. In this case, the second control data calculating module 76 allows the end, representing the position of the movable die 13, of the upper horizontal straight line 132 to trace the curve 121. If the performatory range representation 131 crosses the curve 121 during the movement, the second control data calculating module 76 replaces the curve 121 with a line along the outer periphery of the performatory range representation 131 at the area crossing the curve 121. To the contrary, the other end, representing the position of the stable die 12, of the upper horizontal straight line 132 is allowed to trace the curve 121 when the performatory range representation 131 is moved along the curve 121 in the second curve segment 121b. If the performatory range representation 131 crosses the curve 121 during the movement, the second control data calculating module 76 likewise replaces the curve 121 with a line along the outer periphery of the performatory range representation 131 at the area crossing the curve 121. At the same time, the curve 121 in the vicinity of the maximum value point 122 is replaced with a straight line 135 representing a constant angle of torsion per unit length $\phi$ at least within a range corresponding to the length of the interval $\underline{L}$, as clearly shown in FIG. 36, based on the performatory range representation 131. The curve 121 is averaged in the vicinity of the maximum value point 122 so as to generate the straight line 135.

Figure 37:
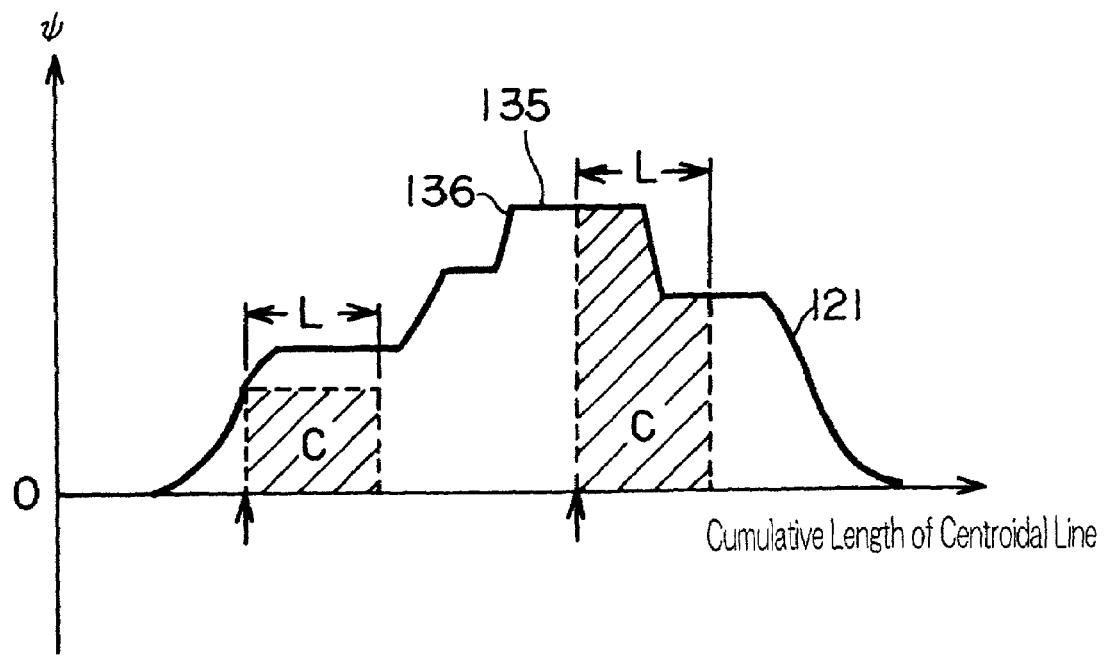
FIG. 37 schematically illustrates the concept of calculating the z-axis rotational angle $\underline{C}$.

When the transformation of the curve 121 has been completed in the above-described manner, the second control data calculating module 76 starts to calculate the rotational angle of the stable die 12 around the central axis 22 for the respective machine coordinate systems $\underline{xyz}$ specified in view of the length of the centroidal line 99. Specifically, the second control data calculating module 76 operates to multiply the angle of torsion per unit length $\phi$ for the corresponding cross-sections 105a–105g by the length of the interval $\underline{L}$ measured between the stable and movable dies 12, 13, as shown in FIG. 37. The multiplication is conducted until the value for the angle of torsion per unit length $\phi$ reaches the entrance 136 of the straight line 135. The calculated product corresponds to the rotational angle of the stable die 12, namely, the z-axis rotational angle $\underline{C}$. On the other hand, the second control data calculating module 76 implements integration based on the angle of torsion per unit length $\phi$ ranging over the length of the interval $\underline{L}$, as also shown in FIG. 37, for the corresponding cross-sections 105a–105g, after the value for the angle of torsion per unit length $\phi$ passed the entrance 136 of the straight line 135. The solution to the integration corresponds to the rotational angle of the stable die 12, namely, the z-axis rotational angle $\underline{C}$.

Figure 38:
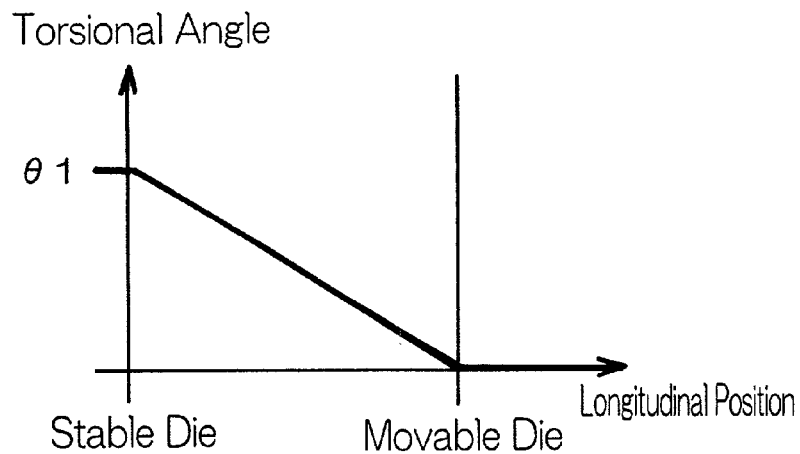
FIG. 38 is a graph illustrating the relationship between a torsional angle of the elongated workpiece and its longitudinal position.
Figure 39:
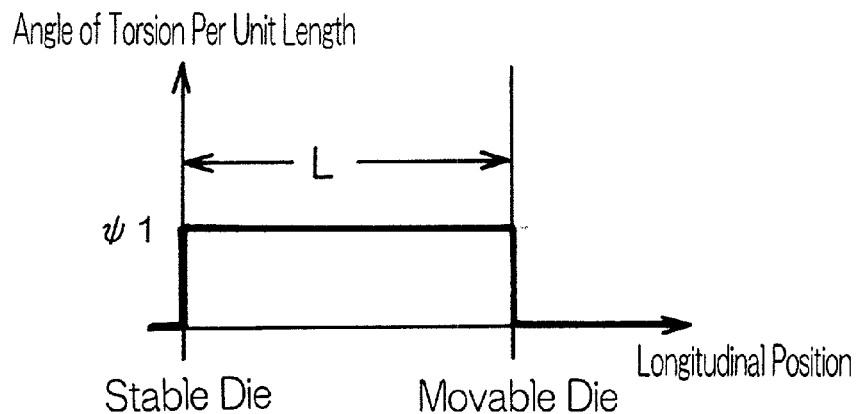
FIG. 39 is a graph illustrating the distribution of the angle of torsion per unit length along the longitudinal direction of the elongated workpiece.

Next, the fundamentals will briefly be described for the above-described torsion. When the stable die 12 rotates about the central axis 22 by a rotational angle $\theta 1$, as shown in FIG. 38, a torsion is induced in the elongated workpiece 11 between the stable and movable dies 12, 13. If the elongated workpiece 11 has a constant cross-section along its longitudinal axis, the elongated workpiece 11 can equally be twisted along its longitudinal axis. Accordingly, an angle of torsion per unit length $\phi 1$ uniformly distributes over the entire length of the interval $\underline{L}$, as shown in FIG. 39.

Figure 40:
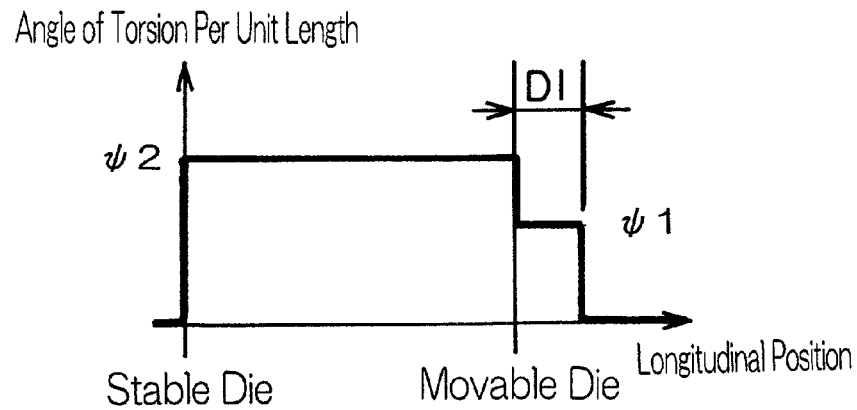
FIG. 40 is a graph illustrating the distribution of the angle of torsion per unit length along the longitudinal direction of the elongated workpiece after the elongated workpiece advances by a fine feed amount $\underline{D1}$.
Figure 41:
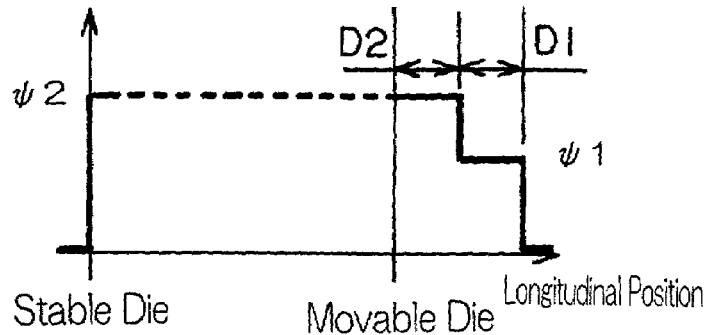
FIG. 41 is a graph illustrating the distribution of the angle of torsion per unit length along the longitudinal direction of the elongated workpiece after the elongated workpiece advances by a fine feed amount $\underline{D2}$.

When the elongated workpiece 11 advances by a fine feed amount $\underline{D1}$ in the direction of the longitudinal axis, the angle of torsion per unit length $\phi 1$ is kept in the elongated workpiece 11 at a section passing through the movable die 13. Thereafter, when the stable die 13 takes an attitude of a rotational angle $\theta 2$ larger than the rotational angle $\theta 1$, a uniform torsion can be achieved for the elongated workpiece 11 between the stable and movable dies 12, 13, so that an angle of torsion per unit length $\phi 2$ uniformly distributes over a range between the stable and movable dies 12, 13, as shown in FIG. 40. When the elongated workpiece 11 advances again by a fine feed amount $\underline{D2}$, with the angle of torsion per unit length $\phi 2$ kept between the stable and movable dies 12, 13, the constant angle of torsion per unit length $\phi 2$ can be maintained in the elongated workpiece 11 at a section, which has just passes through the movable die 13, right behind the aforementioned section of the constant angle of torsion per unit length $\phi 1$, as shown in FIG. 41.

If the fine advancement of the elongated workpiece 11 along with torsion in the above-described manner is continuously repeated, a stepwise increase in the angle of torsion per unit length $\phi$ in the direction of the longitudinal axis can be achieved in the elongated work piece 11. For example, if the stable die 12 is driven to smoothly rotate, keeping the elongated workpiece 11 continuously advancing, a smooth increase in the angle of torsion per unit length $\phi 1$ can be accomplished to provide the aforementioned elongated product 81.

Figure 42:
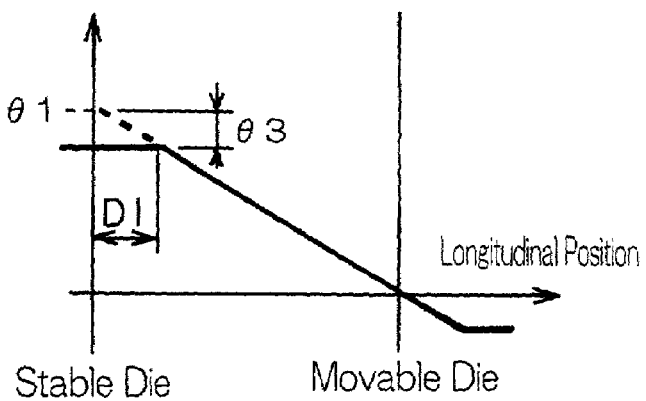
FIG. 42 is a graph illustrating the relationship between a torsional angle of the elongated workpiece and its longitudinal position after the elongated workpiece advances by the fine feed amount $\underline{D1}$ with the stable die free from restraint.
Figure 43:
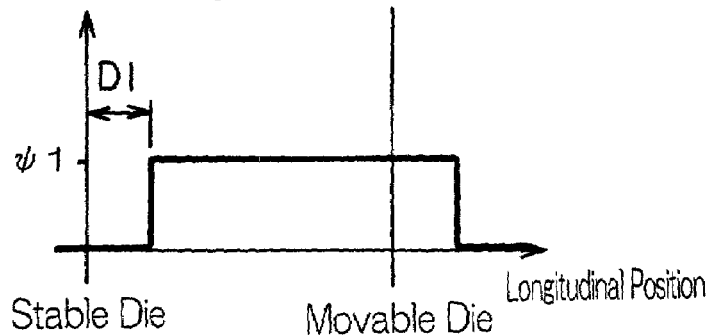
FIG. 43 is a graph illustrating the distribution of the angle of torsion per unit length along the longitudinal direction of the elongated workpiece after the elongated workpiece advances by the fine feed amount $\underline{D1}$ with the stable die free from restraint.

Next, assume that the stable die 12 is released from restraint after the elongated workpiece 11 has been twisted by the aforementioned angle of torsion per unit length $\phi 1$. In this case, the stable die 12 is allowed to rotate around the central axis 22 by receiving a torsional force due to the advancement of the elongated workpiece 11 by the fine feed amount $\underline{d1}$. As clearly shown in FIG. 42, any torsion cannot be effected on the elongated workpiece 11 at a section which passes through the stable die 12 during the advancement of the fine feed amount $\underline{D1}$. When the twisted elongated workpiece 11 passes through the movable die 13 during the advancement of the fine feed amount $\underline{D1}$, the elongated workpiece 11 is caused to rotate by a rotational angle $\theta 3$ around the longitudinal axis in the reverse direction opposite to the direction of the rotational angle $\theta 1$. The reduced rotational angle ($\theta 1 - \theta 3$) can be established for the stable die 12. As shown in FIG. 43, the condition $\phi = 0$ can be kept in the elongated workpiece 11 at a section which passes through the stable die 12 during the advancement of the fine feed amount $\underline{D1}$.

Figure 44:
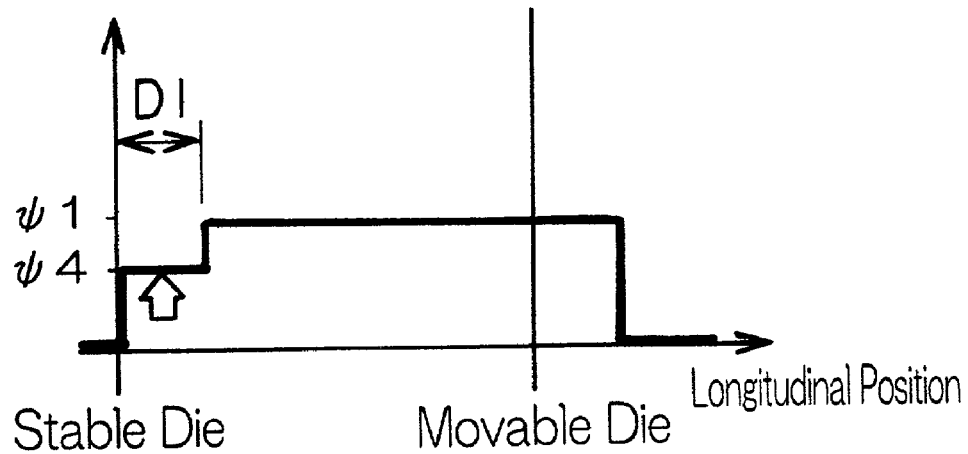
FIG. 44 is a graph illustrating the distribution of the angle of torsion per unit length along the longitudinal direction of the elongated workpiece when the elongated workpiece is further twisted after the advancement by the fine feed amount $\underline{D1}$.

Thereafter, the stable die 12 is locked to the driving force around the central axis 22. If the stable die 12 is driven to rotate, as shown in FIG. 44, torsion cannot be achieved in the elongated workpiece 11 at a section formerly twisted, because of a work hardening, until the angle of torsion per unit length $\phi$ reaches the angle of torsion per unit length $\phi 1$. A uniform torsion can be effected on the elongated workpiece 11 at a section which passes through the stable die 12 during the advancement of the fine feed amount $\underline{D1}$. An angle of torsion per unit length $\phi 4$ uniformly distributes over a range corresponding to the fine feed amount $\underline{D1}$.

Figure 45:
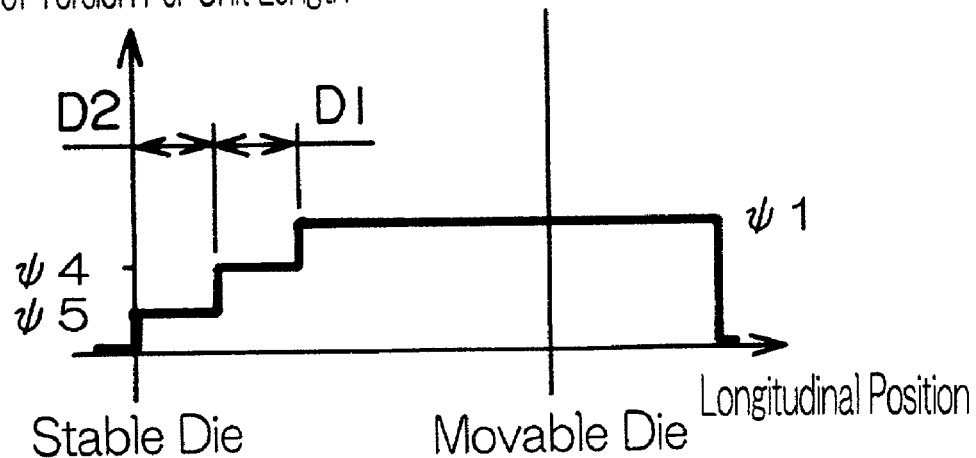
FIG. 45 is a graph illustrating the distribution of the angle of torsion per unit length along the longitudinal direction of the elongated workpiece when the elongated workpiece is further twisted after the advancement by the fine feed amount $\underline{D2}$.

Subsequently, the elongated workpiece 11 is driven to advance by the fine feed amount $\underline{D2}$. The condition $\phi = 0$ is kept in the elongated workpiece 11 at the section which have passed through the stable die 12. When the stable die 12 is then driven to rotate around the central axis 22, a constant angle of torsion per unit length $\phi 5$ can be established in the elongated workpiece 11 at a section, which has just passes through the stable die 13, right behind the aforementioned section of the constant angle of torsion per unit length $\phi 4$, as shown in FIG. 45. It should be noted that the angle of torsion per unit length $\phi 5$ is set smaller than the angle of torsion per unit length $\phi 4$.

If the fine advancement of the elongated workpiece 11 along with rotation of the stable die 12 in the above-described manner is continuously repeated, a stepwise decrease in the angle of torsion per unit length φ in the direction of the longitudinal axis can be achieved in the elongated workpiece 11. For example, if the stable die 12 is driven to smoothly rotate, keeping the elongated workpiece 11 continuously advancing, a smooth decrease in the angle of torsion per unit length φ can be accomplished to provide the aforementioned elongated product 81.

When the angle of torsion per unit length φ has been determined at the second control data calculating module 76 in the above-described manner, the torsional moment determining module 77 calculates a torsional moment or torque T applied to the elongated workpiece 11 for the respective machine coordinate systems xyz. The torsional moment determining module 77 first derives the torsional angle Δθ of the elongated product 81 specified in accordance with the shape data. The torsional angle Δθ can be defined by the aforementioned rotational angle of the stable die 12 around the central axis 22 for the respective machine coordinate systems xyz.

Figure 46:
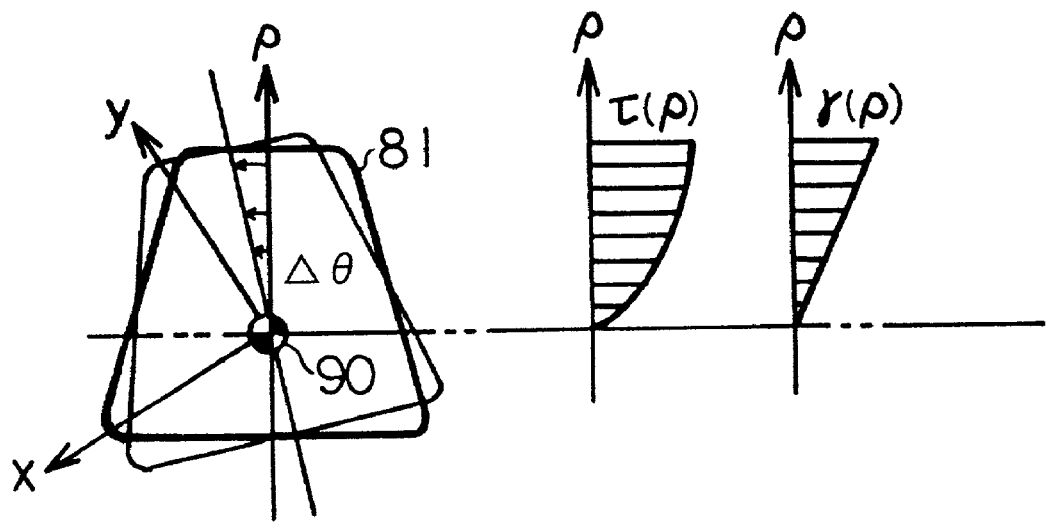
FIG. 46 schematically illustrates a shearing stress and strain distributions for the cross-section of the elongated product.

After the torsional angle Δθ has been determined, the torsional moment determining module 77 determines a shear strain distribution γ(ρ) along the cross-section of the elongated product 81 or the elongated workpiece 11 in the process of machining. As clearly shown in FIG. 46, the shear strain distribution γ(ρ) exhibits a linear variation proportional to the distance from the center of torsion or the central axis 22 of the stable die 12 on the cross-section of the elongated product 81 or the elongated workpiece 11. Accordingly, the shear strain distribution γ(ρ) can geometrically be expressed as follows depending on the distance ρ from the centroid 90 of the cross-section:

$$\gamma(\rho) = \rho \Delta \theta \qquad (15)$$

the torsional moment determining module 77 then calculates a shear stress distribution τ(ρ) based on the determined shear strain distribution γ(ρ) in accordance with the following expression:

$$\tau(\rho) = B3 \cdot \gamma(\rho)^3 + B2 \cdot \gamma(\rho)^2 + B1 \cdot \gamma(\rho) + B0 \qquad (16)$$

Here, coefficients B3, B2, B1, B0 can be determined based on the aforementioned stress-strain diagram expressed under the expression (4). Specifically, as conventionally known, the strain e can be expressed as follows based on the Mohr's circle:

$$e = \frac{1}{2}(e_x + e_y) \pm \frac{1}{2}\sqrt{(e_x + e_y)^2 + \gamma_{xy}^2} \qquad (17)$$

The following substitution is effected on the expression (17):

$$e_x = e_y = 0 \qquad (18)$$
$$e = \frac{1}{2}\gamma$$

when a further substitution is thereafter effected on the expression (4) based on the expression (17) after the aforementioned substitution, the coefficients B3, B2, B1, B0 can be derived for the expression (16).

The determined shear stress distribution τ(ρ) reveals the following expression of the torsional moment T on a specific cross-section:

$$T = \int_x \int_y \tau(\rho) \rho \, dA \qquad (19)$$

The torsional moment T can be derived from repeated numerical calculation based on the discrete expression (19).

The second control data calculating module 76 is capable of modifying or compensating the aforementioned relative rotation or logical rotational angle for the stable die 12 by utilizing the torsional moment T determined at the torsional moment determining module 77. The modification or compensation enables derivation of actual rotational angles, for the stable die 12, which serve to realize the formation of the twisted elongated product 81 at a higher accuracy. In derivation of the actual rotational angles, the second control data calculating module 76 determines the quantities of elastic/plastic torsional deformations caused by an elastic torsional restoration or a so-called springback of the twisted elongated workpiece 11, for example.

The second control data calculating module 76 is adapted to calculate the quantity of the elastic/plastic torsional deformation Δφ, induced in the elongated workpiece 11, based on the torsional moment T determined at the torsional moment determining module 77. The quantity of the elastic/plastic torsional deformation Δφ can be expressed as follows:

$$\Delta \psi = \frac{T}{GIp} \qquad (20)$$

Here, a constant G indicates the shearing modulus of the elongated workpiece 11, while a representation Ip indicates the polar moment of inertia of area for the cross-section. When the elastic/plastic torsional deformation Δφ has been determined in this manner, the second control data calculating module 76 implements addition of the elastic/plastic torsional deformation Δφ to the aforementioned logical rotational angel, so that an actual or physical relative rotational angle between the stable and movable dies 12, 13, in the other words, the z-axis rotational angle C of the stable die 12 can be derived.

As described above, the elongated workpiece 11, such as an aluminum elongated material, faces an elastic deformation before a plastic deformation. In case where this type of the elongated workpiece 11 is subjected to torsion between the stable and movable dies 12, 13, the twisted elongated product 81 suffers from slight dimensional errors in response to an elastic restoration or springback right after the elongated workpiece 11 has been released from the movable die 13. If the rotational angle of the stable die 12 is determined in view of the derived elastic/plastic torsional deformation Δφ in the above-described manner, it is possible to sufficiently cancel the dimensional errors due to the elastic restoration or springback in the elongated product 81 after torsion. In particular, since the elastic/plastic torsional deformation can be obtained from a geometric calculation based on the torsional moment T, the operator is released from a troublesome collection of measurement data based on experiments.

Figure 47:
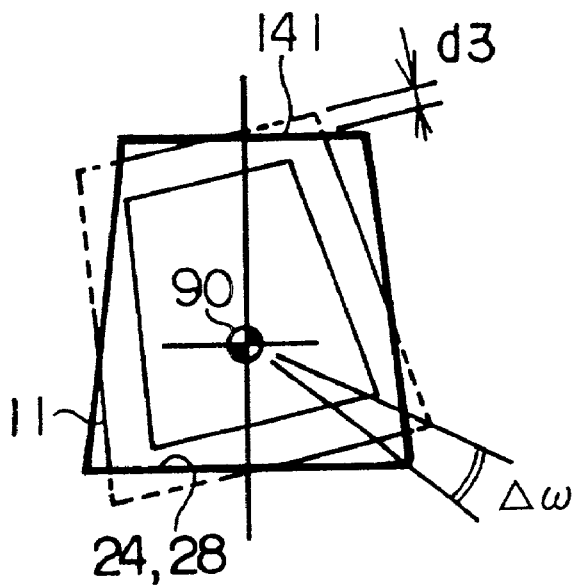
FIG. 47 schematically illustrates a torsional variation of the twisted elongated product induced by a sectional deformation.

Likewise, the second control data calculating module 76 may determine a sectional deformation d3 due to the depression 141 formed in the elongated workpiece 11 at the outlet of the through hole 24 in the stable die 12 and/or the inlet of the through hole 28 in the movable die 13, as shown in FIG. 47, for example. The second control data calculating module 76 is adapted to calculate a torsional variation Δω based on the determined sectional deformation d3. When the torsional variation Δω has been determined, the second control data calculating module 76 implements addition of the determined torsional variation Δω to the aforementioned logical rotational angle. The addition of the torsional variation Δω serves to reveal an actual or physical relative rotational angle between the stable and movable dies 12, 13, namely, the z-axis rotational angle $\underline{C}$ of the stable die 12.

In particular, when the hollow elongated workpiece 11 is subjected to torsion between the stable and movable dies 12, 13, the edges of the elongated workpiece 11 in general suffers from a sectional deformation such as the depression 141 at the outlet of the through hole 24 and/or the inlet of the through hole 28. A sufficient plastic torsion cannot be achieved in the elongated workpiece 11 until generation of the depression 141 has been completed, even if the stable die 12 is still driven to rotate around the central axis 22. The depression 141 results in an insufficient torsion of the elongated workpiece 11 between the stable and movable dies 12, 13. The elongated workpiece 11 between the stable and movable dies 12, 13 fails to reflect the geometry specified in the shape data. The twisted elongated product 81, released from the movable die 13, suffers from slight dimensional errors. If the rotational angle of the stable die 12 can be determined in view of the torsional variation Δω in the above-described manner, it is possible to cancel the dimensional errors due to the sectional deformation in the elongated product 81 after torsion.

Figure 48:
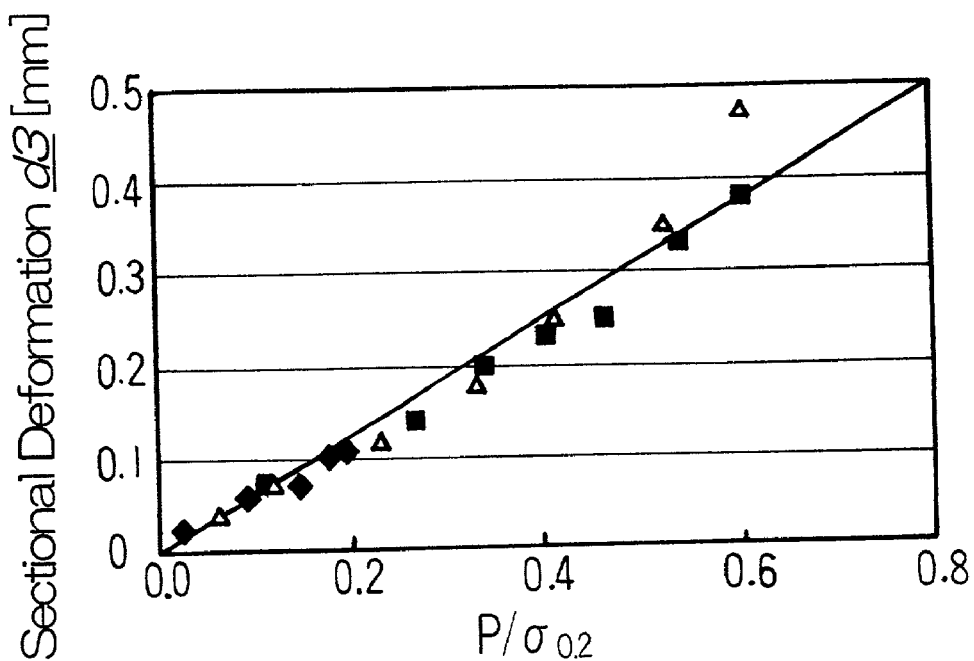
FIG. 48 is a graph illustrating the relationship between a sectional deformation $\underline{d3}$ and values for $\underline{P}/\sigma_{0.2}$.

Here, the quantity of the torsional variation Δω may be determined based on an actual measurement data, as shown in FIG. 48, for example. The torsional variation Δω[deg] may be expressed as follows in accordance with the measurement data:

$$\Delta \omega = K4 \frac{P}{\sigma_{0.2}} \quad (21)$$

In the expression (21), a representation P indicates a load applied to the edge of the elongated workpiece 11. A coefficient $\underline{K4}$ indicates a factor of proportionality derived from the actual measurement data, as shown in FIG. 48. In this case, the load $\underline{P}$ can approximately be represented by the following expression, for example:

$$P = \frac{T}{N} \quad (22)$$

In the expression (22), a variable $\underline{N}$ indicates the number of edges found in a specific cross-section.

In obtaining the measurement data, the elongated workpiece 11 of various sectional shapes, various qualities and various sizes has been subjected to torsion at the bending machine 10. The depth of the depression 141 was measured along the cross-section of the elongated workpiece 11 at the outlet of the through hole 24 in the stable die 12. When the measured values for the depth of the depression 141, in other words, the sectional deformations $\underline{d3}$ are plotted for respective values for the fractional representation (load $\underline{P}$)/(0.2% proof stress $\sigma_{0.2}$), a diagrammatic expression of the measurement data can be obtained as shown in FIG. 48.

FIG. 48 shows the measurement data for three types of aluminum elongated workpiece, JIS6063-O, JIS6063-T1 and JIS6063-T5. The diagrammatic expression in this case exhibits an approximate proportional relationship between the sectional deformation $\underline{d3}$ and the value for (load $\underline{P}$)/(0.2% proof stress $\sigma_{0.2}$). In the range of a smaller or fine torsion induced by the sectional deformation such as the depression 141, the proportional relationship is also applicable to the relation between the torsional variation Δω and the value for (load $\underline{P}$)/(0.2% proof stress $\sigma_{0.2}$). Accordingly, the torsional variation Δω can directly be derived by utilizing the aforementioned coefficient $\underline{K4}$. Moreover, a common coefficient $\underline{K4}$ can be derived for determining the torsional variation Δω, irrespective of the quality and the mechanical property of the workpiece 11. It should be noted that the coefficient $\underline{K4}$ may vary depending on the sectional shape of the elongated workpiece 11.

Figure 49:
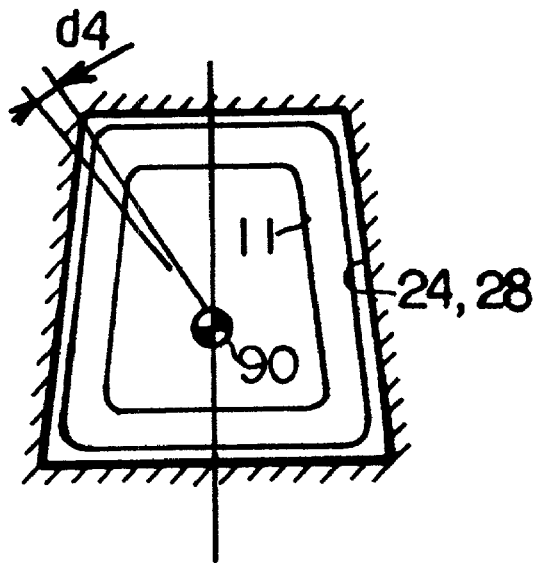
FIG. 49 schematically illustrates a clearance defined between the outer periphery of the elongated workpiece and the through hole of any die.

In addition, the second control data calculating module 76 may determine a clearance $\underline{d4}$ between the elongated workpiece 11 and the stable and movable dies 12, 13, respectively, as shown in FIG. 49, for example. The determined clearance $\underline{d4}$ may be added to the aforementioned logical rotational angle for the stable die 12, so that an actual or physical relative rotational angle between the stable and movable dies 12, 13, in the other words, the z-axis rotational angle $\underline{C}$ of the stable die 12 can be derived.

As described above, a specific range of the dimensional tolerance is permitted for the elongated workpiece 11, for example, manufactured by extrusion and the like. If the elongated workpiece 11 should smoothly be passed through the through holes 24, 28, defined in the stable and movable dies 12, 13, irrespective of variation in dimensions within the tolerance, it is necessary to establish a clearance between the designed dimensions of the elongated workpiece 11 and the actual dimensions of the through holes 24, 28. Even if the elongated workpiece 11 has been manufactured exactly at the designed dimensions, the elongated workpiece 11 cannot pass through the through holes 24, 28 in the stable and movable dies 12, 13 without a clearance. A substantial torsion cannot be accomplished in the elongated workpiece 11 until the stable and movable dies 12, 13 are allowed to completely contact the elongated workpiece 11 through the rotation of the stable die 12 over the clearance, even if the stable die 12 is driven to rotate around the central axis 22. The clearance results in an insufficient torsion of the elongated workpiece 11 between the stable and movable dies 12, 13. The elongated workpiece 11 between the stable and movable dies 12, 13 fails to reflect the geometry specified in the shape data. The final elongated product 81, released from the movable die 13, suffers from slight dimensional errors. If the rotational angle of the stable die 12 can be determined in view of the clearance $\underline{d4}$ in the above-described manner, it is possible to cancel the dimensional errors due to the clearance in the elongated product 81 after torsion.

Figure 50:
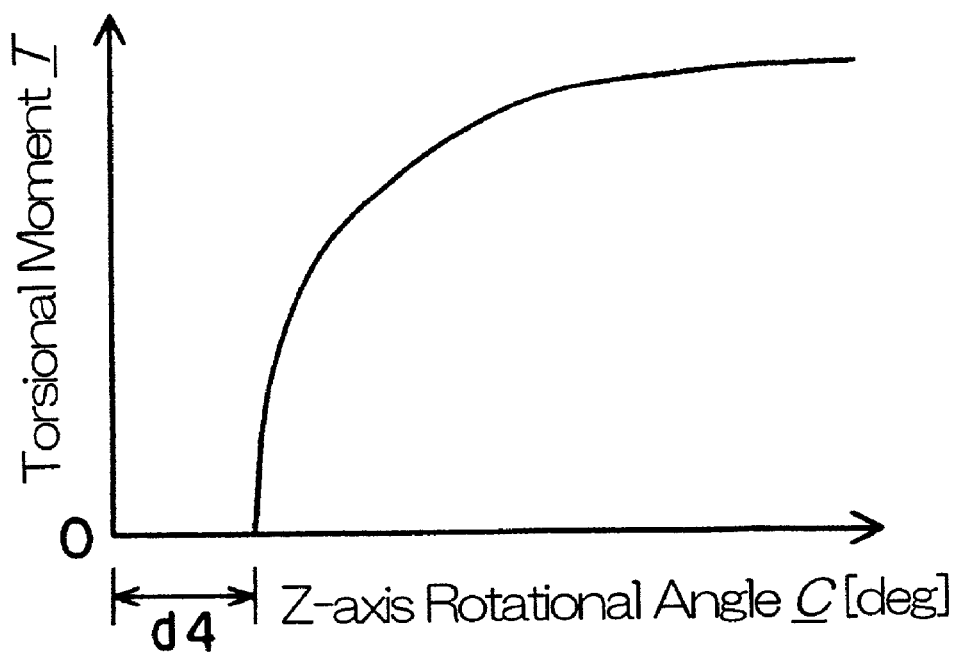
FIG. 50 is a graph illustrating the relationship between a torsional moment $\underline{T}$ and the z-axis rotational angle $\underline{C}$.

Here, the quantity of the clearance $\underline{d4}$[mm] may be determined based on an actual measurement data, as shown in FIG. 50, for example. In obtaining the measurement data, the elongated workpiece 11 of various sectional shapes, various qualities and various sizes has been subjected to torsion at the bending machine 10. The z-axis rotational angle $\underline{C}$ was measured. When the values for the torsional moment $\underline{T}$ are plotted for the respective measured values for the z-axis rotational angle $\underline{C}$, a diagrammatic expression of the measurement data can be derived as shown in FIG. 50. Based on the measurement data, the diagrammatic expression or described curve intersects the abscissas when the torsional moment $\underline{T}$ takes the value of $\underline{T}$=0, as clearly shown in FIG. 50. The coordinate of the intersection, in other words, the z-axis rotational angle $\underline{C}$ at $\underline{T}$=0 corresponds to the clearance $\underline{d4}$.

Figure 51:
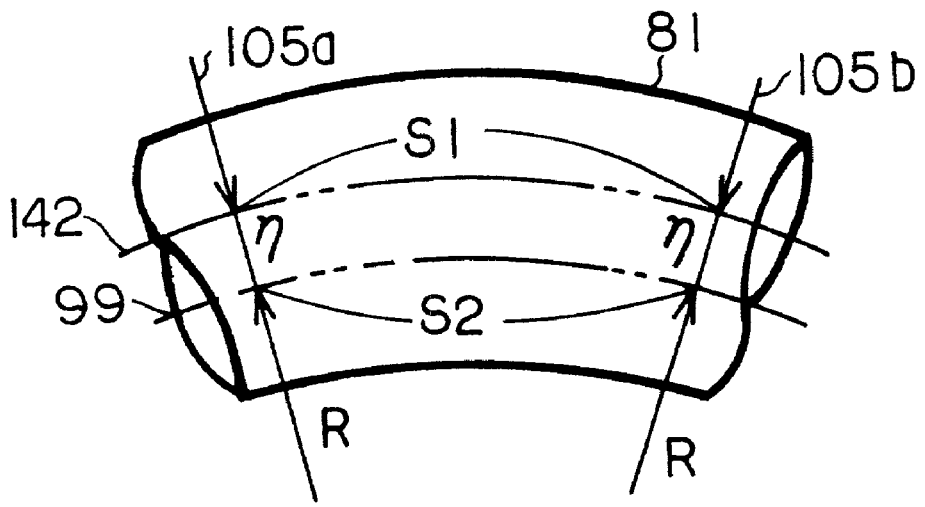
FIG. 51 is an enlarged partial sectional view of the elongated product for schematically illustrating the centroidal line and a neutral axis between the adjacent cross-sections.

The feed speed determining module 78 is adapted to determine the longitudinal positions W specified on the elongated workpiece 11 at the outlet of the through hole 24 in the stable die 12, based on the position of the respective knots 102 determined at the knot position determining module 72. In determining the longitudinal positions W, the feed speed determining module 78 first determines the neutral axis 142 between the cross-sections 105a, 105b defined at the adjacent knots 102, as shown in FIG. 51, for example. In determining the neutral axis 142, the feed speed determining module 78 calculates the quantity of the deviation η, from the centroidal line 99 or centroid 90 to the neutral axis 142, along the respective cross-sections 105a, 105b, in the aforementioned manner. The feed speed determining module 78 is designed to describe the neutral axis 142 based on the determined deviation η and the centroidal line 99.

In describing the neutral axis 142 based on the centroidal line 99, the feed speed determining module 78 determines a vector representing the direction of the centroidal line 99 at the respective cross-sections 105a, 105b. The determined vector is subjected to a translation operation along the respective cross-sections 105a, 105b by the amount corresponding to the determined deviation η. In this manner, a starting vector and an ending vector can be established at the adjacent cross-sections 105a, 105b. A parametric curve of the same order as the centroidal line 99 is then described to connect the ending vector with the starting vector. The parametric curve may allow the curvature to vary at a uniform rate from the starting vector to the ending vector. The thus described parametric curve represents the neutral axis 142. When the parametric curves can be obtained for the respective pairs of the adjacent cross-sections 105a–105g, the neutral axis 142 can be described over the entire length of the elongated workpiece 11.

The length S1 of the neutral axis 142 between the adjacent cross-sections 105a, 105b represents the longitudinal position W for the elongated workpiece 11. The feed speed of the elongated workpiece 11 is determined based on the thus calculated length S1. In other words, the position of the respective cross-sections 105a–105g, specified in accordance with the centroidal line 99, namely, the position of the respective knots 102 along the centroidal line 99, is subjected to modification or compensation based on the length S1 of the neutral axis 142. In this case, the substitution of the length S1 of the neutral axis 142 for the length S2 of the centroidal line 99 may be effected prior to determination of the position for the respective cross-sections 105a–105g.

In general, the aforementioned axial compressive force Pc is inevitably induced in the elongated workpiece 11 in response to the reaction to the advancement of the elongated workpiece 11 when the elongated workpiece 11 fed out of the stable die 12 is received on the offset movable die 13, as shown in FIG. 25, for example. The axial compressive force Pc causes a variation in the length of the elongated workpiece 11. The variation in the length depends upon the magnitude of the curvature 1/R, namely, the radius of curvature R. On the other hand, the elongated workpiece 11 does not suffer from a compressive strain at the neutral axis 142 irrespective of the degree of bending or curvature 1/R in the elongated workpiece 11. Accordingly, the length S1 of the neutral axis 142 can be kept constant in the workpiece 11 before and after bending. If the x- and y-coordinates and the y-axis and x-axis rotational angles B, A for the movable die 13 as well as the z-axis rotational angle C for the stable die 12 is related to the respective longitudinal positions W derived based on the neutral axis 142 in the above-described manner, it is possible to form the final elongated product 81 at a higher accuracy.

As described above, the NC program generating module 64 determines the control data. When the description of a header and/or a footer is added to the determined control data, the aforementioned NC program can be obtained. According to the determined control data, when the velocity of the slider 15, in other words, the feed speed of the elongated workpiece 11 has been determined, the velocity or speed can be determined for movement of the movable die 13 along the x- and y-axes, while the revolving or rotational speed can also be determined for rotation of the movable die 13 around the V- and H-axes of the motion plane HV as well as rotation of the stable die 12 around the z-axis. As long as the determined speed and rotational speed are reliably achieved for the stable and movable dies 12, 13, the expected movement and attitude can be established in the stable and movable dies 12, 13 at every specific longitudinal position W in accordance with the control data.

It should be noted that the first control data calculating module 74 needs not modify or compensate the geometric position of the movable die 13 in view of the aforementioned elastic/plastic bending deformation, elbow angle, sectional deformation and clearance. When the geometric position of the movable die 13 should be modified or compensated, any of the aforementioned elastic/plastic bending deformation, elbow angle, sectional deformation and clearance may be employed, independently or in any combination. And also, the second control data calculating module 76 needs not modify or compensate the logical rotational angle for the stable die 12 in view of the aforementioned elastic/plastic torsional deformation, torsional variation and clearance. When the logical rotational angle for the stable die 12 should be modified or compensated, any of the aforementioned elastic/plastic torsional deformation, torsional variation and clearance may be employed, independently or in any combination.

What is claimed is:

1. A computer-implemented method of generating a control data for a bending apparatus, comprising: defining local coordinate systems within an overall coordinate system designed to specify a shape of an elongated product, said local coordinate systems representing a stable die of the bending apparatus within the overall coordinate system, respectively.

2. The computer-implemented method as defined in claim 1, further comprising:
   capturing a shape data specifying the shape of the elongated product in accordance with the overall coordinate system;
   setting the local coordinate systems on specific cross-sections of the elongated product, respectively, based on the shape data; and
   determining periodical positions for a movable die of the bending apparatus in accordance with the respective local coordinate systems.

3. A computer-readable storage medium containing program instructions for generating a control data for a bending apparatus, comprising: computer program code causing a computer to define local coordinate systems within an overall coordinate system designed to specify a shape of an elongated product, said local coordinate systems representing a stable die of the bending apparatus within the overall coordinate system.

4. A computer-implemented method of generating a control data for a bending apparatus, comprising:

capturing from a computer-aided design system a shape data specifying a shape of an elongated product; and generating the control data specifying positions for a movable die of the bending apparatus, said positions set for corresponding feed positions defined in an axial direction of the elongated product.

5. A computer-implemented method of generating a control data for a bending apparatus, comprising:

determining a geometric position for a movable die of the bending apparatus, based on a shape data specifying a shape of an elongated product;

determining a bending moment applied to an elongated workpiece, based on a curvature of the elongated product specified in the shape data;

determining a quantity for an elastic/plastic bending deformation induced in the elongated workpiece, based on the bending moment; and determining an actual position for the movable die, based on the quantity and the geometric position.

6. A computer-implemented method of generating a control data for a bending apparatus, comprising:

determining a geometric position for a movable die of the bending apparatus, based on a shape data specifying a shape of an elongated product;

determining a quantity for an elbow angle of an elongated workpiece, said elbow angle induced by a shear deformation and a deformation in cross-section of the elongated workpiece at an outlet defined in a stable die of the bending apparatus; and determining an actual position for the movable die, based on the quantity and the geometric position.

7. A computer-implemented method of generating a control data for a bending apparatus, comprising:

determining a geometric position for a movable die of the bending apparatus, based on a shape data specifying a shape of an elongated product;

determining a quantity for a sectional deformation induced in an elongated workpiece at an outlet defined in a stable die of the bending apparatus; and determining an actual position for the movable die, based on the quantity and the geometric position.

8. A computer-implemented method of generating a control data for a bending apparatus, comprising:

determining a geometric position for a movable die of the bending apparatus, based on a shape data specifying a shape of an elongated product;

determining a quantity for a clearance defined between an elongated workpiece and at least one of a stable die and the movable die of the bending apparatus; and determining an actual position for the movable die, based on the quantity and the geometric position.

9. A computer-implemented method of generating a control data for a bending apparatus, comprising:

determining a neutral axis based on a shape data specifying a shape of an elongated product, said neutral axis extending in a longitudinal direction of the elongated product; and determining a feed speed for an elongated workpiece which passes through a stable die of the bending apparatus, based on the neutral axis.

10. A computer-implemented method of generating a control data for a bending apparatus, comprising:

capturing a shape data specifying a shape of a twisted elongated product in accordance with an overall coordinate system;

defining local coordinate systems on respective cross-sections of the elongated product specified in accordance with the shape data, said local coordinate systems representing a stable die of the bending apparatus within the overall coordinate system, respectively;

determining an angle of torsion per unit length for a unit feed amount specified in a direction of a longitudinal axis of the elongated product, based on the adjacent local coordinate systems; and determining a relative rotation around the longitudinal axis between the stable die and a movable die of the bending apparatus, based on the angle of torsion per unit length.

11. A computer-readable storage medium containing program instructions for generating a control data for a bending apparatus, comprising:

computer program code causing a computer to capture a shape data specifying a shape of a twisted elongated product in accordance with an overall coordinate system;

computer program code causing the computer to define local coordinate systems on respective cross-sections of the elongated product specified in accordance with the shape data, said local coordinate systems representing a stable die of the bending apparatus within the overall coordinate system, respectively;

computer program code causing the computer to determine an angle of torsion per unit length for a unit feed amount specified in a direction of a longitudinal axis of the elongated product, based on the adjacent local coordinate systems; and computer program code causing the computer to determine a relative rotation around the longitudinal axis between the stable die and a movable die of the bending apparatus, based on the angle of torsion per unit length.

12. A computer-implemented method of generating a control data for a torsion apparatus, comprising:

capturing a shape data specifying a shape of an elongated product twisted around its longitudinal axis;

determining an angle of torsion per unit length for a unit feed amount specified in a direction of the longitudinal axis, based on the shape data; and determining a torsional angle of the elongated product around the longitudinal axis based on the angle of torsion per unit length, said torsional angle defined between first and second dies allowed for a relative rotation around the longitudinal axis.

13. A computer-readable storage medium containing program instructions for generating a control data for a torsion apparatus, comprising:

computer program code causing a computer to capture a shape data specifying a shape of an elongated product twisted around its longitudinal axis;

computer program code causing the computer to determine an angle of torsion per unit length for a unit feed amount specified in a direction of the longitudinal axis, based on the shape data; and computer program code causing the computer to determine a torsional angle of the elongated product around the longitudinal axis based on the angle of torsion per unit length, said torsional angle defined between first and second dies allowed for a relative rotation around the longitudinal axis.

14. A computer-implemented method of generating a control data for a torsion apparatus, comprising:

determining a logical relative rotation between first and second dies around a longitudinal axis of a twisted elongated product, based on a shape data specifying a shape of the elongated product twisted around the longitudinal axis;

determining a torsional moment applied to an elongated workpiece, based on a torsional angle of the elongated product specified in the shape data;

determining a quantity for an elastic/plastic torsional deformation induced in the elongated workpiece, based on the torsional moment; and determining an actual relative rotation between the first and second dies, based on the quantity and the logical relative rotation.

15. A computer-implemented method of generating a control data for a torsion apparatus, comprising:

determining a logical relative rotation between first and second dies around a longitudinal axis of a twisted elongated product, based on a shape data specifying a shape of the elongated product twisted around the longitudinal axis;

determining a quantity for a torsional variation induced in an elongated workpiece in response to a sectional deformation of the elongated workpiece, said sectional deformation induced at an edge of a through hole on at least one of the first and second dies;

determining an actual relative rotation between the first and second dies, based on the quantity and the logical relative rotation.

16. A computer-implemented method of generating a control data for a torsion apparatus, comprising:

determining a logical relative rotation between first and second dies around a longitudinal axis of a twisted elongated product, based on a shape data specifying a shape of the elongated product twisted around the longitudinal axis;

determining a quantity for a clearance defined between an elongated workpiece and at least one of the first and second dies;

determining an actual relative rotation between the first and second dies, based on the quantity and the logical relative rotation.

17. A bending apparatus system comprising:

a bending apparatus designed to form an elongated product by effecting bending on an elongated workpiece passing through stable and movable dies, one after the other;

an input device designed to get a shape data specifying a shape of the elongated product in accordance with an overall coordinate system;

a processor unit designed to determine a position for the movable die based on respective local coordinate systems, said local coordinate systems defined on respective cross-sections of an image of the elongated product within the overall coordinate system; and a controller designed to control motion of the movable die based the positions determined at the processor unit.

* * * * *